United States Patent [19]
Shiraishi et al.

[11] Patent Number: 5,455,900
[45] Date of Patent: Oct. 3, 1995

[54] IMAGE PROCESSING APPARATUS

[75] Inventors: Naoto Shiraishi, Toyonaka; Tatsuya Fujii, Nishinomiya, both of Japan

[73] Assignee: Ricoh Company, Ltd., Tokyo, Japan

[21] Appl. No.: 135,614

[22] Filed: Oct. 14, 1993

[30] Foreign Application Priority Data

Oct. 20, 1992 [JP] Japan .................................. 4-307550
Jan. 14, 1993 [JP] Japan .................................. 5-022172

[51] Int. Cl.$^6$ .................................................. G06F 15/72
[52] U.S. Cl. .................................................. 395/141
[58] Field of Search .................................. 395/141, 139, 395/133, 119, 122, 162, 164; 345/113, 118

[56] References Cited

U.S. PATENT DOCUMENTS 5,287,436  2/1994  Fischer et al. .......................... 395/119

FOREIGN PATENT DOCUMENTS 231379  10/1987  Japan .

*Primary Examiner*—Phu K. Nguyen
*Attorney, Agent, or Firm*—Popham, Haik, Schnobrich & Kaufman, Ltd.

[57] ABSTRACT

An image processing apparatus which can be operated using a small memory capacity and at a high speed. A screen memory for storing X and Y coordinate data for edge points of polygons and a sort memory for storing polygon numbers are provided. A polygon side computing unit computes data for sides of each of the polygons corresponding to each of the polygon numbers. A side pair computing unit computes side pair data in accordance with the data of sides of polygons, the side pair data comprising data of a pair of sides located on the scan lines of the screen. An inclination computing unit computes an inclination of each side of the side pair. A side pair memory stores inclination data and start and end point data of each side of the side pair, each data being stored in a position having a predetermined address. A frame memory stores data for the address of the side pair memory. An interpolation computing unit computes right and left intersection data on each of the scan lines. A processing unit processes the right and left intersection data so as to obtain dot data for the polygons, and outputs the dot data by synchronizing the dot data with the scan lines of the screen on the display unit.

16 Claims, 54 Drawing Sheets

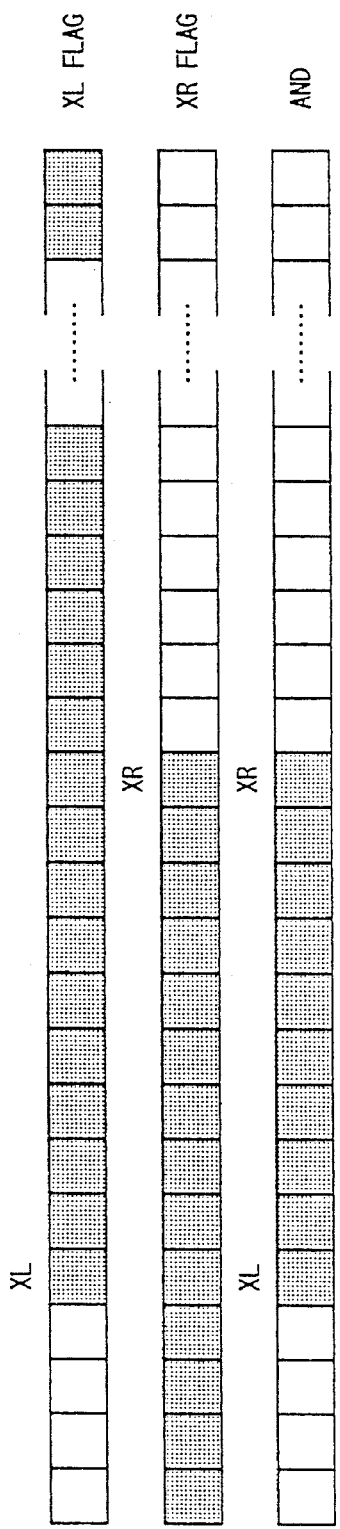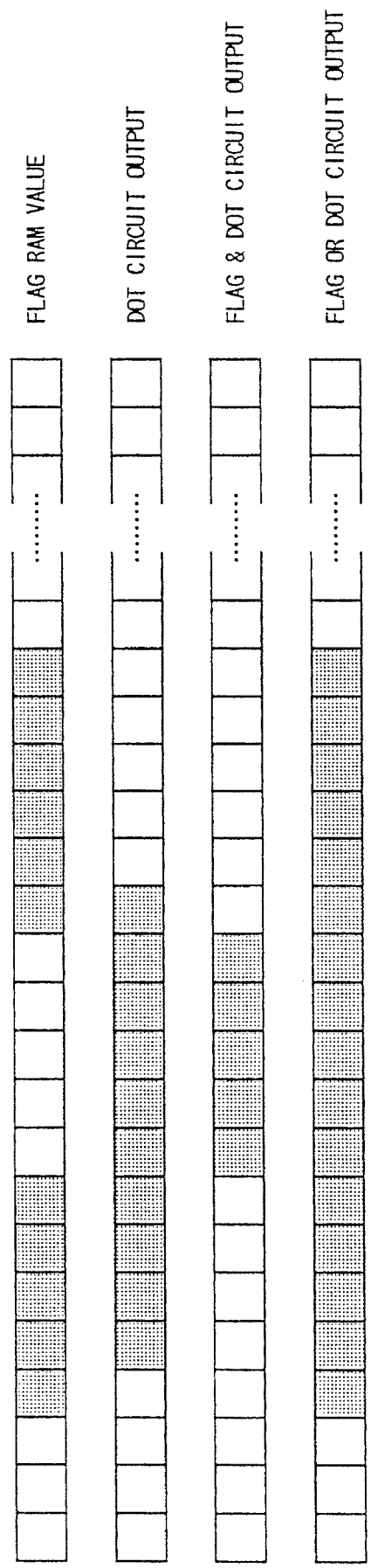

FIG. 13A

| ADDRESS | LEFT SIDE | | | RIGHT SIDE | | | SIDE PAIR | |
|---|---|---|---|---|---|---|---|---|
| | XLS | YSS | INCLINATION | ATTRIBUTE | XRS | YSS | INCLINATION | ATTRIBUTE | YSS | YEE |
| 1 | | | | | | | | | | |
| 2 | | | | | | | | | | |
| 3 ......... | | | | | | | | | | |

FIG. 13B

| SCAN LINE NUMBER | 1 | 2 | 3 | 4 | 5 | 6 | 7 | ........ | 256 |
|---|---|---|---|---|---|---|---|---|---|
| POLYGON SIDE PAIR MEMORY ADDRESS | | | | | | | | | |
| 1 | | | | | | | | | |
| 2 | | | | | | | | | |
| 3 ......... | | | | | | | | | |
| 400 | | | | | | | | | |

FIG. 13C

| ADDRESS | X LEFT INTERSECTION | X RIGHT INTERSECTION | ATTRIBUTE |
|---------|---------------------|----------------------|-----------|
| 1       |                     |                      |           |
| 2       |                     |                      |           |
| 3       |                     |                      |           |
| 4 ………   |                     |                      |           |

FIG. 34A

| ADDRESS | LEFT SIDE | | | | RIGHT SIDE | | | | SIDE PAIR | |
|---|---|---|---|---|---|---|---|---|---|---|
| | XLS | YSS | INCLINATION | ATTRIBUTE | XRS | YSS | INCLINATION | ATTRIBUTE | YSS | YEE |
| 1 | | | | | | | | | | |
| 2 | | | | | | | | | | |
| 3······ | | | | | | | | | | |

FIG. 34B

|  | POLYGON SIDE PAIR ADDRESS | POLYGON SIDE PAIR Y START POINT | POLYGON SIDE PAIR Y END POINT |
|---|---|---|---|
| 1<br>2<br>3<br>4<br>5<br>6<br>7<br>8<br>9<br>1 0<br>⋮ | | | |

FIG. 34C

| ADDRESS | X LEFT INTERSECTION | X RIGHT INTERSECTION | ATTRIBUTE |
|---|---|---|---|
| 1<br>2<br>3<br>4<br>⋮ | | | |

CLOCKWISE

COUNTERCLOCKWISE

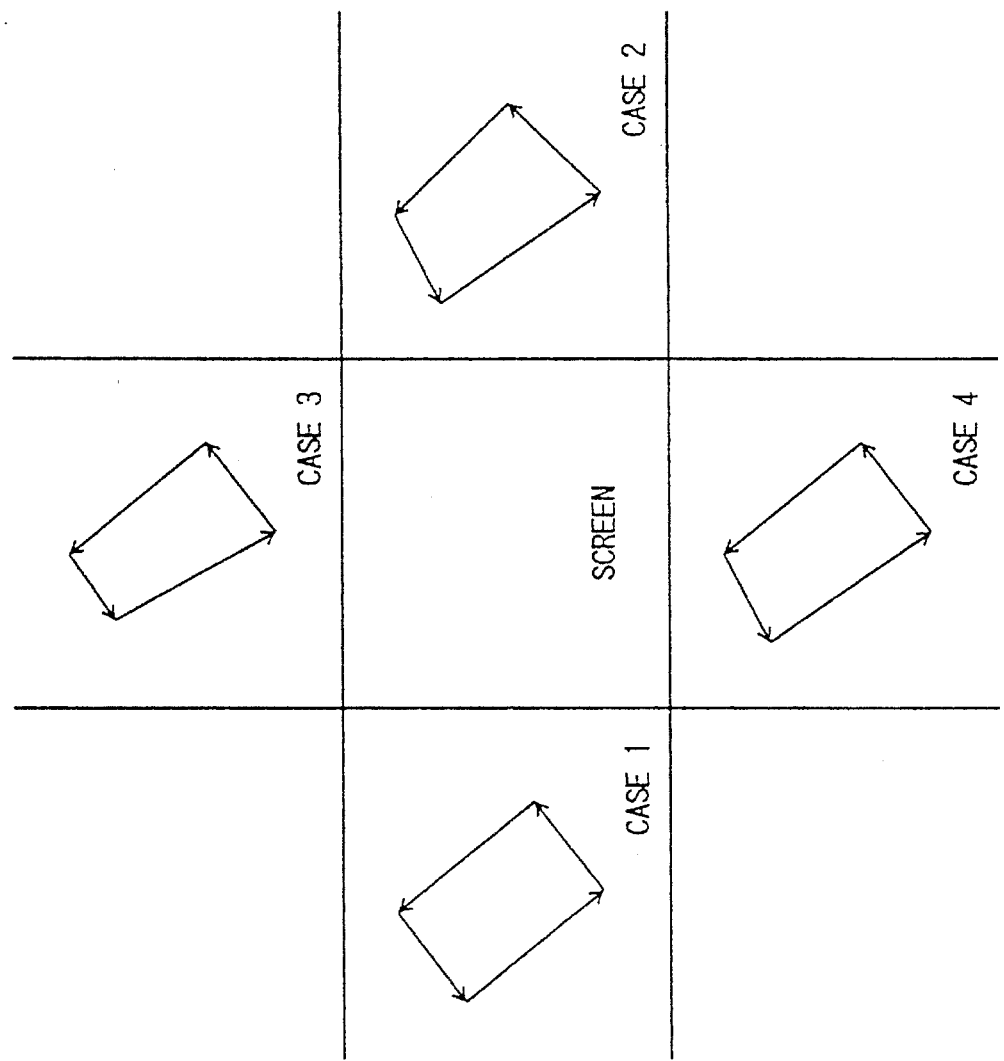

| LEFT SIDE COUNTER | RIGHT SIDE COUNTER | | SIDE PAIR L R |
|---|---|---|---|
| 3 | 1 |  | 1 — 4<br>2 — 4<br>3 — 4 |

| LEFT SIDE COUNTER | RIGHT SIDE COUNTER | | SIDE PAIR L R |
|---|---|---|---|
| 2 | 2 |  | 1 — 4<br>2 — 3 |

| LEFT SIDE COUNTER | RIGHT SIDE COUNTER | | SIDE PAIR L R |
|---|---|---|---|
| 2 | 2 |  | 1 — 4<br>1 — 3<br>2 — 3 |

| LEFT SIDE COUNTER | RIGHT SIDE COUNTER | | SIDE PAIR L R |
|---|---|---|---|
| 2 | 2 |  | 1 — 4<br>2 — 4<br>2 — 3 |

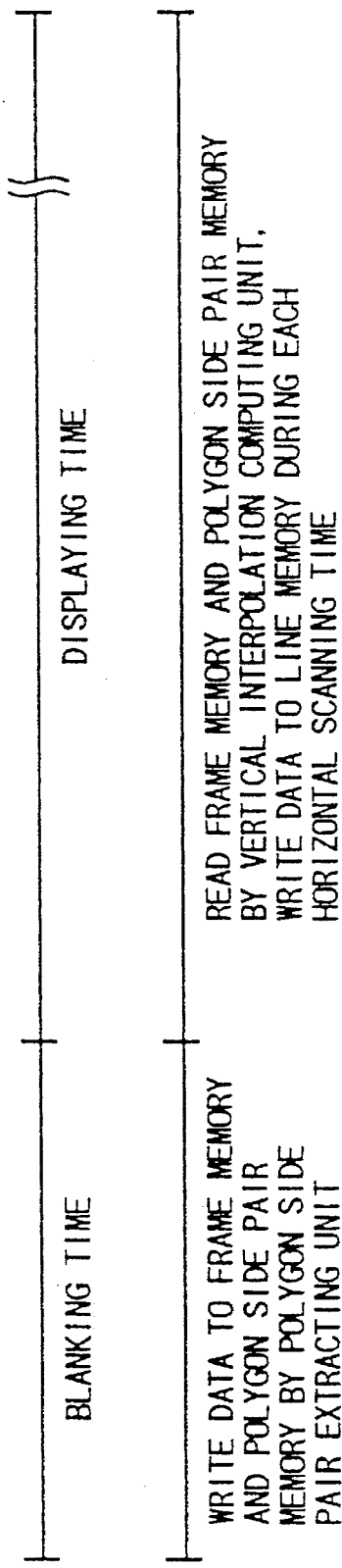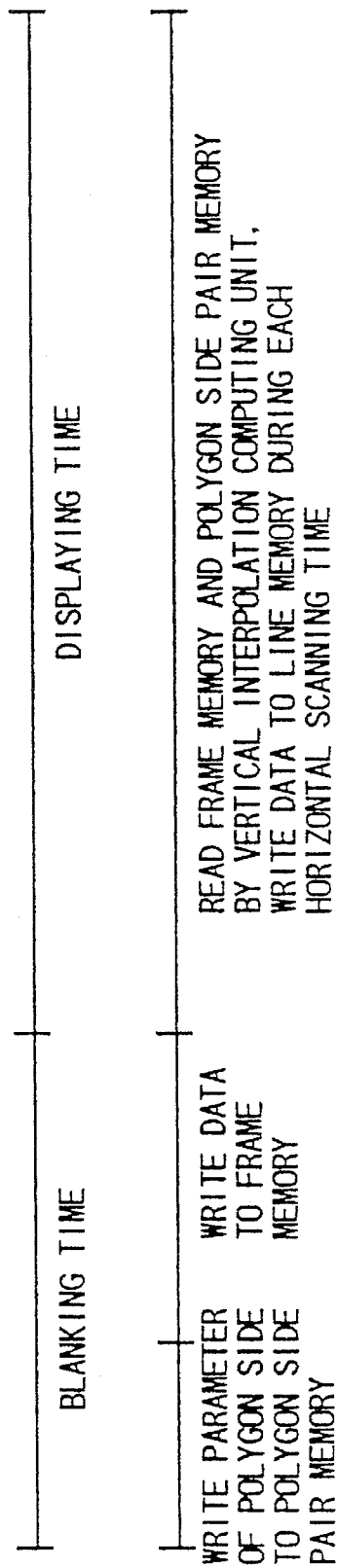

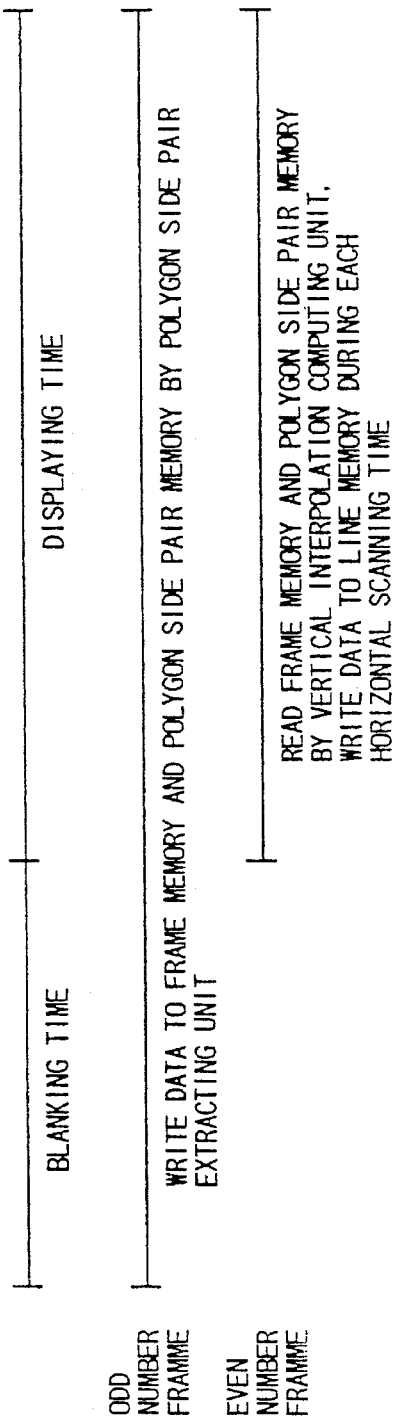
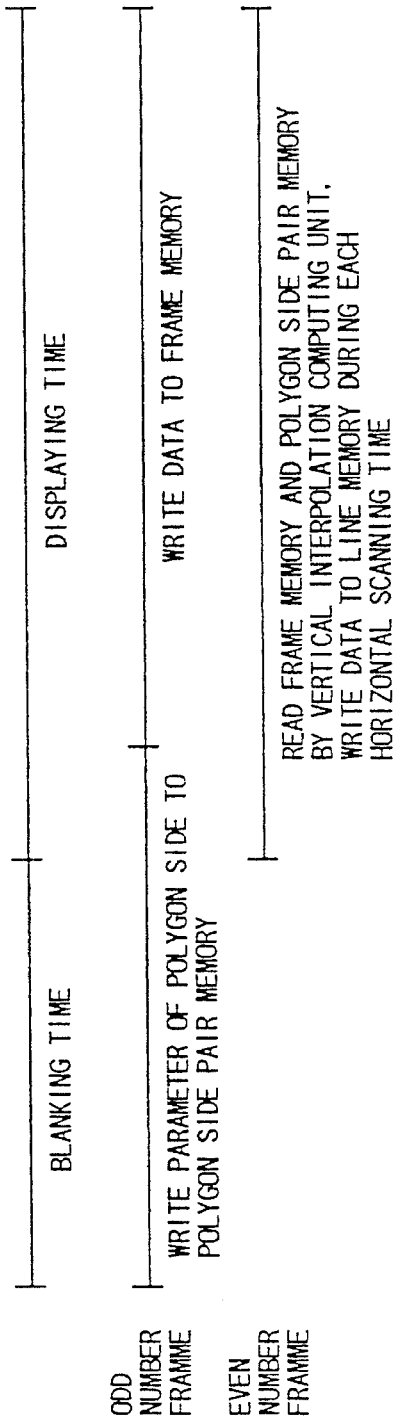

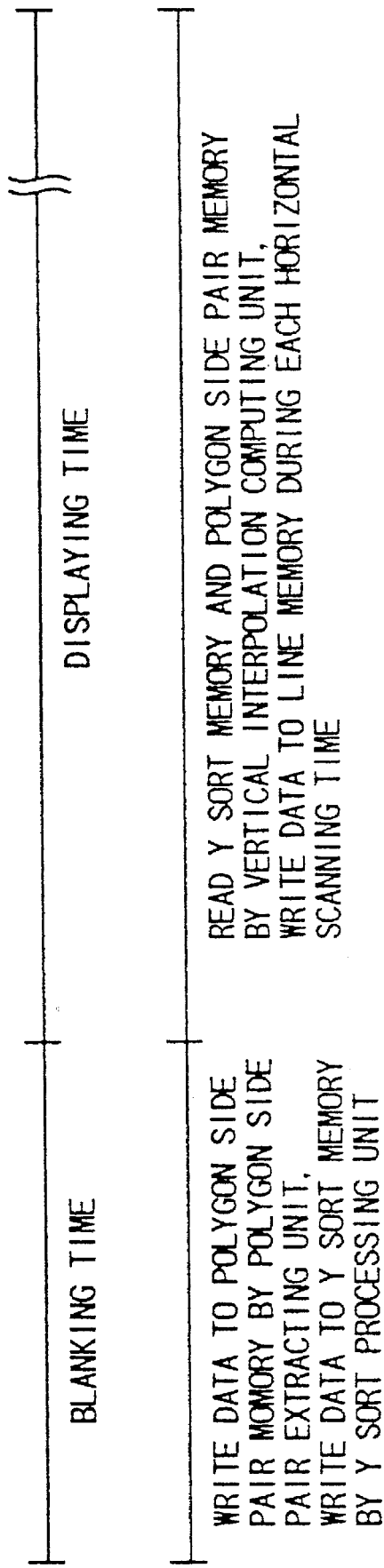

IMAGE PROCESSING APPARATUS

BACKGROUND OF THE INVENTION

The present invention relates to an image processing apparatus, and more specifically to an image processing apparatus for three-dimensional computer graphics such as that used in work stations or game machines, which image processing apparatus can output image signals in accordance with image information of a polygon in realtime.

An image processing apparatus herein described is an apparatus which can output image signals to be provided to a display apparatus such as a CRT display in accordance with input from external devices. Such an image processing apparatus can output not only image signals for a two-dimensional image but also image signals for a pseudo three-dimensional image by synthesizing two dimensional image signals. Therefore, such an image processing apparatus is widely used in TV game machines or computer graphics apparatuses in which a three-dimensional image display is adopted.

A conventional image processing apparatus of this kind uses a bit map display method (graphic display). In order to use a bit map display method, a bit map memory having memory areas is provided, each of which memory areas stores all pixel signals included in an entire single image to be displayed on a CRT. When a picture is displayed in, for example, computer graphics, a contour of a polygon is drawn on a display, and then the inside of the polygon is painted. Accordingly, there is a problem in that if the number of polygons is increased, a memory having a large capacity is required and a realtime image processing is not performed.

Japanese Laid-Open Patent Application No. 62-231379 discloses a picture synthesizing apparatus in which image signals are synthesized and output in realtime in accordance with supplied contour line information of a picture.

In a field processor of the above-mentioned picture synthesizing apparatus, polygons are processed, in turn, by means of digital differential analysis (DDA), and then the results of the operation are stored in a memory. The memory is required to have a capacity, when the processing of all polygons have been finished, sufficient for storing information for all X start points and all X end points lying on a single scan line and for storing additional information by which attributes of the polygons can be recognized. Accordingly, the capacity of the memory has to be relatively large, and thus the cost of the memory is increased. In particular, the greater the amount of additional information for polygons, the greater the amount of memory capacity that is required. Therefore, there is a problem in that the proportion of the cost of the memory regard to the total manufacturing cost of the apparatus is greatly increased.

SUMMARY OF THE INVENTION

It is a general object of the present invention to provide a novel and useful image processing apparatus in which the above-mentioned disadvantages are eliminated.

A more specific object of the present invention is to provide an image processing apparatus which can be operated with a small memory capacity and at a high speed.

In order to achieve the above-mentioned objects, an image processing apparatus according to the present invention, which image processing unit processes image data of a picture consisting of polygons to be displayed on a screen comprising scan lines of a display unit, the image processing apparatus comprising:

a screen memory for storing at least X and Y coordinate data for edge points of the polygons;

a sort memory for storing polygon numbers, which numbers are arranged in an order of priority in which the polygon having the highest priority is arranged first in the order;

a polygon side computing unit, connected to the screen memory and the sort memory, for computing, from the data for edge points stored in the screen memory, data for sides of each of the polygons corresponding to each of the polygon numbers stored in the sort memory;

a side pair computing unit for computing side pair data in accordance with the data of sides of polygons supplied by the polygon side computing unit, the side pair data comprising data of a pair of sides located on the scan lines of the screen;

an inclination computing unit for computing an inclination of each side of the side pair;

a side pair memory for storing inclination data computed by the inclination computing unit and start point and end point data of each side of the side pair, each data being stored in a position having a predetermined address;

a frame memory for storing data of the address of the side pair memory;

an interpolation computing unit for computing, by means of an interpolation method, right intersection data and left intersection data on each of the scan lines, the right intersection data corresponding to an intersection of each of the scan lines and a right side of each of the polygons, and the left intersection data corresponding to an intersection of each of the scan lines and a left side of each of the polygons; and a processing unit for processing the right intersection data and the left intersection data supplied by the interpolation computing unit so as to obtain dot data for the polygons, and for outputting the dot data of the polygons by synchronizing the dot data with the scan lines of the screen on the display unit.

Further, an image processing apparatus according to the present invention which processes image data of a picture consisting of polygons to be displayed on a screen comprising scan lines of a display unit, the image processing apparatus comprising:

a screen memory for storing at least X and Y coordinate data for edge points of the polygons;

a sort memory for storing polygon numbers, which numbers are arranged in an order of priority in which the polygon having the highest priority is arranged first in the order;

a polygon side computing unit, connected to the screen memory and the sort memory, for computing, from the data for edge points stored in the screen memory, data for sides of each of the polygons corresponding to each of the polygon numbers stored in the sort memory;

a side pair computing unit for computing side pair data in accordance with the data for sides of polygons supplied by the polygon side computing unit, the side pair data comprising data of a pair of sides located on the scan lines of the screen;

an inclination computing unit for computing an inclination of each side of the side pair;

a side pair memory for storing inclination data computed by the inclination computing unit and start point and end point data of each side of the side pair, each data being stored in a position having a predetermined address;

a judging unit for judging whether or not each of the polygons is to be displayed in accordance with the data received from the side pair memory;

a frame memory for storing data of the address of the side pair memory, the address corresponding only to the polygons which said judging unit has judged are to be displayed;

an interpolation computing unit for computing, by means of an interpolation method, right intersection data and left intersection data on each of the scan lines, the right intersection data corresponding to an intersection of each of the scan lines and a right side of each of the polygons, and the left intersection data corresponding to an intersection of each of the scan lines and a left side of each of the polygons; and a processing unit for processing the right intersection data and the left intersection data supplied by the interpolation computing unit so as to obtain dot data for the polygons, and for outputting the dot data of the polygons by synchronizing the dot data with the scan lines of the screen on the display unit.

Further, an image processing apparatus according to the present invention which processes image data of a picture consisting of polygons to be displayed on a screen comprising scan lines of a display unit, the image processing apparatus comprising:

a screen memory for storing at least X and Y coordinate data for edge points of the polygons;

a sort memory for storing polygon numbers, which numbers are arranged in an order of priority in which the polygon having the highest priority is arranged first in the order;

a polygon side computing unit, connected to the screen memory and the sort memory, for computing, from the data for edge points stored in the screen memory, data for sides of each of the polygons corresponding to each of the polygon numbers stored in the sort memory;

a side pair computing unit for computing side pair data in accordance with the data for sides of polygons supplied by the polygon side computing unit, the side pair data comprising data of a pair of sides located on the scan lines of the screen;

an inclination computing unit for computing an inclination of each side of the side pair;

a side pair memory for storing polygon side pair data including inclination data computed by the inclination computing unit and start point and end point data of each side of the side pair, each data being stored in a position having a predetermined address;

a Y sort memory for storing Y start point data and Y end point data of the polygon side pair and the address data of the side pair memory unit;

a sort processing unit for rearranging the polygon side pair data in the side pair memory in an order starting from polygon side pair data having the smallest Y address value of Y start point data, and for writing in the Y sort memory the Y start point data and Y end point data and the address of the side pair memory corresponding to each polygon side pair;

an interpolation computing unit for computing, by means of an interpolation method, right intersection data and left intersection data on each of the scan lines upon accessing the side pair memory unit and the Y sort memory, the right intersection data corresponding to an intersection of each of the scan lines and a right side of each of the polygons, and the left intersection data corresponding to an intersection of each of the scan lines and a left side of each of the polygons; and a processing unit for processing the right intersection data and the left intersection data supplied by the interpolation computing unit so as to obtain dot data for the polygons, and for outputting the dot data of the polygons by synchronizing the dot data with the scan lines of the screen on the display unit.

According to the present invention, since polygon side pair data is stored in the side pair memory and only address data is stored in the frame memory, a memory having a small capacity can be adopted. Additionally, by the provision of the judging unit, only polygon data for polygons to be displayed is stored in the frame memory, and thus any unnecessary computation is eliminated, which results in a reduced processing time.

Other objects, features and advantages of the present invention will become more apparent from the following detailed description when read in conjunction with the accompanying drawings.

BRIEF DESCRIPTION OF THE PREFERRED EMBODIMENTS

FIG. 12A is an illustration showing an output of the dot circuit;

FIG. 12B is an illustration showing an operation of a flag RAM shown in FIG. 9;

FIGS. 13A is an illustration showing the format of a polygon side pair memory shown in FIG. 5B;

FIG. 13B is an illustration showing the format of a frame memory shown in FIG. 5B;

FIG. 13C is an illustration showing the format of a line memory shown in FIG.5B;

FIGS. 34A is an illustration showing a format of a polygon side pair memory shown in FIG. 32B;

FIG. 34B is an illustration showing a format of a sort memory shown in FIG. 32B;

FIG. 34C is an illustration showing a format of a line memory shown in FIG. 32B;

FIG. 40 is an illustration for explaining a clipping operation of a polygon on a screen;

FIG. 42 is an illustration showing an example of a timing of each operation performed in the first and the second embodiments of the present invention;

FIG. 43 is an illustration showing an example of a timing of each operation performed in the first and the second embodiments of the present invention;

FIG. 44 is an illustration showing an example of a timing of each operation performed in the first and the second embodiments of the present invention;

FIG. 45 is an illustration showing an example of a timing of each operation performed in the first and the second embodiments of the present invention; and FIG. 46 is an illustration showing an example of a timing of each operation performed in the third embodiment of the present invention.

DETAILED DESCRIPTION OF THE PREFERRED EMBODIMENTS

A description will now be given, with reference to the drawings, of embodiments of an image processing apparatus according to the present invention.

Figure 1:
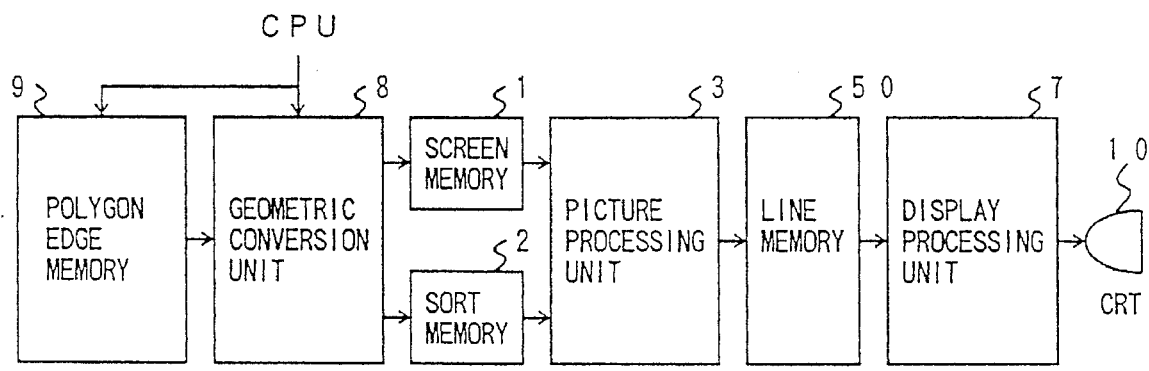
FIG. 1 is a block diagram of a three-dimensional image processing apparatus according to the present invention.

FIG. 1 is a block diagram of a three-dimensional image processing apparatus according to the present invention. This apparatus is suitable for game machines such as a racing game machine or a game machine which simulates the operation of an airplane.

In the image processing apparatus shown in FIG. 1, simulation picture information supplied by a CPU of a game machine is supplied to a polygon edge memory 9 as information of a plurality of polygons. The CPU converts the shape of any object into an assembly of a plurality of polygons. The CPU then reads out data from a world memory (not shown in the figure) in which data for edge information of the polygons and data for edge information of a mapping memory provided with patterns and color information are stored. The CPU then computes condition data in accordance with electric signals input by an operational unit of the game machine, which operational unit comprises a control unit such as a controller which is operated by a player of the game machine (not shown in the figure), and then supplies the condition data to a geometric conversion unit 8.

The geometric conversion unit 8 then reads out data from the polygon edge memory 9 with reference to polygon data stored in the world memory in accordance with a command sent by the CPU. Coordinate values of edge points of each polygon are then geometrically converted by a sight conversion method or a perspective projection conversion method, and their X-Y two-dimensional coordinates are stored in a screen memory 1. Additionally, a sight converted representative value of the center of each of the polygons, which value is a representative value (Z value) of a distance from a view point, is determined, and then the representative values are arranged so that a polygon having a representative value smaller than a value of another polygon has a higher priority than the other polygon, and a polygon number is supplied to a sort memory 2.

Edge point information of each of the polygons, which is computed into two-dimensional coordinates, is stored in the screen memory 1. The screen memory 1 includes attribute data such as color information of R, G and B respectively corresponding to each of the polygon edge points.

Data in the sort memory 2 is sorted in accordance with the priority (Z value) determined by the Z value of the center of each polygon, and polygon addresses are stored in an order starting from the smallest Z value. A picture processing unit 3 reads out polygon edge information from the screen memory 1 in accordance with the order of priority (sort address) of polygons stored in the sort memory 2, and then computes an X start point and an X end point for every scan line from a Y start point to a Y end point (Y address). The details of the picture processing unit 3 will be described later.

A line memory 50, formatted as shown in FIG. 13C, stores X addresses for right sides and left sides of each polygon, that is, data for an X starting point and X end point and attribute data thereof, which polygon is to. be displayed by the picture processing unit 3.

The data from the line memory 50 is transferred to a display processing unit 7, the display processing unit 7 outputting polygon data as a form of dot data by synchronizing the dot data with scan lines of a CRT 10.

Figure 2:
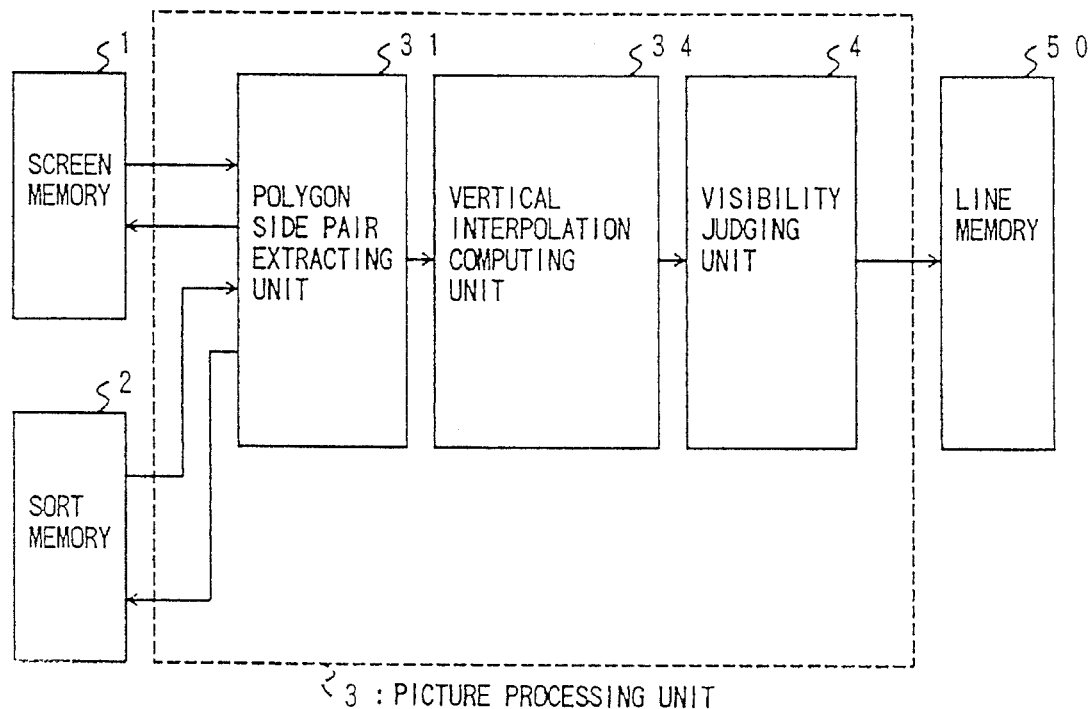
FIG. 2 is a block diagram of a picture processing unit of a first embodiment according to the present invention.

A description will now be given, with reference to FIG. 2 to FIG. 20, of an image processing unit of a first embodiment according to the present invention. FIG. 2 is a block diagram of the picture processing unit 3 which is an essential part of the first embodiment according to the present invention.

A pair of polygon sides (hereinafter referred to as polygon side pair) extracting unit 31 reads out from the screen memory 1 data of the edge point of the polygon corresponding to data read out from the sort memory 2. The polygon side pair extracting unit 31 applies a simple clipping process on the data corresponding to a polygon which extends out of the display screen, and then selects polygon edge information corresponding to each side of the polygon.

The polygon side pair extracting unit 31 computes, based on information of a side of the polygon, each side pair data which corresponds to a pair of edges on a scan line, and sends the resultant side pair data to a vertical interpolation computing unit 34.

The vertical interpolation computing unit 34 computes, based on equations described below, data for an X left intersection XL and an X right intersection XR on a scan line by using the data supplied by the polygon side pair extracting unit 31. The resultant data is sent to a visibility judging unit 4 and then only data for a visible polygon is sent to the line memory 50.

The polygon side pair extracting unit 31, the vertical interpolation computing unit 34 and the visibility judging unit 4 are controlled by a plurality of controllers. These controllers control each unit in accordance with routines shown by flow charts in FIGS. 14A to 20.

Figure 3:
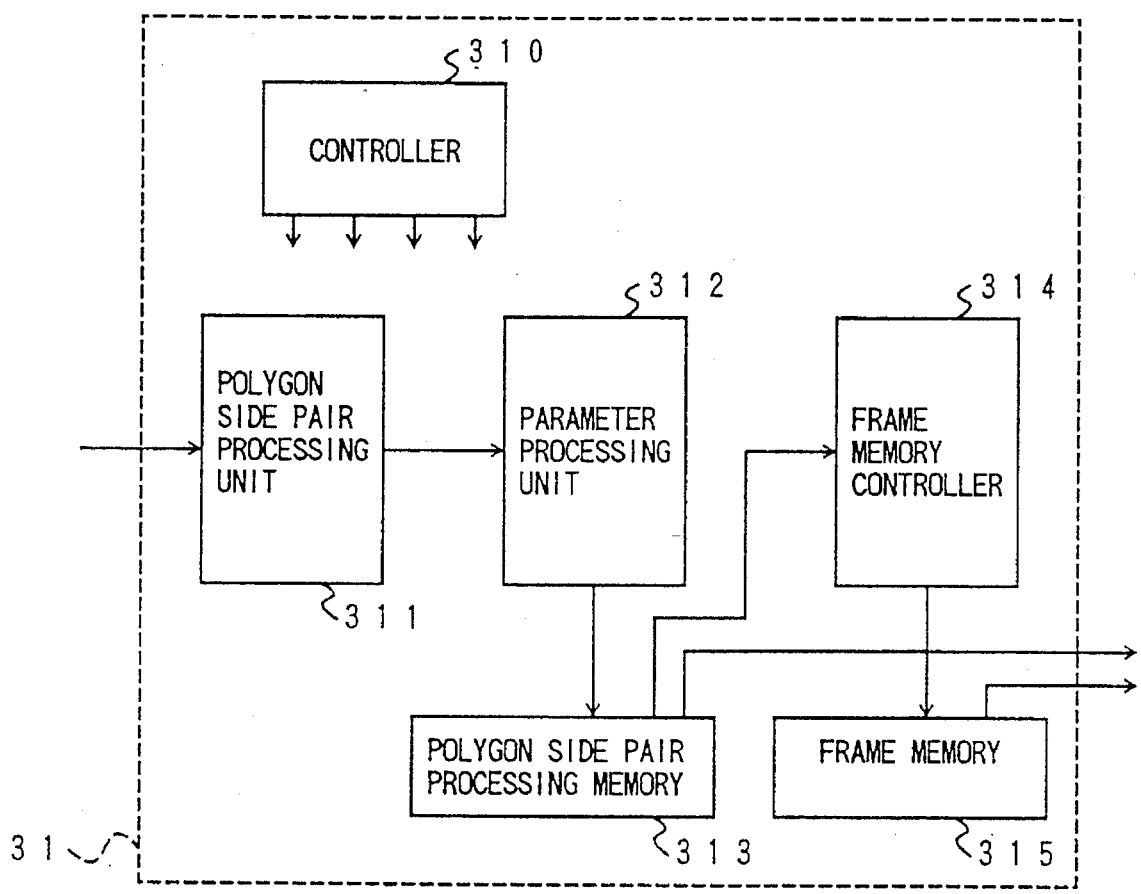
FIG. 3 is a block diagram of a polygon side pair extracting unit of the first embodiment according to the present invention.

A description will now be given, with reference to FIG. 3, of a structure of the polygon side pair processing unit 31.

Data sent by the screen memory 1 is supplied to a polygon side pair processing unit 311. The polygon side pair processing unit 311 includes a clipping circuit which eliminates polygon edge data corresponding to a polygon positioned outside the screen, which edge data is read out from the screen memory 1, so as to eliminate polygons shown in FIG. 40. As a result, only polygons positioned inside the screen are processed.

Figure 37:
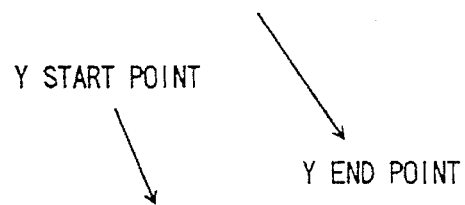
FIG. 37 is an illustration showing a relationship between a Y start point and a Y end point of a polygon side pair.
Figure 38A:
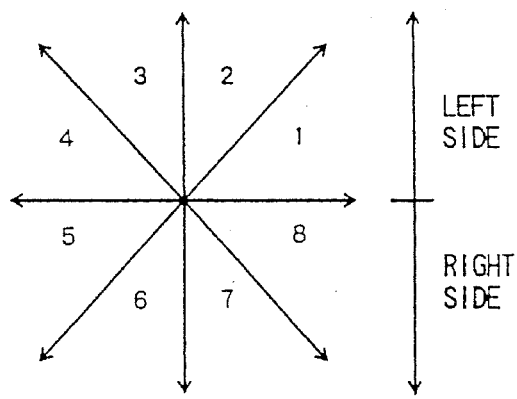
FIGS. 38A and 38B are illustrations showing regions of line vectors.
Figure 38B:
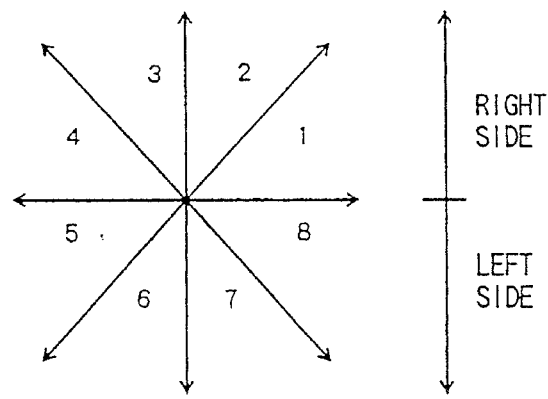

The polygon side pair processing unit 311 converts the polygon edge data, which has not been eliminated by the clipping circuit, into a formatted data comprising a start point and an end point (XLS, XLE), (XRS, XRE). Then a vector corresponding to a polygon side is computed based on the start point XL and the end point XR so as to determine a direction in which the polygon side extends. If a series of the vectors of the polygon side indicate a clockwise direction, a polygon side whose vector falls in areas 1–4 shown in FIG. 38A is classified as being a left side and a polygon side whose vector falls in areas 5–8 is classified as being a right side. If a series of the vectors of the polygon side indicate a counterclockwise direction, a polygon side whose vector falls in areas 1–4 shown in FIG. 38B is classified as being a right side and a polygon side whose vector falls in areas 5–8 is classified as being a left side. Then, as shown in FIG. 37, a Y start point (YSS) and a Y end point (YEE) are obtained in accordance with a left side and a right side, which sides form a polygon side pair.

The polygon edge data classified as being a left side or a right side is then sent to a parameter processing unit 312. In the parameter processing unit 312, inclination data DDXL, DDXR of each polygon side is computed based on the start point address and the end point address (XLS, XLE), (XRS, XRE).

Figure 39A:
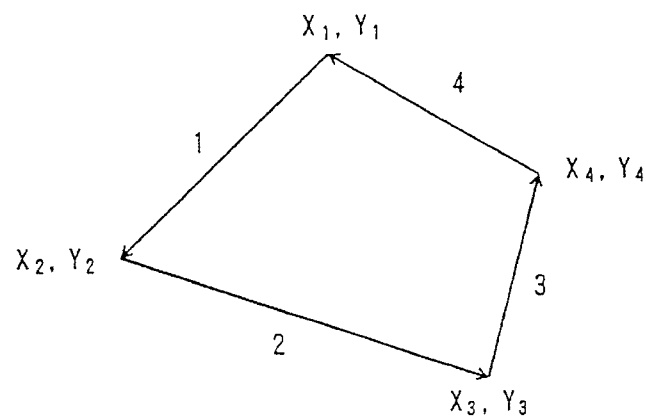
FIG. 39A is an illustration showing an example of a polygon.
Figure 39B:
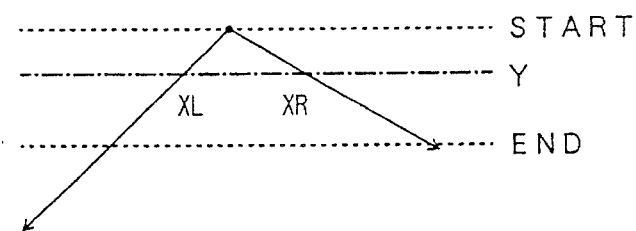
FIGS. 39B, 39C and 39D are illustrations showing a kind of polygon side pair.
Figure 39C:
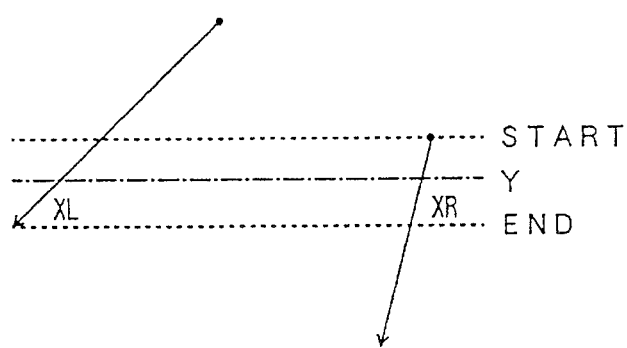
Figure 39D:
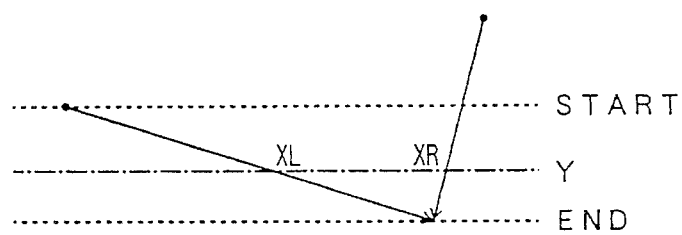

In the parameter processing unit 312, parameters of the polygon side pairs shown in FIGS. 39B, 39C and 39D of a polygon shown in FIG. 39A, for example, are computed by using the following equations.

In the case of FIG. 39B:

$$DDXL = \frac{X2 - X1}{Y2 - Y1} \qquad DDXR = \frac{X4 - X1}{Y4 - Y1}$$

In the case of FIG. 12C:

$$DDXL = \frac{X2 - X1}{Y2 - Y1} \qquad DDXR = \frac{X3 - X4}{Y3 - Y4}$$

In the case of FIG. 12D:

$$DDXL = \frac{X3 - X2}{Y3 - Y2} \qquad DDXR = \frac{X3 - X4}{Y3 - Y4}$$

The parameter processing unit 312 sends to a polygon side pair memory 313 the obtained inclination data DDXL, DDXR, the start point data XLS, XLE and the end point data XRS, XRE of the polygon pair, the Y start point data YSS, the Y end point data YEE, and attribute data. The above data is stored in the polygon side pair memory 313 in accordance with addresses read out by the sort memory 2 in the order of the Z values, as shown in FIG. 13A.

Figure 8:
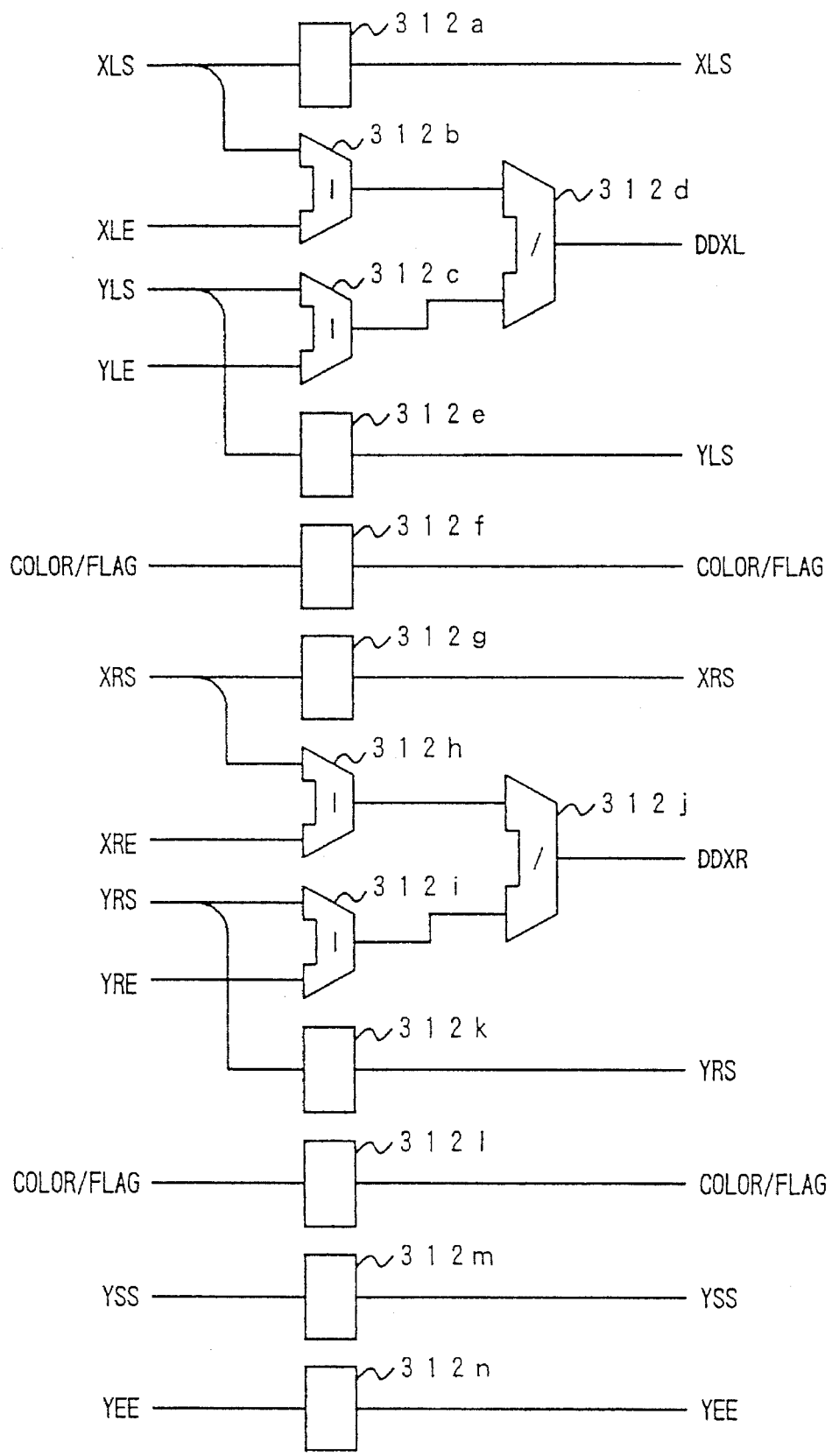
FIG. 8 is a block diagram of an embodiment of a parameter processing unit shown in FIG. 5B.
Figure 9:
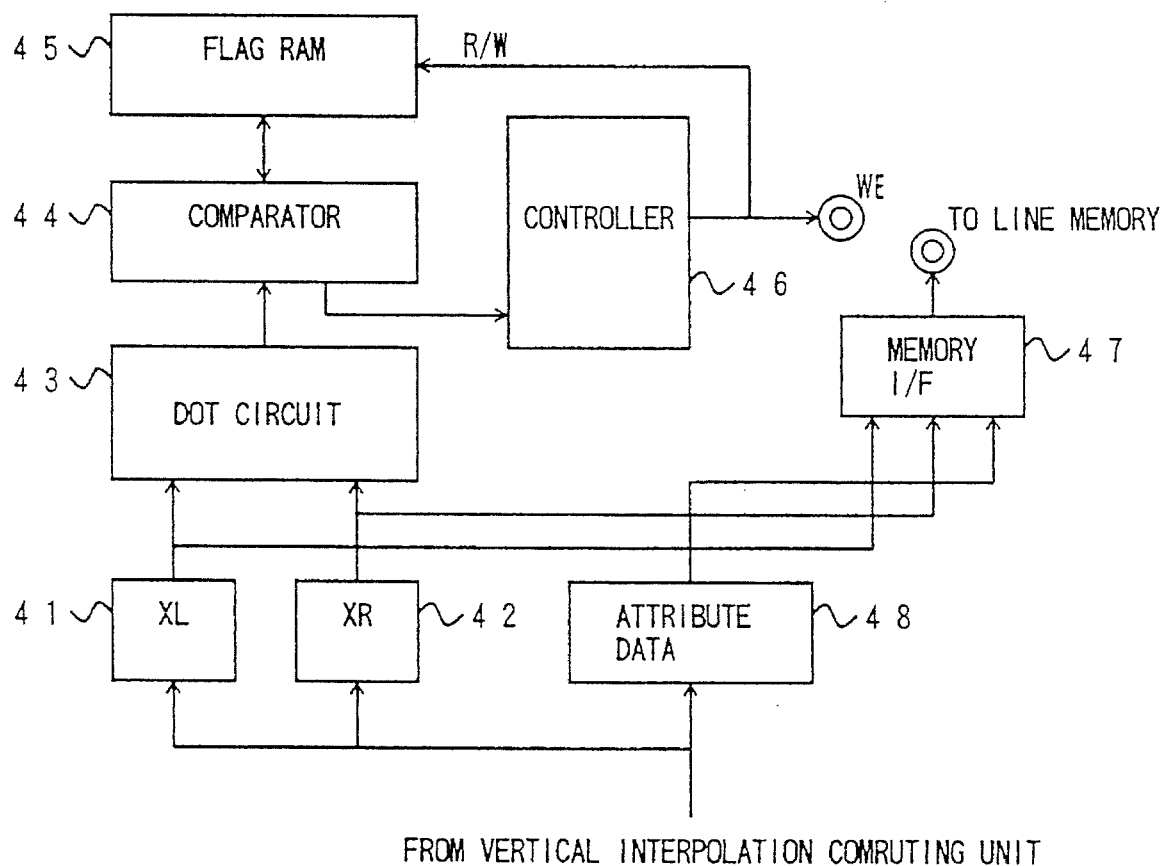
FIG. 9 is a block diagram of a visibility judging unit shown in FIG. 5B.

FIG. 8 shows a specific structure of the parameter processing unit 312. As shown in the figure, the start point address data (XLS, XRS) is supplied to and stored in registers 312a and 312g, respectively, and also supplied to an input of subtracters 312b and 312h, respectively. Another input of the subtracters 312b and 312h is supplied with the end point address data (XLE, XRE) of the polygon side pair, respectively.

Additionally, the start point address data (YLS, YRS) of the polygon side pair supplied by the polygon side pair processing unit 311 is stored in registers 312e and 312k, respectively, and supplied to an input of subtracters 312c and 312i, respectively. Another input of the subtracters 312c and 312i is supplied with the end point address data (YLE, YRE) of the polygon side pair, respectively.

Outputs of the subtracters 312b and 312c are supplied to dividers 312d, and the divides 312d outputs an inclination data DDXL. Similarly, outputs of the subtracters 312h and 312i are supplied to a divider 312j, the divider 312j then outputting an inclination data DDXR.

The Y start point data YSS and the Y end point data YEE are supplied to registers 312m and 312n, respectively. The attribute data (such as color information) is supplied to registers 312f and 312l. These data are output to the polygon side pair memory 313 as a parameter to be stored.

The data stored in the polygon side pair memory 313 is sent to a frame memory controller 314 and the vertical interpolation computing unit 34.

The frame memory controller 314 receives Y start point data YSS and Y end point data YEE, which correspond to Y values obtained in the polygon side pair processing unit 311, the data being shown in FIGS. 39B, 39C and 39D. The frame memory controller 314 controls to write addresses of the polygon side pair memory 313 so that the addresses are written in the memory 313 in accordance with each scan line starting from Y start point to Y end point. In each scan line, the addresses are written in an order starting from higher priority, that is, an order obtained from the sort memory 2.

Figure 7:
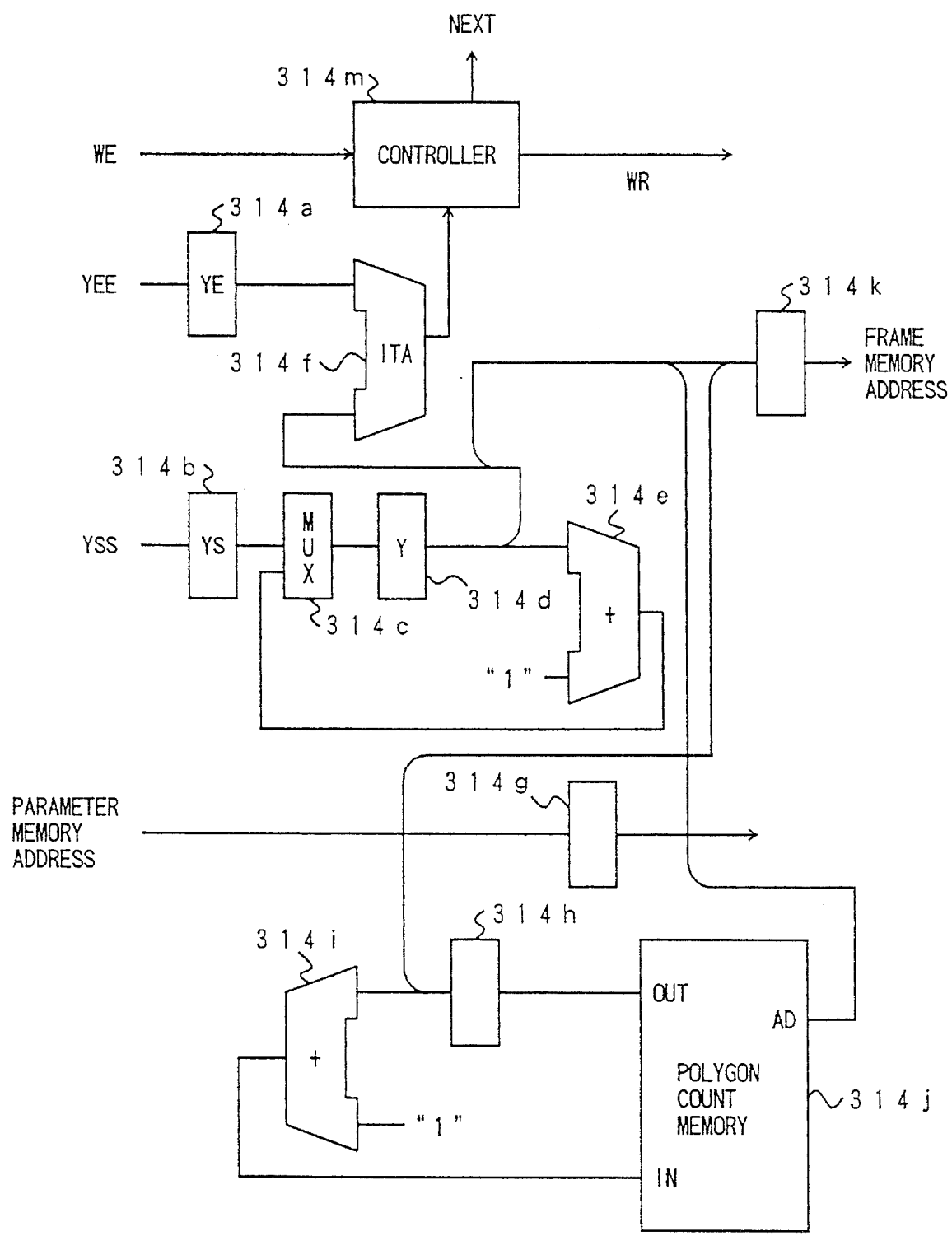
FIG. 7 is a block diagram of an embodiment of a frame memory controller shown in FIG. 5B.

FIG. 7 shows a specific circuit structure of the frame memory controller 314. As shown in FIG. 7, the Y values YSS, YEE corresponding to the Y start point and the Y end point obtained from the polygon side pair processing unit 311 are supplied to registers 314b and 314a, respectively. The value YSS in the register 314b is sent to and stored in a Y register 314d via a multiplexer 314c.

The polygon count memory 314j stores a number of polygons crossed by each scan line. In accordance with the YSS obtained from the register 314d, a number of data in the polygon count memory 314j, that is, the number of polygons crossed by a Y scan line, is read out. The data of the Y register 314d is temporarily stored in a register 314h, and then supplied to a register 314k. The data in the polygon counter 314j, which data corresponds to a number of polygons crossed by each Y scan line, is also supplied to the register 314k. The register 314k combines the data from register 314h, to obtain a higher value, and the data from the polygon counter 314j, to obtain a lower value, so as to provide a frame memory address.

A controller 314m judges whether or not the WE signal is turned on. If the WE signal is turned on, the controller 314m sends a signal WR to the frame memory 315. The signal WR allows the memory address in the polygon side pair memory 313 to be written in the frame memory 315. In this embodiment, the signal WE is on while the polygon side pair extracting unit 31 is operating.

The value of the polygon count memory 314j is incremented by an incrementer 314i, the value being written in the polygon count memory 314j. The Y value of the register 314d is incremented by the incrementer 314e.

In a comparator 314f, it is judged whether or not the Y value is less than YEE. The resultant data is supplied to the controller 314m. The controller 314m sends a signal NEXT, when the Y value exceeds YEE, to the controller 310 in the polygon side pair extracting unit 31.

Figure 4:
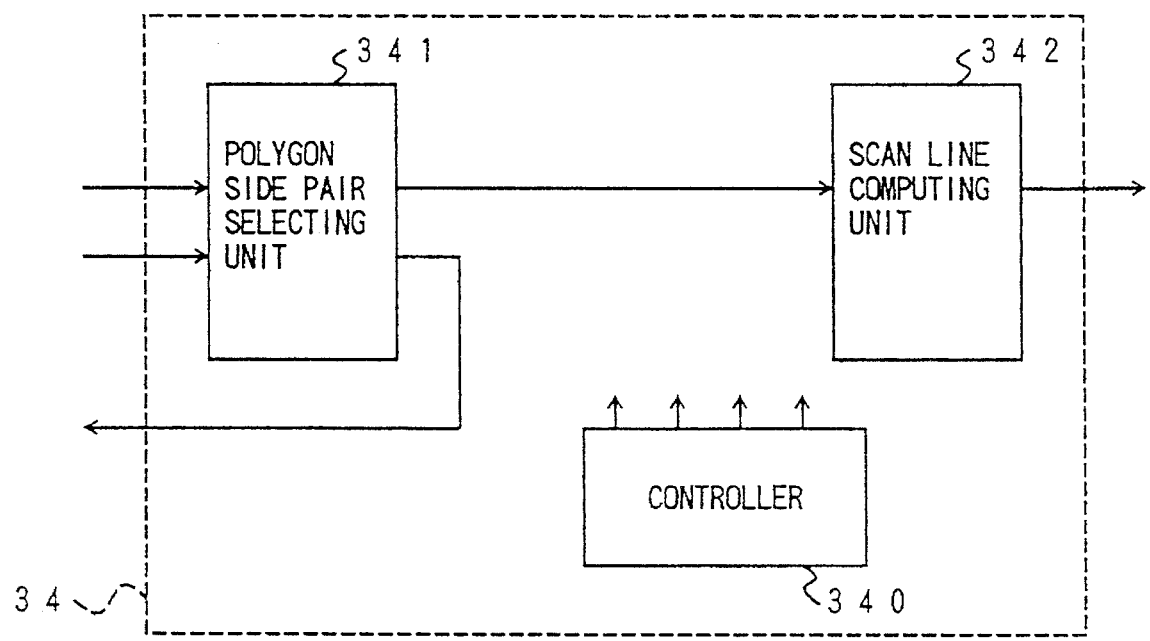
FIG. 4 is a block diagram of a vertical interpolation computing unit of the first embodiment according to the present invention.

FIG. 4 shows a specific structure of the vertical interpolation computing unit 34. A polygon side pair selecting unit 341 in the vertical interpolation computing unit 34 receives from the frame memory 315 an address of the polygon side pair memory 313 in accordance with each scan line. The polygon side pair selecting unit 341 also receives from the polygon side pair memory 313 a parameter corresponding to a side pair in the received address, and sends the address and the parameter to a scan line computing unit 342.

The scan line computing unit 342 computes X values of an X start point XL and an X end point XR, for example, in accordance with the following equations for a polygon side pair as shown in FIGS. 39B, 39C and 39D.

In the case of FIG. 39B:

$$XL=DDXL * (Y2-Y)+X1 \quad XR=DDXR * (Y4-Y)+X1$$

In the case of FIG. 39C:

$$XL=DDXL * (Y2-Y)+X1 \quad XR=DDXR * (Y3-Y)+X1$$

In the case of FIG. 39D:

$$XL=DDXL * (Y3-Y)+X1 \quad XR=DDXR * (Y3-Y)+X1$$

The scan line computing unit 342m computes XL and XR for each scan line from YSS to YEE, and sends the results to the visibility judging unit 4. The visibility judging unit 4 then sends data corresponding to a visible polygon to the line memory 50.

Figure 6:
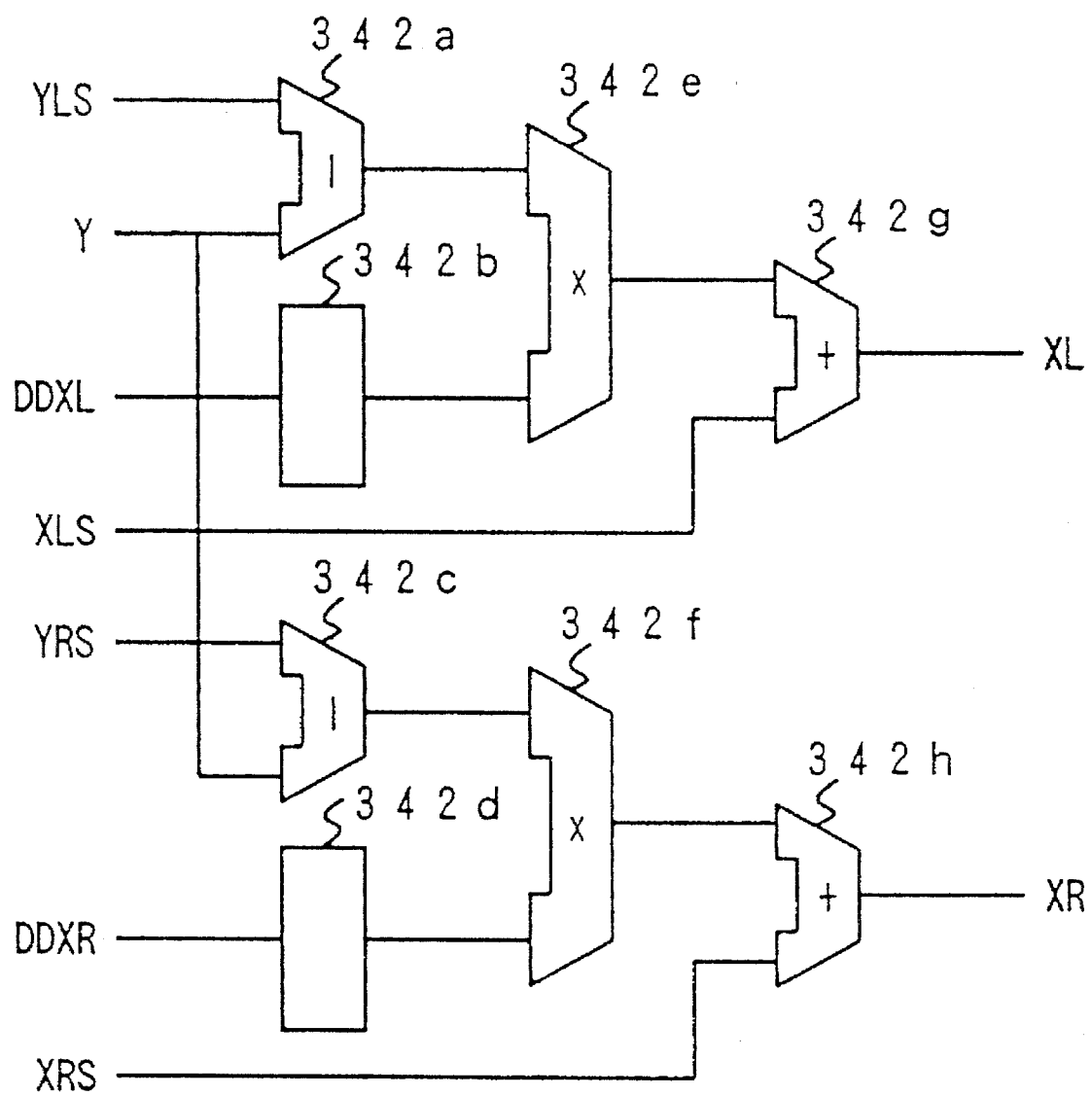
FIG. 6 is a block diagram of an embodiment of a scan line computing unit shown in FIG. 5B.

FIG. 6 shows a specific structure of the scan line computing unit 342. As shown in FIG. 6, the data DDXL, DDXR for an inclination of the polygon side, which data is supplied by the polygon side pair memory 313, is stored in registers 342b and 342d, respectively. The start address (YLS, YRS) is input to subtracters 342a and 342c, respectively. The subtracter 342a and 342c are also supplied with a scan line address value Y.

The results of operations of the subtracters 342a and 342c are supplied to multipliers 342e and 342f, respectively. The multipliers 342e and 342f are also supplied with DDXL and DDXR, respectively. The results of operations of the multipliers 342e and 342f are input to adders 342g and 342h, respectively. The adders 342g and 342h are also supplied with a start point address (XLS, XRS) of a polygon side pair. X start point data XL and X end point data XR are output from the adders 342g and 342h, respectively.

Figure 19:
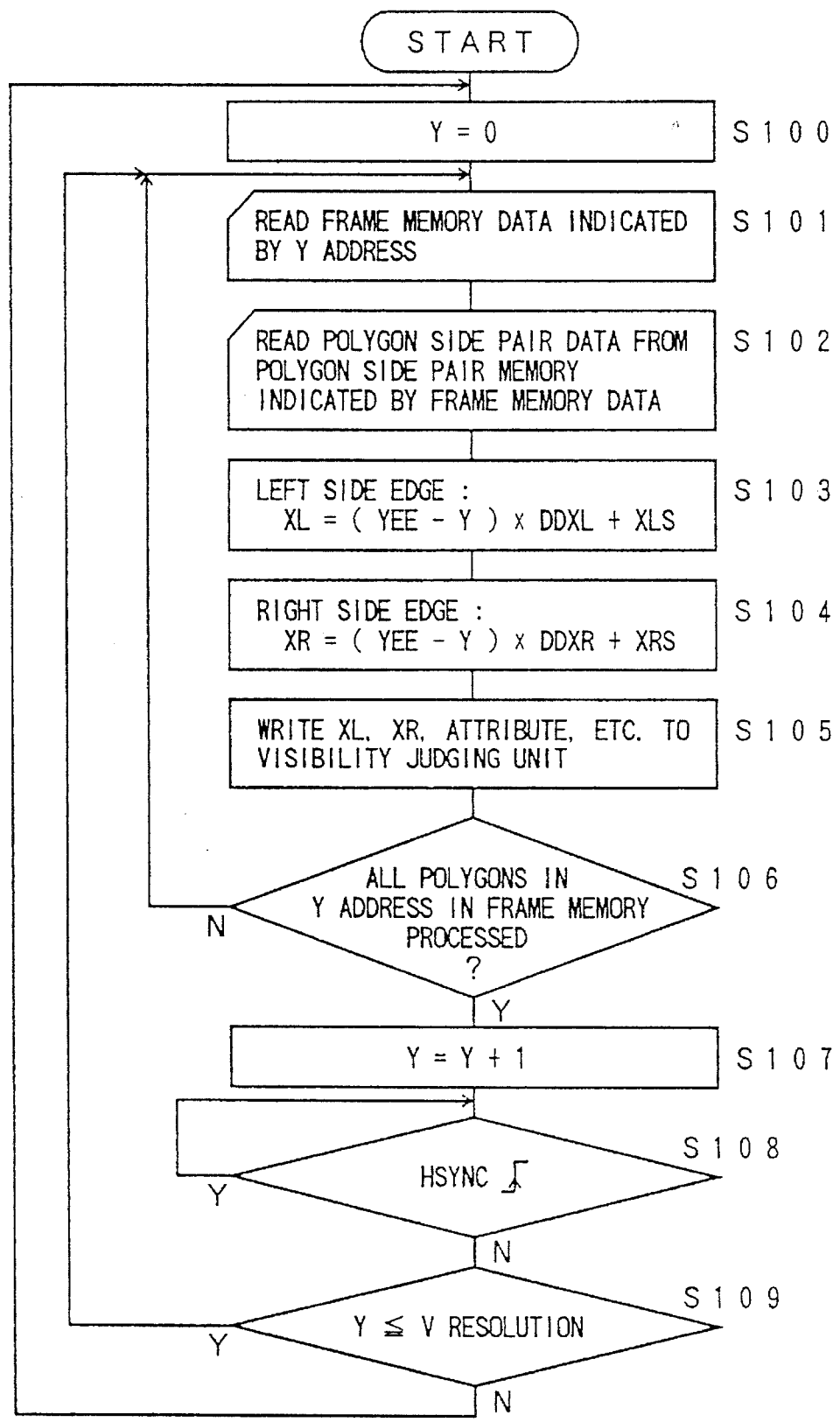
FIG. 19 is a flow chart for explaining an operation of the vertical interpolation computing unit of the first embodiment.

These units are controlled by a controller 340 which also controls a vertical interpolation computing operation in accordance with a routine shown in FIG. 19.

A description will now be given, with reference to FIGS. 9 to 12, of an embodiment of the visibility judging unit 4.

The X value XL of the left side of the polygon side pair and the X value XR of the left side thereof, which values are supplied by the scan line computing unit 342, are stored in registers 41 and 42, respectively. Then the X start point data and the X end point data are supplied to a dot circuit 43 from the register 41 and the register 42, respectively. The dot circuit 43 converts the data received from the registers 41 and 42 into dot data, and then supplies the dot data to a comparator 44. There can be a single dot or a plurality of dots in the dot data. The greater the number of dots, the smaller a capacity of a flag RAM 45, but the accuracy of visibility judging process is decreased. In the present embodiment, a two-dot conversion method is adopted.

The dot data from the dot circuit 43 is compared, by a comparator 44, with data in the flag RAM 45. That is, the comparator 44 compares the data from the dot circuit 43 with the dot data for a previously displayed polygon so as to determine whether or not the data is for a polygon to be displayed, and the results of the comparison are supplied to the controller 46. If it is determined that the data is for a polygon to be displayed, dot data, which is a result of an OR operation performed on the dot data of the flag RAM 45 and the dot data of the dot circuit 43, is stored in the flag RAM 45.

The flag RAM 45 stores the dot data of the polygon in a form shown in FIGS. 12A and 12B.

Figure 10:
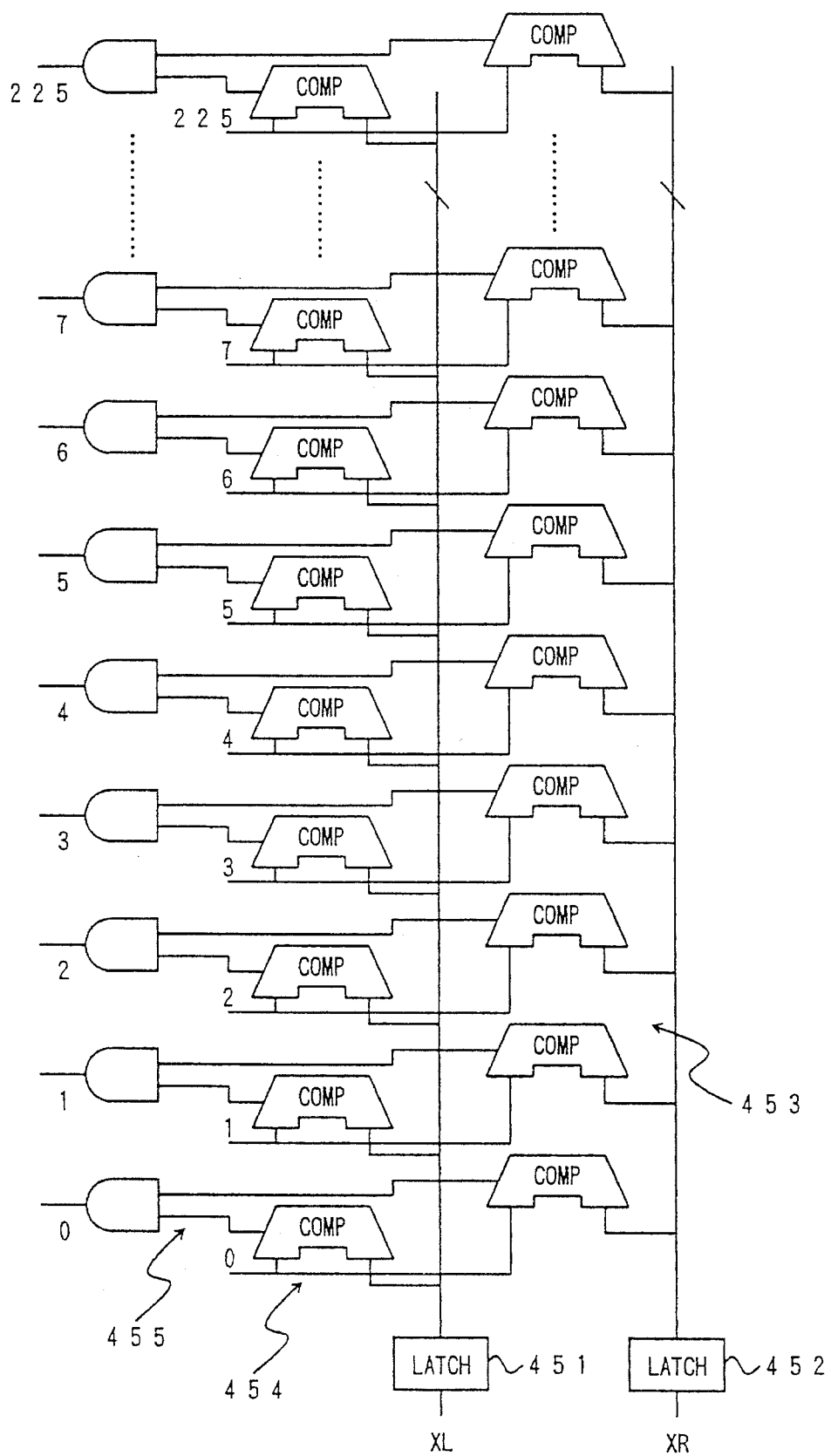
FIG. 10 is a circuit diagram of a dot circuit of the visibility judging unit shown in FIG. 9.

FIG. 10 shows an example of the dot circuit 43. In this example, an X axis of a screen is set to 512 dots, and the two-dot conversion method is adopted. Accordingly, groups of comparators 453 and 454 each include a total of 256 comparators.

An X start point data XL input by the XL register 41 is stored in a latch circuit 451, and an X end point data XR input by the XR register 42 is stored in a latch circuit 452. The X end point data XR is compared with values 0 to 255 by the group of comparators 453, and when the value is equal to or smaller than XR, a value "1" is sent to a group of AND circuit 455. The X start point data XL is compared with values 0 to 255 by the group of comparators 454, and when the value is equal to or greater than XS, a value "1" is sent to a group of AND circuits 455. As a result, an output of the group of AND circuits becomes dot data as shown in FIG. 20A.

Figure 11:
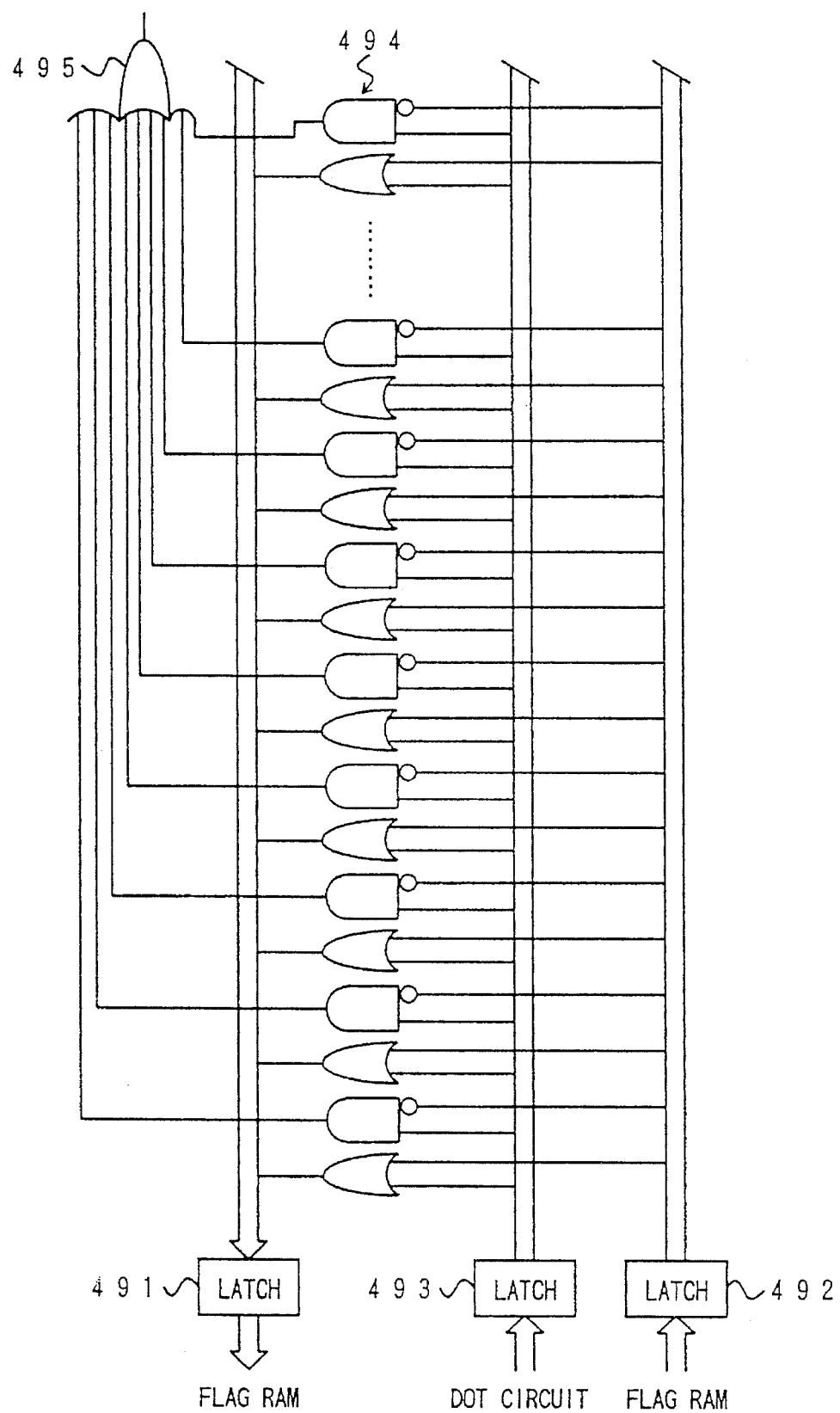
FIG. 11 is a circuit diagram of a comparator of the visibility judging unit shown in FIG. 9.
Figure 14A:
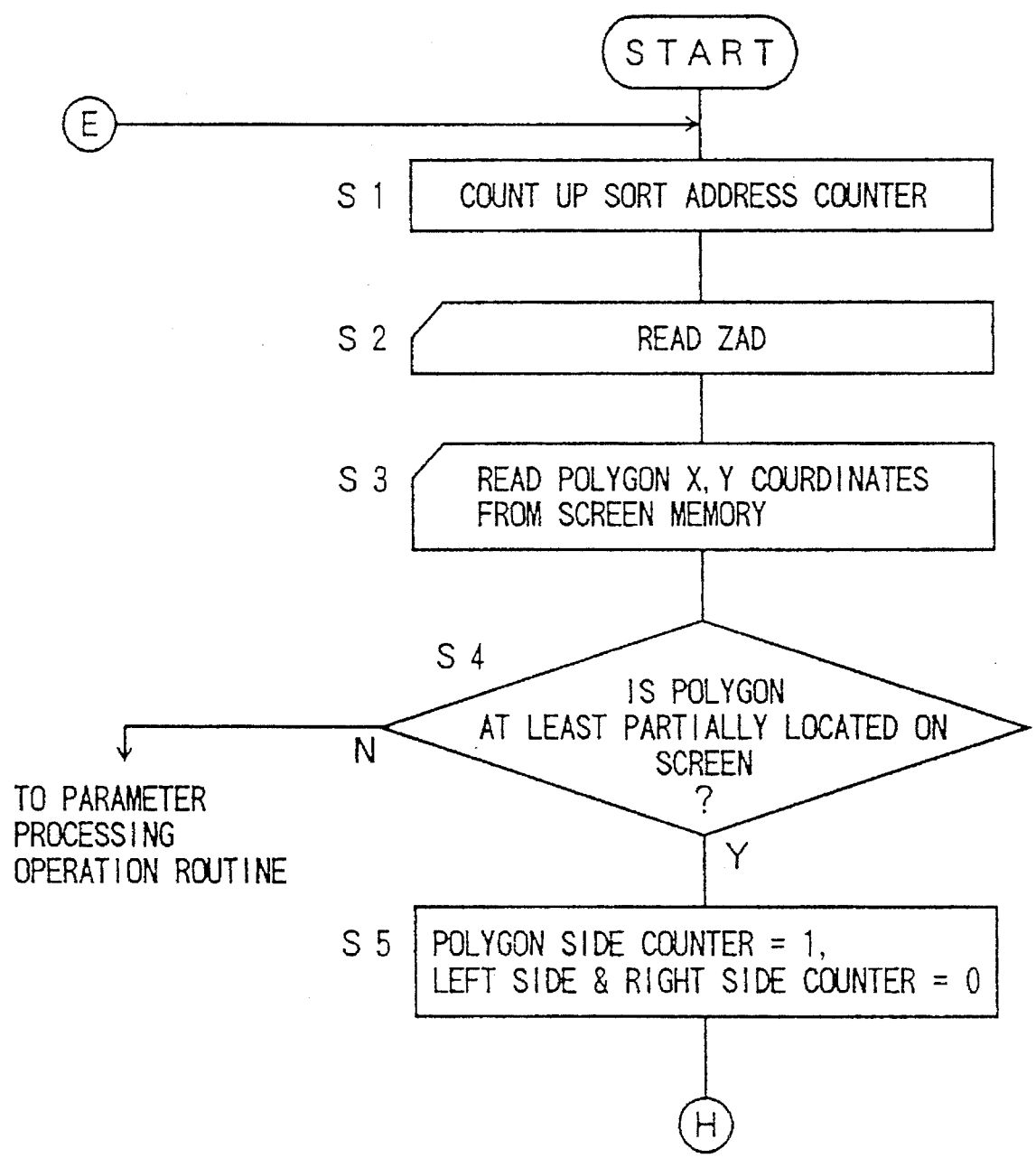
FIGS. 14A and 14B are parts of a flow chart for explaining an operation of a picture processing unit of the first embodiment according to the present invention.
Figure 14B:
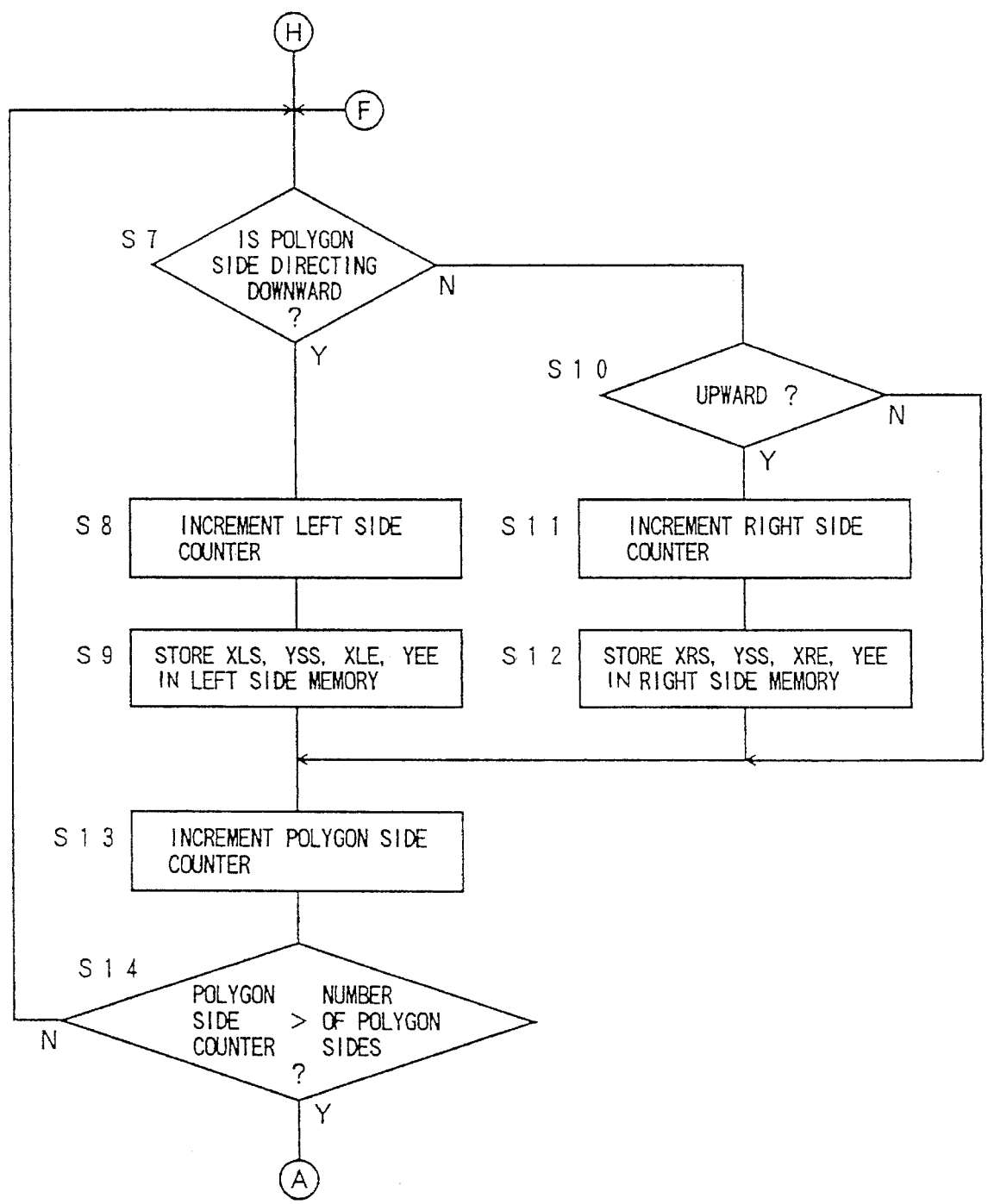
Figure 15A:
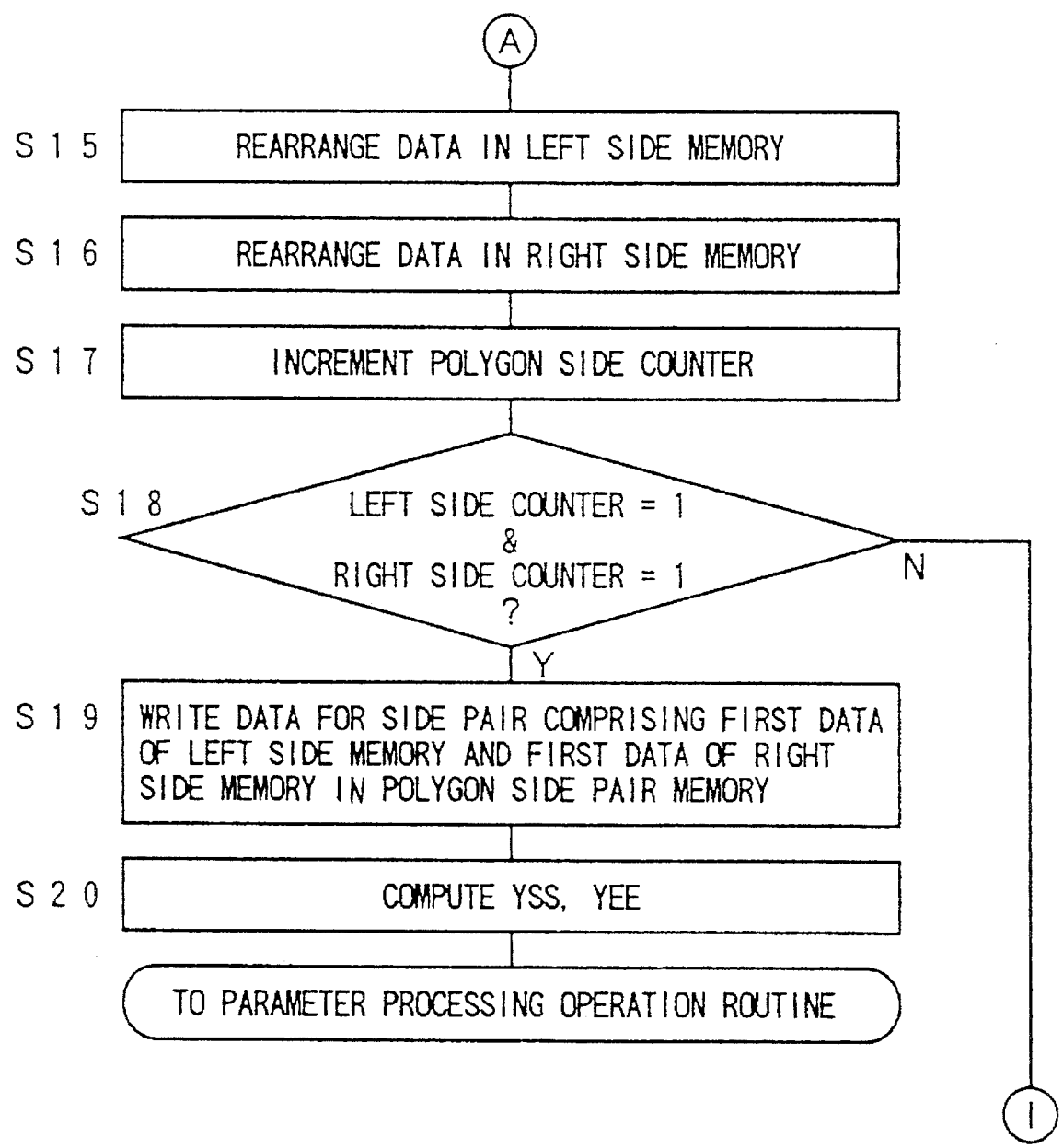
FIGS. 15A, 15B and 15C are parts of the flow chart for explaining the operation of the picture processing unit of the first embodiment.
Figure 15B:
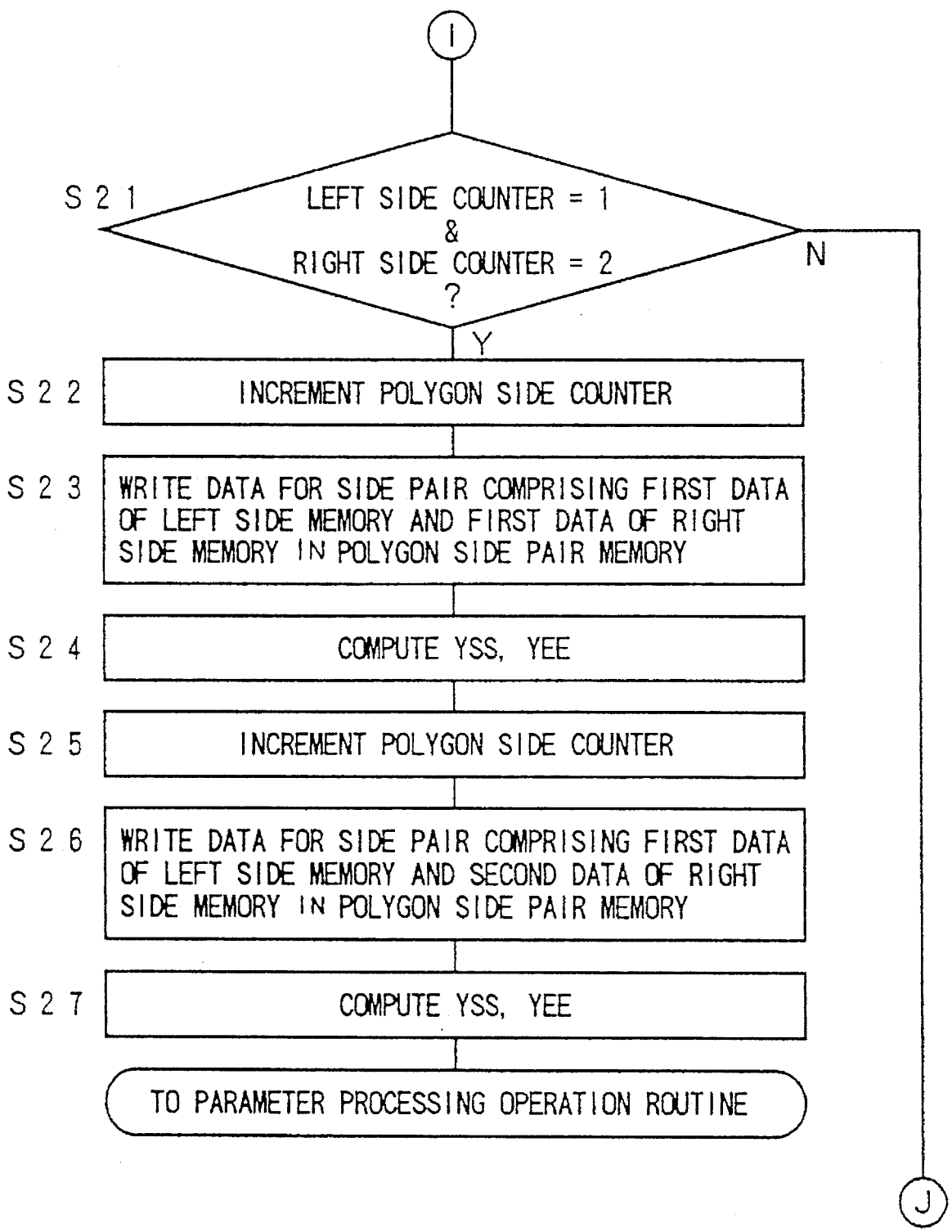
Figure 15C:
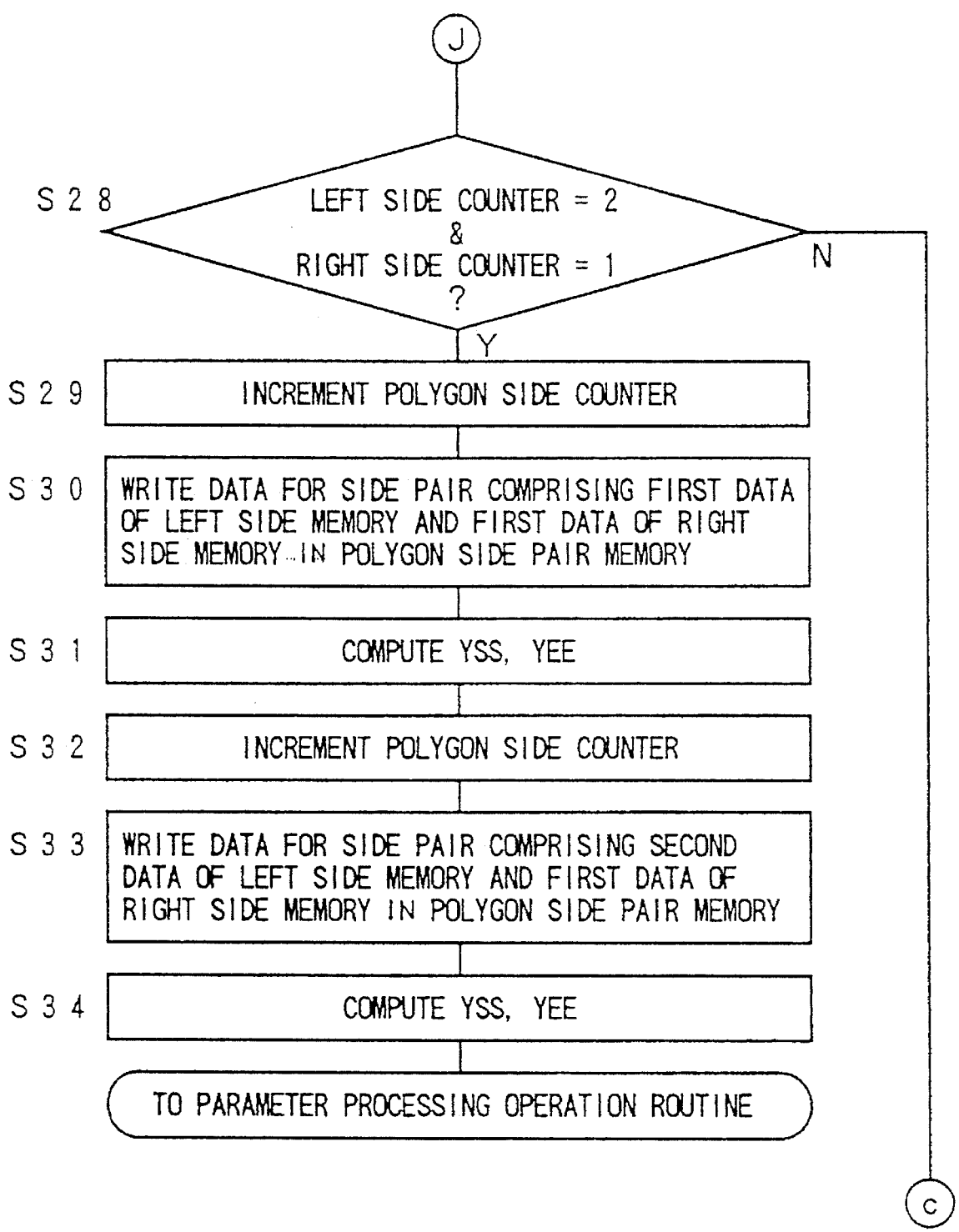
Figure 16A:
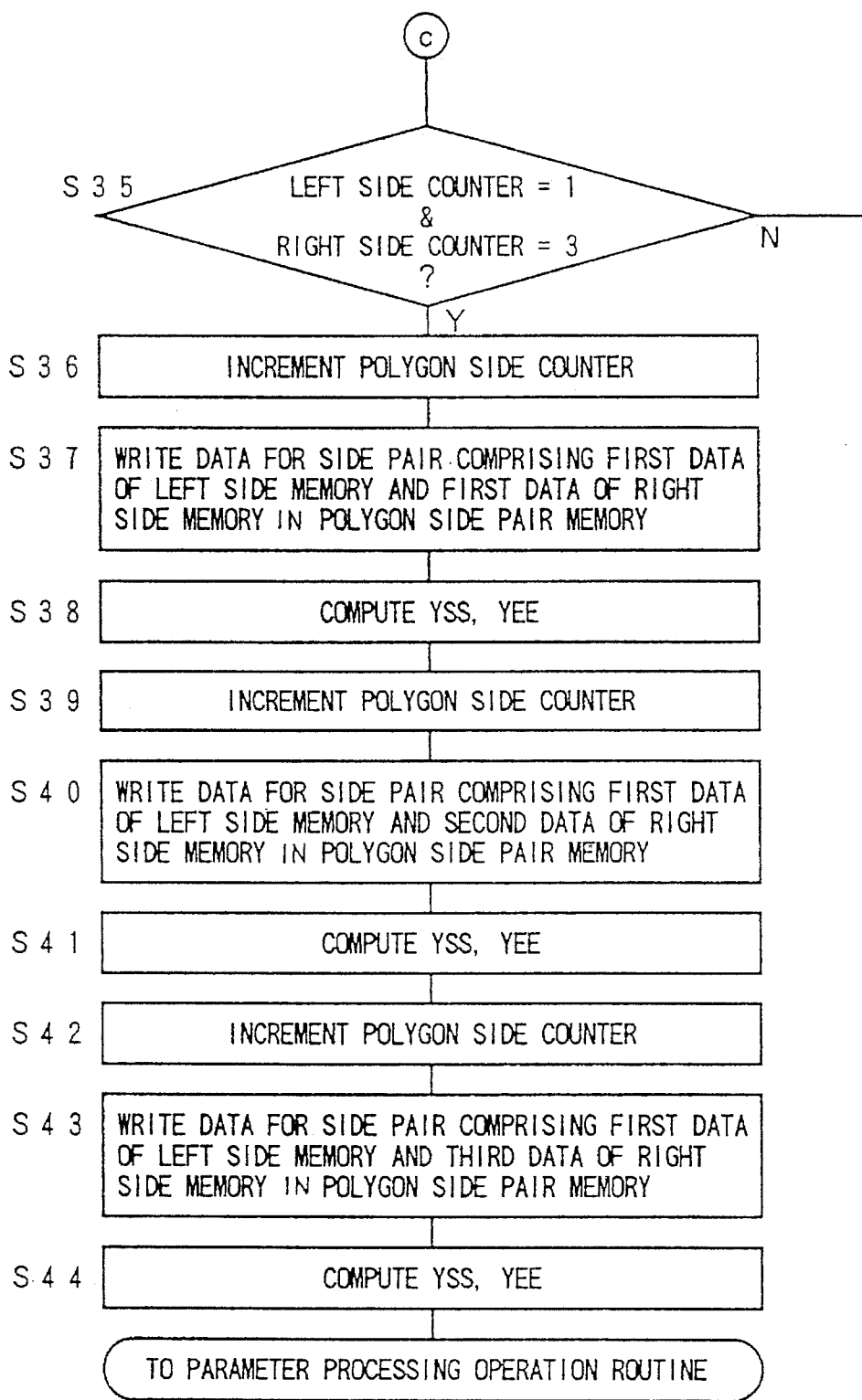
FIGS. 16A, 16B and 16C are parts of the flow chart for explaining the operation of the picture processing unit of the first embodiment.
Figure 16B:
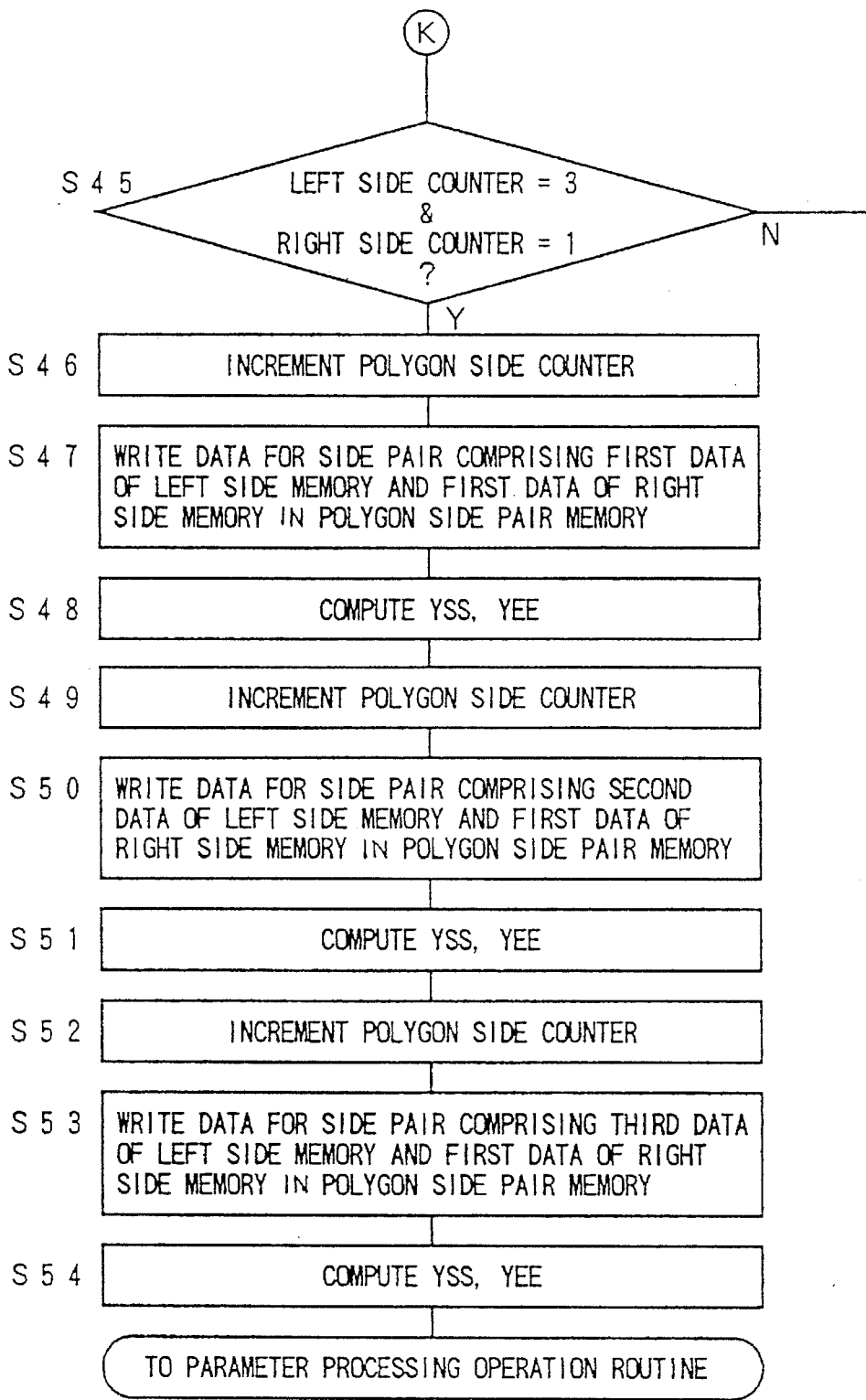
Figure 16C:
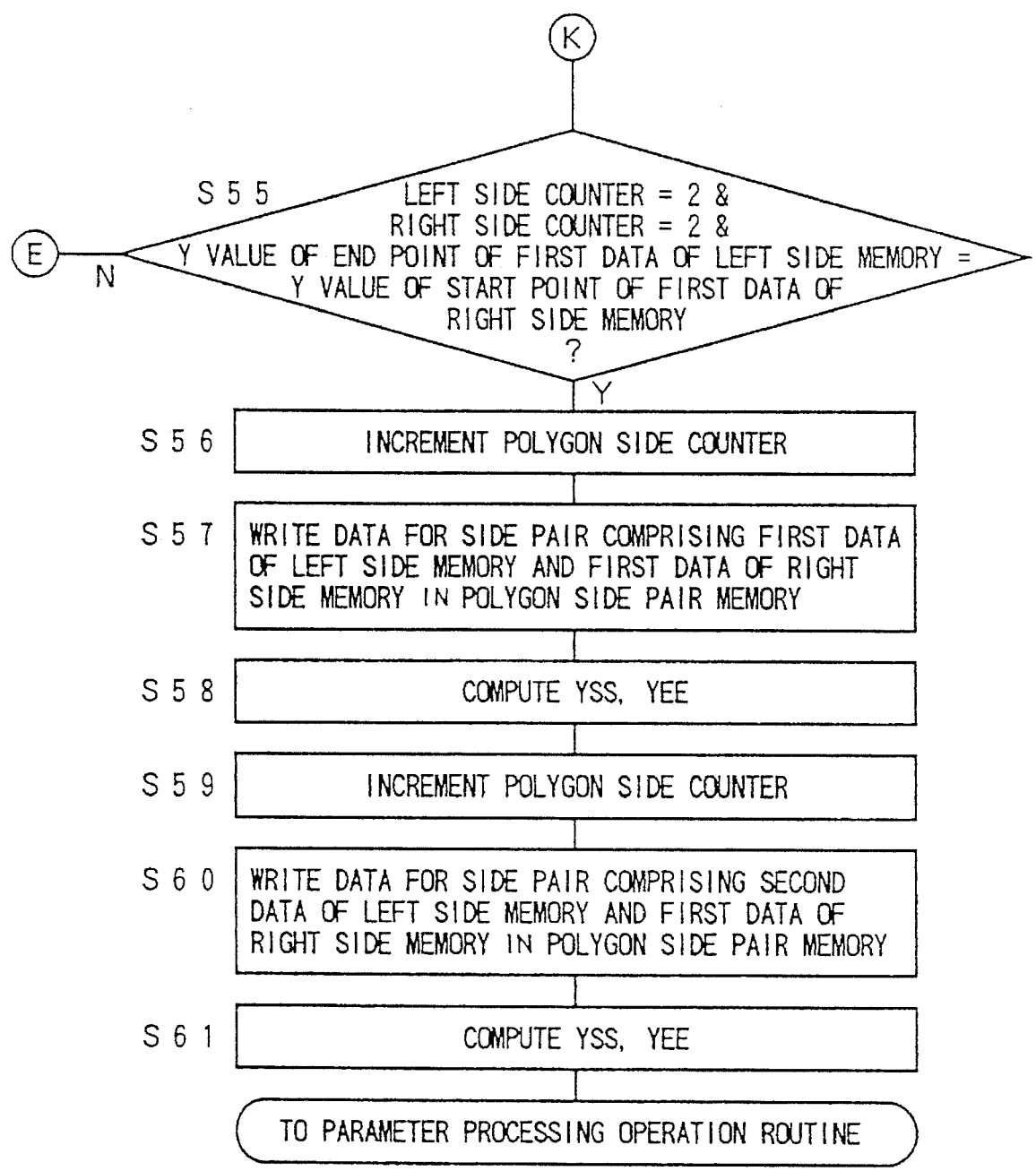
Figure 17A:
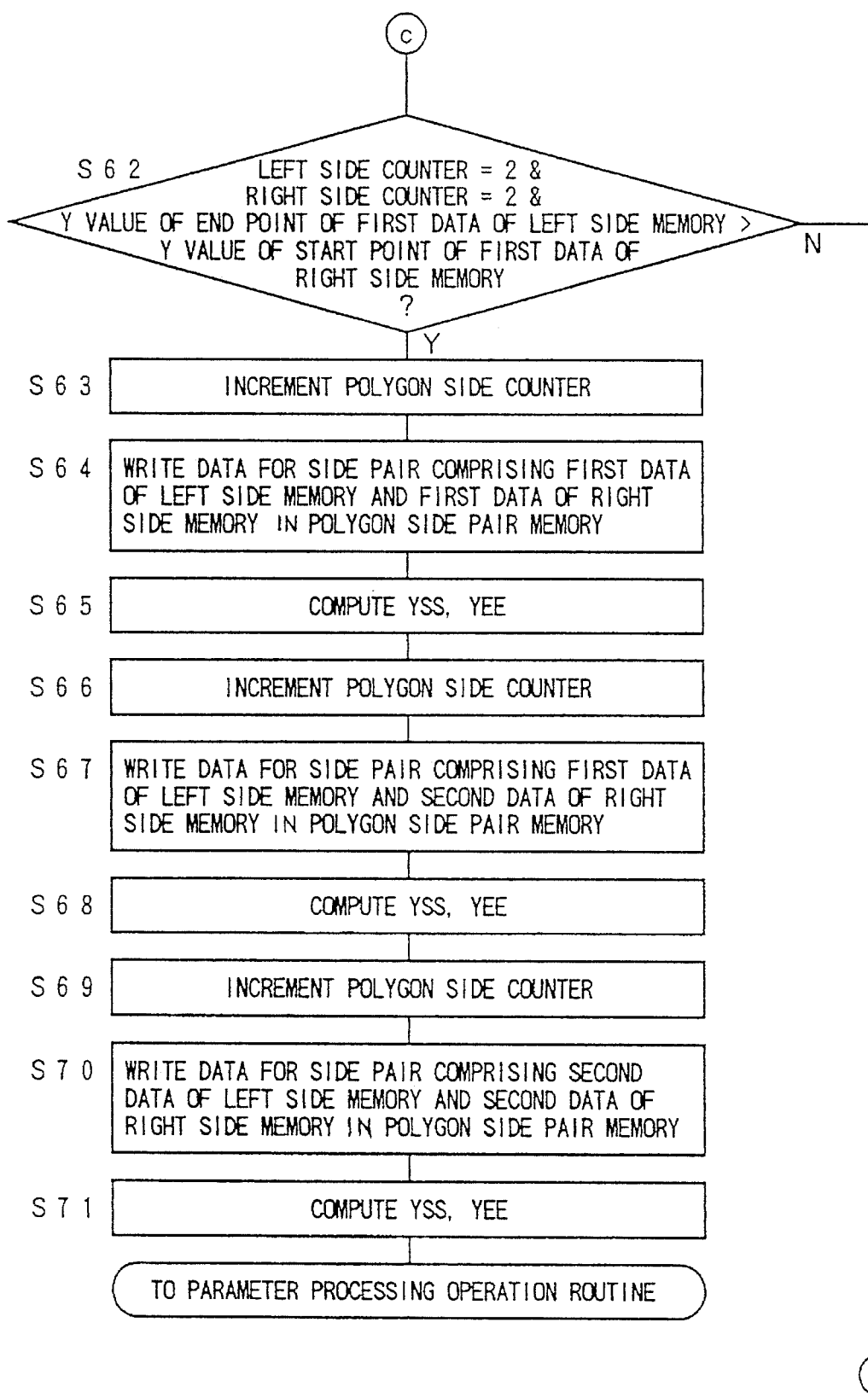
FIGS. 17A and 17B are parts of the flow chart for explaining the operation of the picture processing unit of the first embodiment.
Figure 17B:
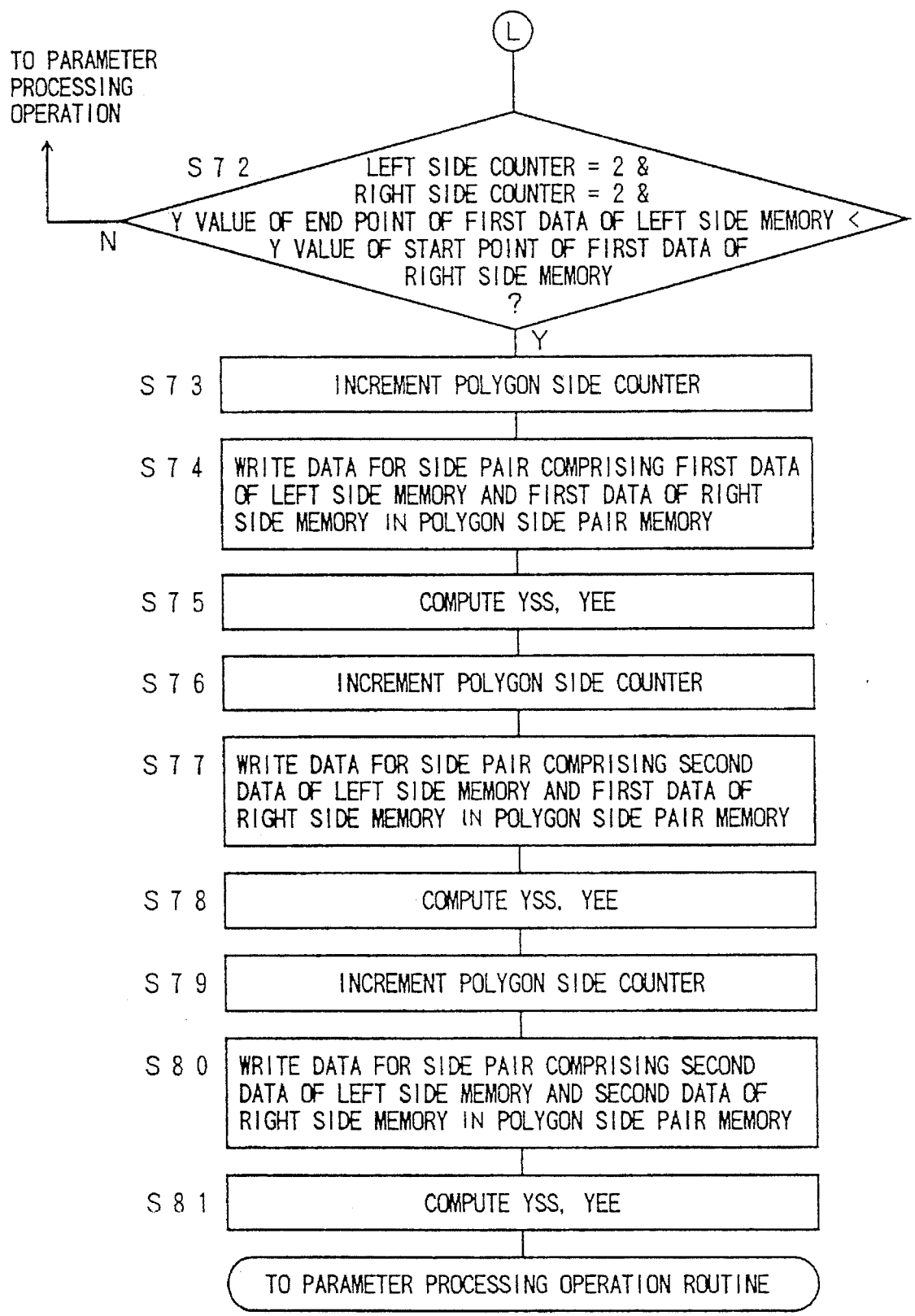

FIG. 11 shows an example of the comparator 49. This example adopts a two-dot conversion method similar to the above-mentioned example.

Data from the dot circuit 43 is stored in a latch circuit 493, and data from the flag RAM 45 is stored in a latch circuit 492.

The data stored in the latch circuits 492 and 493 is supplied to a group of AND/OR circuits 494. That is, a reversed data of the flag RAM 45 and data from the dot circuit 43 are supplied to an AND circuit, and then the data from the flag RAM 45 and the data from the dot circuit 43 are supplied to an OR circuit. An output from each of the AND circuits is then supplied to an OR circuit 495. When at least one of the outputs from the AND circuit in the group 494 is "1", the OR circuit 495 sends a signal to the controller 46 so that the polygon intersection pair is displayed because the polygon intersection pair is displayed by means of more than one dot. If there is no "1" among any output from the AND circuit in the group of AND/OR circuits 494, a signal is supplied to the controller 46 so that the polygon intersection pair is not displayed. The controller 46 sends the signal WE to the line memory so that data for only visible polygons is written in the line memory 50.

Figure 5A:
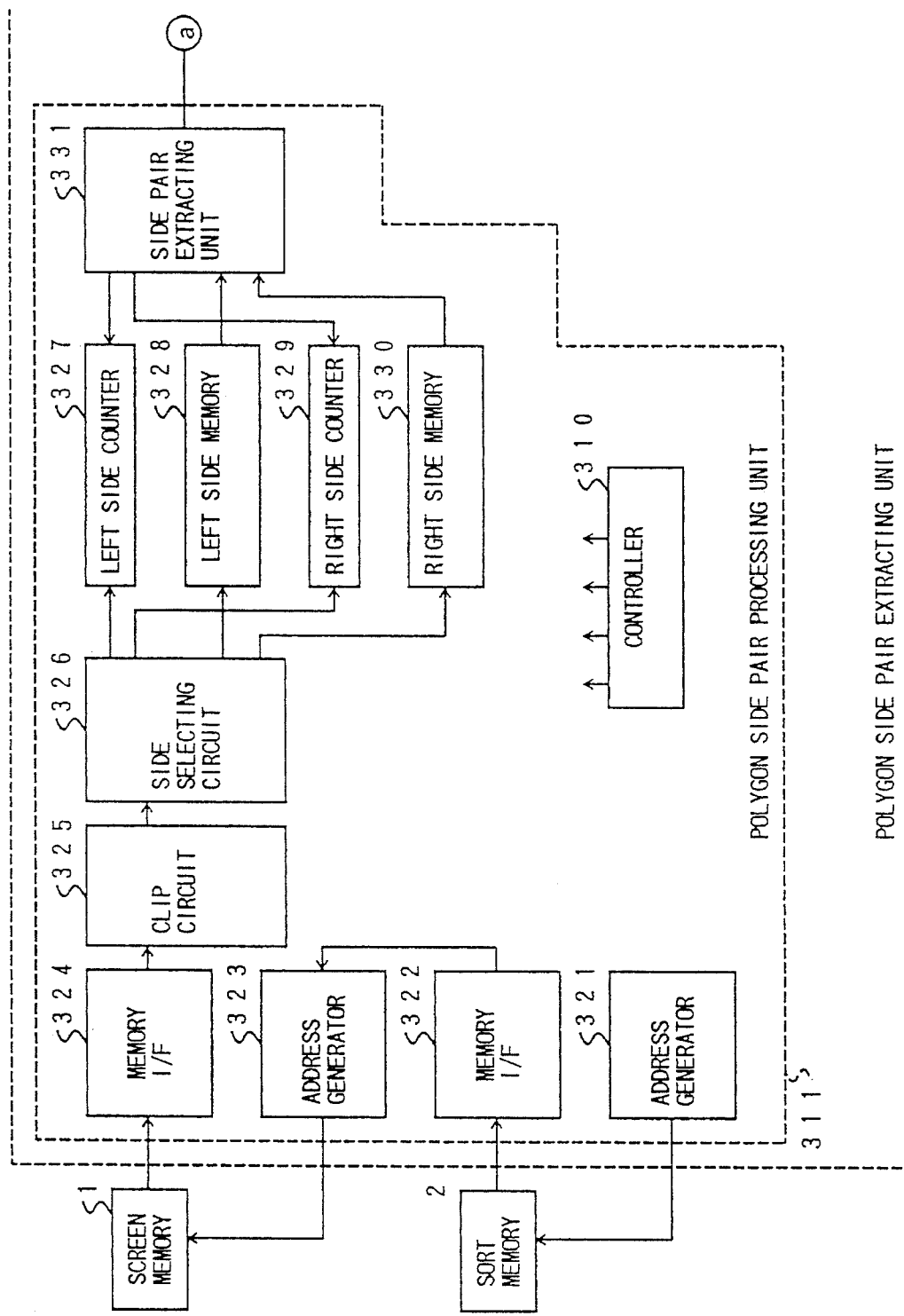
FIGS. 5A and 5B are parts of a block diagram of an entire structure of the first embodiment according to the present invention.
Figure 5B:
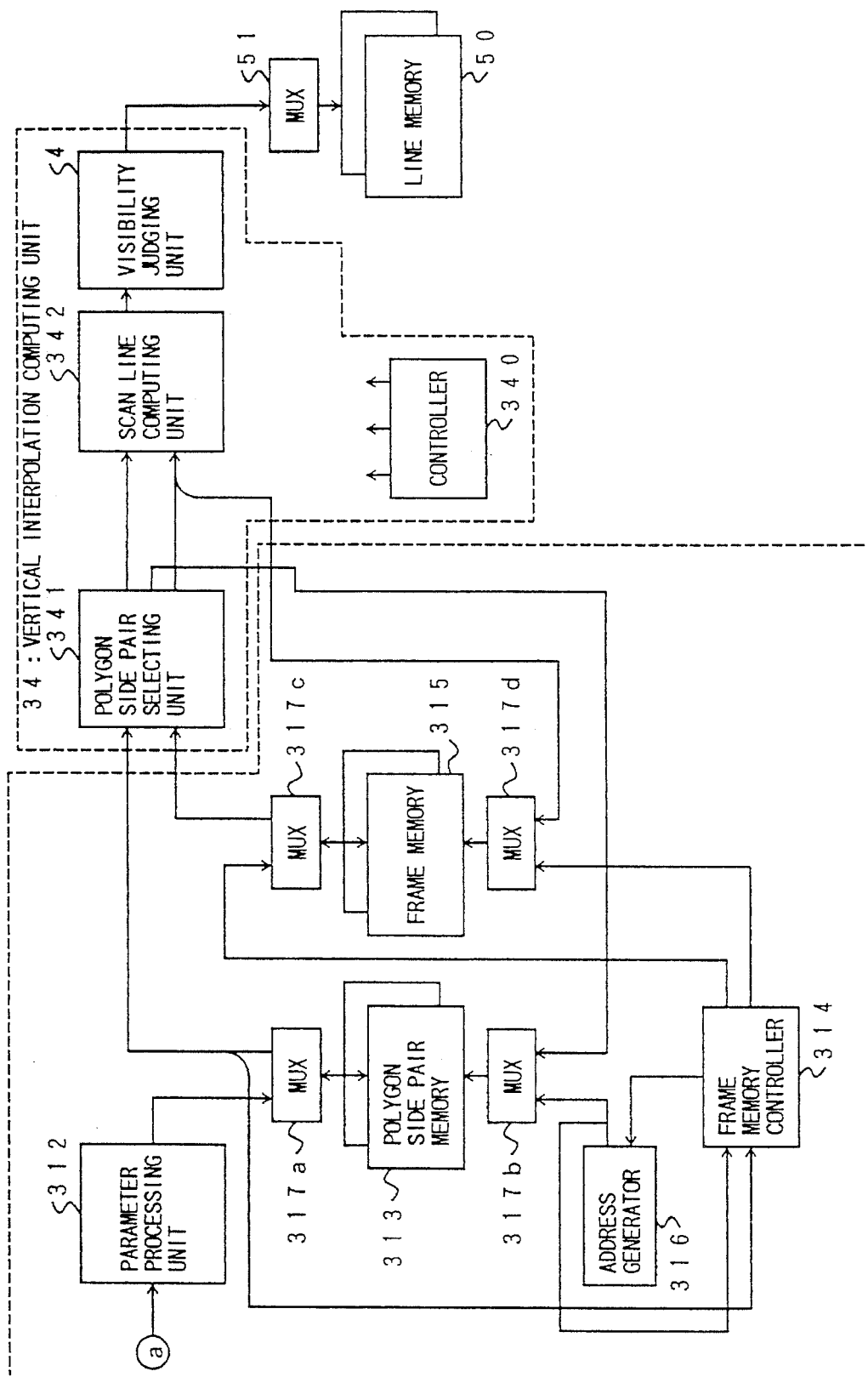

A description will now be given, with reference to FIGS. 5A and 5B, of the first embodiment according to the present invention. FIGS. 5A and 5B are parts of a block diagram of an image data processing unit of the first embodiment according to the present invention.

Data from the screen memory 1 is supplied to and temporarily stored in a memory I/F 324. The screen memory 1 is accessed in accordance with an address generated by an address generation circuit 323. The address generation circuit 323 is provided with the data which has been temporarily stored in the memory I/F 324, and an address for the screen memory 1 is generated in accordance with the data from the sort memory 2.

The sort memory 2 is accessed by using the address generated by an address generation circuit 321. The edge point data of the polygon which has been stored in the memory I/F circuit 324 is then supplied to a clip circuit 325.

The clip circuit 325 compares the edge point data with values of X start point data SXS, X end point data SXE, Y start point data SYS and Y end point SYE on the screen so as to eliminate the polygons corresponding to cases 1 to 4 shown in FIG. 40. That is, polygons which are not located in the screen are eliminated. As a result, only the polygon data which corresponds to polygons located on the screen is processed.

The polygon edge point data which was not eliminated by the clip circuit 315 is supplied to a side selecting circuit 326. In the side selecting circuit 326, a line vector is computed in accordance with the start point data XS and the end point data XE of the side of the polygon so as to determine a direction of the line vector of the side from among the directions shown in FIG. 38A or FIG. 38B. If the polygon corresponds to a clockwise polygon, sides which have line vectors corresponding to directions 1 to 4 are determined to be a left side of the polygon and sides which have line vectors corresponding to directions 5 to 8 are determined to be a right side of the polygon. If the polygon corresponds to a counterclockwise polygon, sides which have line vectors corresponding to directions 1 to 4 are determined to be a right side of the polygon and sides which have line vectors corresponding to directions 5 to 8 are determined to be a left side of the polygon.

When a side is determined to be a left side of the polygon, a left side counter 327 is incremented, and side information is stored in a left side memory 328. When a side is determined to be a right side of the polygon, a right side counter 329 is incremented, and side information is stored in a right side memory 330.

The side information stored in the left side memory 328 and the right side memory 330 is arranged according to a Y value (a scan line number), and a value of a side pair corresponding to each polygon is computed based on the counter numbers of the left side counter 327 and the right side counter 329, as shown in FIGS. 41A to 41H. The side pair data is then transferred to a scan line picturing unit 33 via a side pair processing unit 312 shown in FIG. 5B.

The parameter processing unit 312 calculates parameters necessary for a scan line computation by using address data of the start point and the end point of the polygon side pair. The parameters include an inclination of each side of the polygon. The calculated inclination of each side of the polygon, the X start point data and Y start point data of the right side and left side, respectively of each polygon, and attribute data are supplied to the polygon side pair memory 313 via a multiplexer 317a, and are stored in the polygon side pair memory 313. That is, the data is written in the polygon side pair memory, as shown in FIG. 13A, by the address read out from the sort memory in accordance with the order of Z value. The address used for writing in the polygon side pair memory 313 is generated by an address generator 316, and the address data is supplied to the polygon side pair memory 313 via a multiplexer 317b.

On the other hand, the address used for reading out the data in the polygon side pair memory 313 is supplied from the polygon side pair selecting unit 341 in the vertical interpolation computing unit via the multiplexer 317b.

The data stored in the polygon side pair memory 313 is sent to the frame memory controller 314 and the vertical interpolation computing unit 34 via a multiplexer 137a.

The frame memory controller 314 controls to write in the frame memory 315 the address data in the polygon side pair memory. The address data is written so that the address data from the start line to the end line of the scan line are written for each scan line in an order starting from the address data having a higher priority.

Since scanning time of the CRT 10 includes a displaying time and a blanking time, the data is written, for example, in the polygon side pair memory 313 and the frame memory 315 in the blanking time as shown in FIG. 42. The data in both of these memories should be read out in the displaying time, the data being written in the line memory 50 during each horizontal scanning operation.

The polygon side pair selecting unit 341 of the vertical interpolation computing unit 34 receives, for example as shown in FIG. 42, the address data of the polygon side pair memory 313 from the frame memory 315 during each horizontal scanning operation, and also receives each parameter data from the polygon side pair memory 313. The unit 341 then supplies the received data to a scan line computing unit 342 of the vertical interpolation computing unit 34. The scan line computing unit 342 computes X start point data XL and X end point data XR from a Y start line to a Y end line. The results are sent to the visibility judging unit 4, and then only the data corresponding to the visible polygon is sent to the line memory 50.

A description will now be given, with reference to flow charts shown in FIG. 14A to FIG. 20, of an operation of the picture processing unit 3 of the first embodiment according to the present invention.

When data is supplied to the picture processing unit 3 from the screen memory 1 and the sort memory 2, a sort address counter in the sort address generation circuit 321 is incremented in step 1 (hereinafter step is abbreviated as S). In S2, the sort memory supplies data representing a Z address (ZAD) to the address generation circuit 323 in accordance with the address generated in the address generation circuit 321. Then, X and Y coordinates of a screen of a polygon are read out, in S3, from the screen memory 1, and sent to the clip circuit 325 via the memory interface 324.

In S4, a clipping process is performed by the clip circuit 325. In S4, it is judged whether or not the polygon is located within the screen area, the clipping process is not performed, and then the routine proceeds to S5. The steps from S5 to S14 are performed in an operation for selecting sides of the polygon. In this example, a counterclockwise polygon is described.

In S5, a count value of a polygon side counter in the side selecting circuit 326 is set to 1, and count values of both the left side counter 327 and the right side counter 329 are set to 0, and then the routine proceeds to S7.

In S7, it is judged whether or not the polygon side is directed downward. If it is directed downward, the routine proceeds to S8 and if not, the routine proceeds to S10. In S8, a count value of the left side counter 327 is incremented by 1, and then the routine proceeds to S9. In S9, Y start point data YSS and Y end point data YEE are computed, and side start point data XLS, YSS, side end point data XLE, YEE and attribute data are stored in the left side memory 328, and then the routine proceeds to S13. In S13, the count value of the polygon side counter is incremented, and in S14 it is judged whether or not the count value of the polygon side counter is greater than the number of polygon sides. If the count value of the polygon side counter is smaller than the number of polygon sides, the routine returns to S6 so as to repeat the steps from S6 to S14. When the count value of the polygon side counter has become greater than the number of polygon sides, the routine proceeds to S15.

On the other hand, if the side of the polygon is not directed downward, the routine proceeds to S10 where it is judged whether or not the polygon side corresponding to the polygon side counter is directed upward. If it is directed upward, the routine proceeds to S11, and if not, the routine proceeds to S13. In S11, the count value of the right side counter 329 is incremented, and then the routine proceeds to S12. In S12, Y start point data YSS and Y end point data YEE are computed, and side start point data XRS, YSS, side end point data XRE, YEE and attribute data are stored in the right side memory 330, and then the routine proceeds to S13. As mentioned above, the steps from S6 to S14 are repeated until the count number of the polygon side counter has become greater than the number of polygon sides.

The steps from S15 to S43 are related to later part of an operation of the polygon side extracting unit 31.

In S15, the data in the left side memory 328 is arranged in ascending order of the start point of the polygon side. In S16, the data in the right side memory 330 is arranged in ascending order of the start point of the polygon side, and then the routine proceeds to S17 where a value of the polygon side counter is incremented.

Figure 41A:
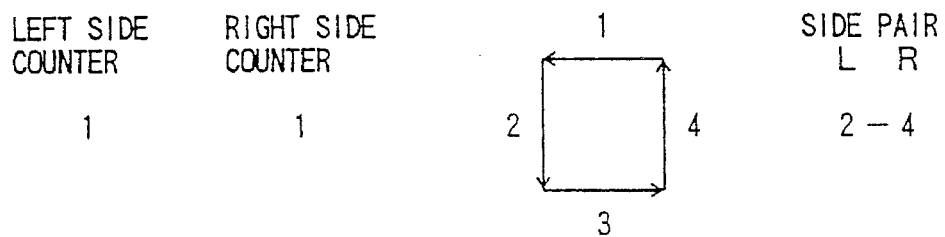
FIGS. 41A, 41B, 41C, 41D, 41E, 41F, 41G and 41H are illustrations for explaining values of a left side counter and right side counter in various side pairs.

In S18, it is judged whether or not the count values of both the left side counter and the right side counter are 1. When both are 1, the routine proceeds to S19. In S19, data for a side pair comprising the first data of the left side memory 328 and the first data of the right side memory 330 is written in the polygon side pair memory 313, and the routine proceeds to S20. In S20, Y start point data YSS and Y end point data YEE are computed, and then the routine proceeds to a parameter processing operation shown in FIG. 18. In these steps, S18 to S20, the operation shown in FIG. 41A is performed.

Figure 41B:
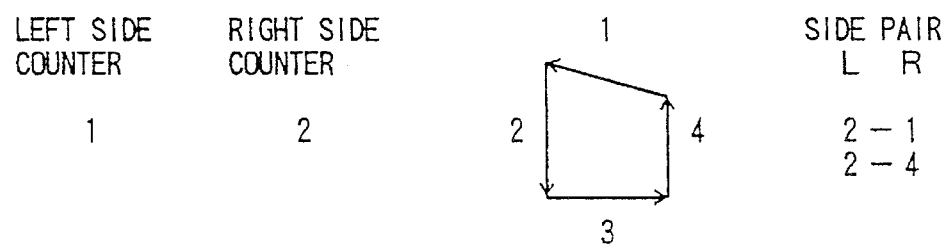

When both of the above count values are not equal to 1, the routine proceeds to S21 where it is judged whether or not the count value of the left side counter is 1 and the count value of the right side counter is 2. If the count value of the left side counter is 1 and that of the right side counter is 2, the routine proceeds to S22, and if not, the routine proceeds to S28. In S22, the polygon side counter is incremented and in S23, data for a side pair comprising the first data of the left side memory and the first data of the right side memory is written in the polygon side pair memory 313. In S24, Y start point data YSS and Y end point data YEE are computed, and in S25 the polygon side counter is incremented, and then the routine proceeds to S26. In S26, data for a side pair comprising the first data of the left side memory and the second data of the right side memory is written in the polygon side pair memory 313. In S27, Y start point data YSS and Y end point data YEE are computed, and then the routine proceeds to the parameter processing operation routine shown in FIG. 18. In these steps, from S22 to S27, the operation shown in FIG. 41B is performed.

Figure 41C:
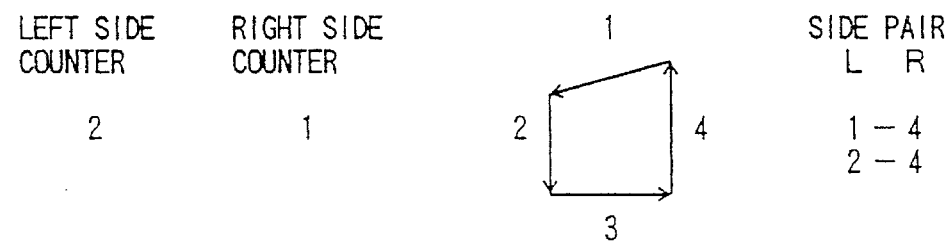

In S28, it is judged whether or not the count value of the left side counter is 2 and the count value of the right side counter is 1. If the count value of the left side counter is 2 and that of the right side counter is 1, the routine proceeds to S29, and if not, the routine proceeds to S35. In S29, the polygon side counter is incremented and in S30, data for a side pair comprising the first data of the left side memory and the first data of the right side memory is written in the polygon side pair memory 313. In S31, Y start point data YSS and Y end point data YEE are computed, and in S32 the polygon side counter is incremented, and then the routine proceeds to S33. In S33, data for a side pair comprising the second data of the left side memory and the first data of the right side memory is written in the polygon side pair memory 313. In S34, Y start point data YSS and Y end point data YEE are computed, and then the routine proceeds to the parameter processing operation routine shown in FIG. 18. In these steps, from S28 to S34, the operation shown in FIG. 41C is performed.

Figure 41D:
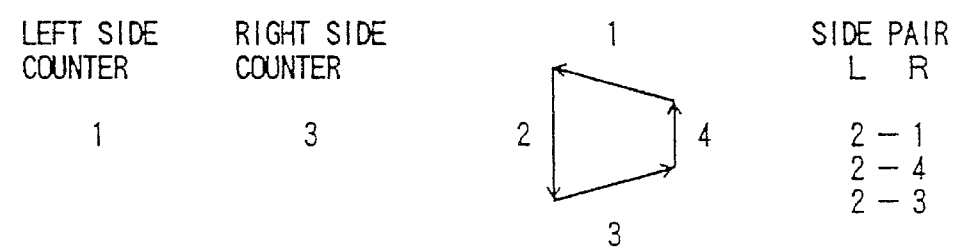

In S35, it is judged whether or not the count value of the left side counter is 1 and the count value of the right side counter is 3. If the count value of the left side counter is 1 and that of the right side counter is 3, the routine proceeds to S36, and if not, the routine proceeds to S45. In S36, the polygon side counter is incremented and in S37, data for a side pair comprising the first data of the left side memory and the first data of the right side memory is written in the polygon side pair memory 313. In S38, Y start point data YSS and Y end point data YEE are computed, and in S39 the polygon side counter is incremented, and then the routine proceeds to S40. In S40, data for a side pair comprising the first data of the left side memory and the second data of the right side memory is written in the polygon side pair memory 313. In S41, Y start point data YSS and Y end point data YEE are computed, and then the routine proceeds to S42. In S42, the polygon side counter is incremented and in S43, data for a side pair comprising the first data of the left side memory and the third data of the right side memory is written in the polygon side pair memory 313. In S44, Y start point data YSS and Y end point data YEE are computed, and then the routine proceeds to the parameter processing operation routine shown in FIG. 18. In these steps, from S35 to S44, the operation shown in FIG. 41D is performed.

Figure 41E:
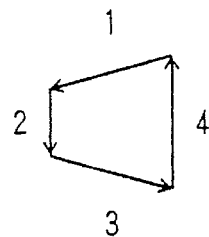

In S45, it is judged whether or not the count value of the left side counter is 3 and the count value of the right side counter is 1. If the count value of the left side counter is 3 and that of the right side counter is 1, the routine proceeds to S46, and if not, the routine proceeds to S55. In S46, the polygon side counter is incremented and in S47, data for a side pair comprising the first data of the left side memory and the first data of the right side memory is written in the polygon side pair memory 313. In S48, Y start point data YSS and Y end point data YEE are computed, and in S49 the polygon side counter is incremented, and then the routine proceeds to S50. In S50, data for a side pair comprising the second data of the left side memory and the first data of the right side memory is written in the polygon side pair memory 313. In S51, Y start point data YSS and Y end point data YEE are computed, and then the routine proceeds to S52. In S52, the polygon side counter is incremented and in S53, data for a side pair comprising the third data of the left side memory and the first data of the right side memory are written in the polygon side pair memory 313. In S54, Y start point data YSS and Y end point data YEE are computed, and then the routine proceeds to the parameter processing operation routine shown in FIG. 18. In these steps, from S45 to S54, the operation shown in FIG. 41E is performed.

Figure 41F:
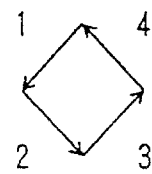

In S45, it is judged whether or not the count value of the left side counter is 2 and that of the right side counter is 2 and whether or not the Y value of the first end point of the left side memory is equal to the Y value of the first start point of the right side memory. If the count value of the left side counter is 2 and that of the right side counter is 2, and if the above Y values are equal to each other, the polygon side counter is incremented in S56, and then the routine proceeds to S57. In S57, data for a side pair comprising the first data of the left side memory and the first data of the right side memory is written in the polygon side pair memory 313. In S58, Y start point data YSS and Y end point data YEE are computed, and then the routine proceeds to S59. In S59, the polygon side counter is incremented and in S60, data for a side pair comprising the second data of the left side memory and the first data of the right side memory is written in the polygon side pair memory 313. In S61, Y start point data YSS and Y end point data YEE are computed, and then the routine proceeds to the parameter processing operation routine shown in FIG. 18. In these steps, from S55 to S61, the operation shown in FIG. 41F is performed.

Figure 41G:
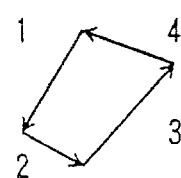

If the judgment in S55 is negative, the routine proceeds to S62. In S62, it is judged whether or not the count value of the left side counter is 2 and that of the right side counter is 2 and whether or not the Y value of the first start point of the right side memory is smaller than the Y value of the first end point of the left side memory. If the count value of the left side counter is 2 and that of the right side counter is 2, and if the above Y value of right side memory is smaller than the Y value of the left side memory, the routine proceeds to S63, and if not, the routine proceeds to S72. In S63, the polygon side counter is incremented, and in S64, data for a side pair comprising the first data of the left side memory and the first data of the right side memory is written in the polygon side pair memory 313. In S65, Y start point data YSS and Y end point data YEE are computed, and then the routine proceeds to S66. In S66, the polygon side counter is incremented and in S67, data for a side pair comprising the first data of the left side memory and the second data of the right side memory is written in the polygon side pair memory 313. In S68, Y start point data YSS and Y end point data YEE are computed, and then the routine proceeds to S69. In S69, the polygon side counter is incremented and in S70, data for a side pair comprising the second data of the left side memory and the second data of the right side memory is written in the polygon side pair memory 313. In S71, Y start point data YSS and Y end point data YEE are computed, and then the routine proceeds to the parameter processing operation routine shown in FIG. 18. In these steps, from S62 to S71, the operation shown in FIG. 41G is performed.

Figure 41H:
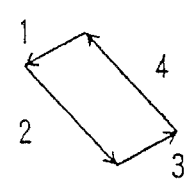

In S72, it is judged whether or not the count value of the left side counter is 2 and that of the right side counter is 2 and whether or not the Y value of the first start point of the right side memory is greater than the Y value of the first end point of the left side memory. If the count value of the left side counter is 2 and that of the right side counter is 2, and if the above Y value of the right side memory is greater than the Y value of the left side memory, the routine proceeds to S73, and if not, the routine proceeds to the parameter processing operation routine shown in FIG. 18. In S73, the polygon side counter is incremented, and in S74, data for a side pair comprising the first data of the left side memory and the first data of the right side memory is written in the polygon side pair memory 313. In S75, Y start point data YSS and Y end point data YEE are computed, and then the routine proceeds to S76. In S76, the polygon side counter is incremented and in S77, data for a side pair comprising the second data of the left side memory and the first data of the right side memory is written in the polygon side pair memory 313. In S78, Y start point data YSS and Y end point data YEE are computed, and then the routine proceeds to S79. In S79, the polygon side counter is incremented and in S80, data for a side pair comprising the second data of the left side memory and the second data of the right side memory is written in the polygon side pair memory 313. In S81, Y start point data YSS and Y end point data YEE are computed, and the routine proceeds to the parameter processing operation routine shown in FIG. 18. In these steps, from S73 to S81, the operation shown in FIG. 41H is performed.

Figure 18:
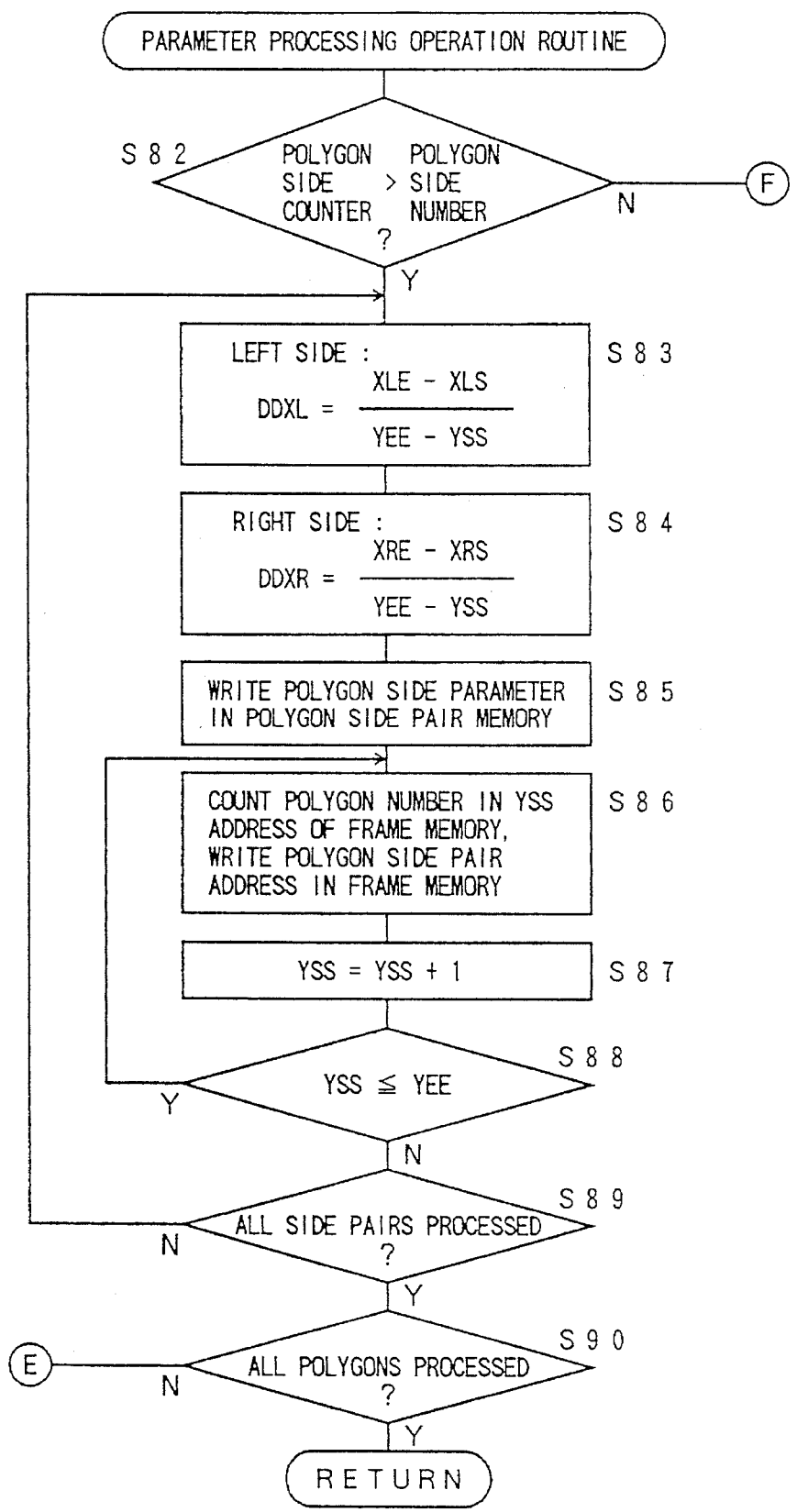
FIG. 18 is a flow chart for explaining an operation of the parameter processing unit of the first embodiment.

A description will now be given, with reference to a flow chart shown in FIG. 18, of an operation performed by the parameter processing unit 312.

When the routine proceeds to an operation performed by the parameter processing unit 312, it is judged, in S82, whether or not polygon side counter value is greater than the number of polygon sides. If the polygon side counter value is not greater than the number of polygon sides, the routine returns to S6, and the above-mentioned operation is repeated.

If it is judged, in S82, that the polygon side counter value is greater than the number of polygon sides, the routine proceeds to S83. In S83, inclination DDXL of the left side is computed, and in S84, inclination DDXR of the right side is computed.

In S85, polygon side pair parameters including DDXL, DDXR, X start point data and Y start point data of both the left side and right side, attribute data, Y start point data and Y end point data of the side pair is written in the polygon side pair memory 313.

In S86, the number of polygon side pairs having the same YSS address is counted, and then all polygon side pair addresses of the polygon side pair memory corresponding to the side pairs having the same YSS address are written in the YSS address in the frame memory 315.

In S87, an address value YSS is incremented and then the routine proceeds to S88. In S88, it is judged whether or not YSS is equal to or smaller than YEE, or greater than YEE. If it is judged that YSS is equal to or smaller than YEE, the routine returns to S86, and writing operation in the frame memory 315 is repeated. If YSS is greater than YEE, the routine proceeds to S89 where it is judged whether or not all side pairs have been processed. If all side pairs have not been processed, the routine returns to S83, and the above-mentioned operation is repeated. If it is judged, in S89, that all side pairs have been processed, the routine proceeds to S90 where it is judged whether or not all polygons have been processed. If all polygons have not been processed, the routine returns to S1 so as to repeat the above-mentioned operation until all polygons have been processed. If it is judged, in S90, that all polygons have been processed, the operation of the polygon side pair extracting unit ends.

A description will now be given, with reference to a flow chart of FIG. 19, of an operation of the vertical interpolation computing unit 34.

When an operation of the vertical interpolation computing unit 34 starts, first, in S100, the scan line address is set to 0, and then, in S101, data in the frame memory 315 is read out in accordance with the Y address value. In S102, polygon side pair data in the polygon side pair memory 313 indicated by the data in the frame memory 315 is read out, and the routine then proceeds to S103.

In S103, left side edge data XL is calculated by the following equation:

$$XL = (YEE - Y) * DDXL + XLS$$

In S104, right side edge data XR is calculated by the following equation:

$$XR = (YEE - Y) * DDXR + XRS$$

In S105, data including XL, XR and attribute data is sent to the visibility judging unit 4, and then is written in the registers 41, 42 and 48, respectively.

In S106, it is judged whether or not the process from S101 to S105 has been repeated a number of times equal to the number of polygons indicated by the Y address in the frame memory 315. If not, the routine returns to S101. If it is judged, in S106, that the process has been repeated a number of times equal to the number of polygons, the routine proceeds to S107.

In S107, the Y address is incremented, and in S108 it is judged whether or not a signal HSYNC (horizontal synchronizing signal) is "Hi" If it is judged that the signal HSYNC is high, the routine proceeds to S109. In S109, it is judged whether or not the Y address is equal to or less than V resolution or greater than the V resolution. If the Y address is equal to or less than the V resolution, the routine returns to S101, and if the Y address is greater than the V resolution (corresponding to the number of dot data or pixel data in a vertical direction in a memory of the displaying unit), the routine returns to S100.

Figure 20:
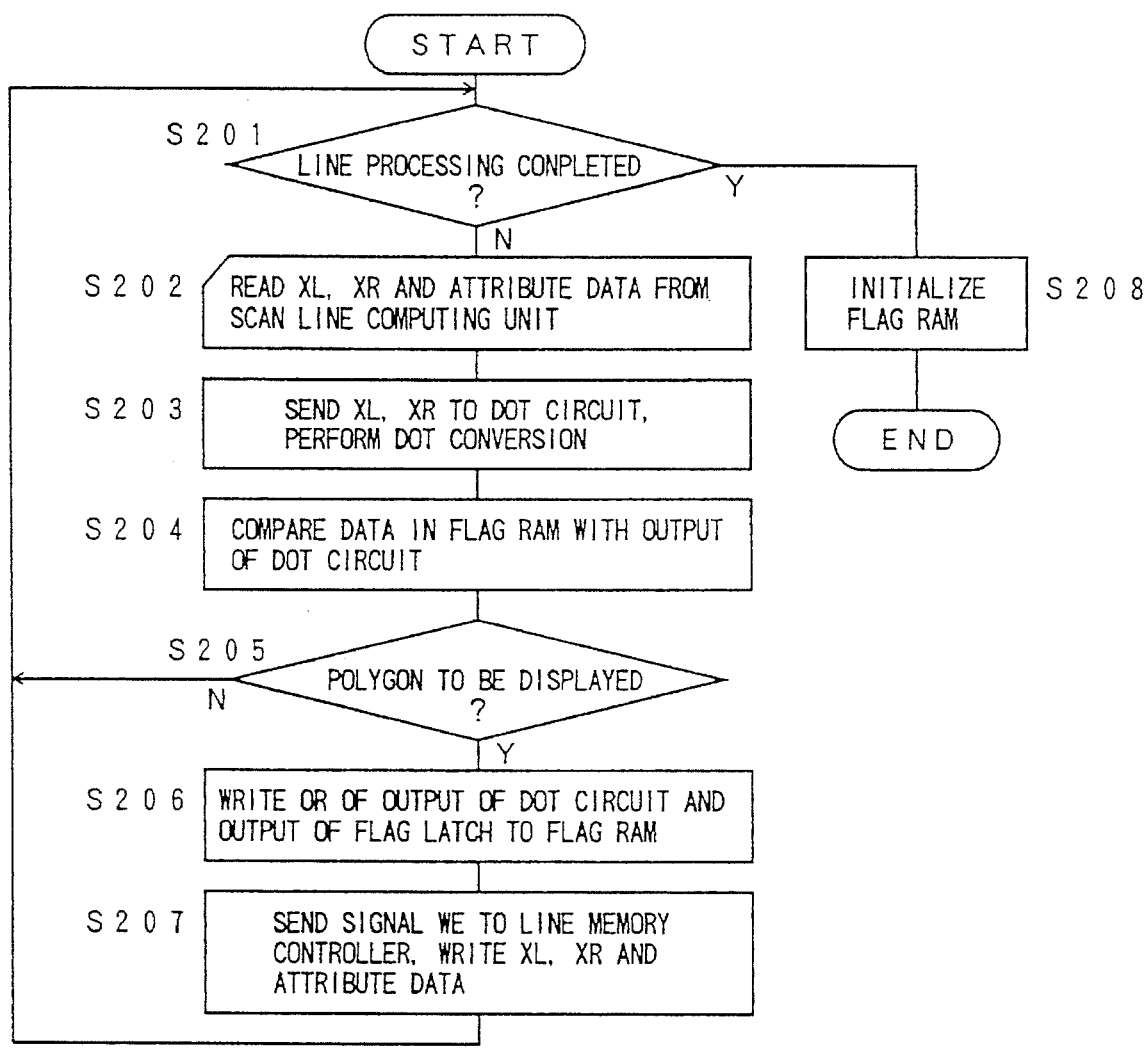
FIG. 20 is a flow chart for explaining an operation of the visibility judging unit of the first embodiment.

A description will now be given, with reference to a flow chart of FIG. 20, of an operation of the visibility judging unit 4.

When the operation of the visibility judging unit 4 is started, it is judged, in S201, whether or not scan line processing has been completed. If it has not been completed yet, the routine proceeds to S202, and if it has been completed, the routine proceeds to S208.

Immediately after the start of the operation, the frame processing has not been completed, and thus the routine proceeds to S202 where data XL and XR and attribute data are read out from the registers 41, 42 and 48, respectively, and the routine then proceeds to S203.

In S203, XL and XR are supplied to the dot circuit 43 so that the XL and XR are converted into dot data, and the routine proceeds to S204. In S204, data for address Y of the flag RAM 54 is compared with the output of the dot circuit 43, and then the routine proceeds to S205.

In S205, it is judged whether or not the polygon is to be displayed. If the polygon is not to be displayed, the routine returns to S201 to repeat the operation from S201 to S205. If the polygon is to be displayed, then the routine proceeds to S206.

In S206, an OR of the output of the dot circuit 45 and the output of the flag RAM 54 is written in the flag RAM 54, and then the routine proceeds to S207. In S207, a signal WE is sent to the line memory controller, and data XL, XR and attribute data are written in the line memory 50. Then the routine returns to S201. The above-mentioned process is repeated until the scan line processing is completed.

When the scan line processing has been completed, the routine proceeds to S208 where the flag RAM 45 is initialized, and then the operation ends.

The above-mentioned operation of the first embodiment is performed in the timing shown in FIGS. 42 to 45. Scanning time of the CRT10 includes a displaying time and a blanking time. Each operation of the first embodiment is performed as described below.

In an example shown in FIG. 42, writing to the polygon side pair memory 313 and the frame memory 315 is performed by the polygon side pair extracting unit 31 during the blanking time. Data in the polygon side pair memory 313 and the frame memory 315 is read out by the vertical interpolation computing unit 34, and the data is written in the line memory 50 during each horizontal scanning time.

In an example shown in FIG. 43, parameter data is written in the polygon side pair memory 313 by the polygon side pair extracting unit 31 during the first half of the blanking time, and data is written in the frame memory 315 during the second half of the blanking time. Data in the polygon side pair memory 313 and the frame memory 315 is read out by the vertical interpolation computing unit 34, and the data is written in the line memory 50 during each horizontal scanning time.

In an example shown in FIG. 44, there are provided a plurality of polygon side pair memories and a plurality of frame memories. Data is written, by the polygon side pair extracting unit 31, in odd number polygon side pair memories and frame memories, for example, while an odd number frame is processed. While an even number frame is processed, data in the polygon side pair memories and the frame memories is read out by the vertical interpolation computing unit 34, and the data is written in the line memory 50 during each horizontal scanning time.

In an example shown in FIG. 45, there are provided a plurality of polygon side pair memories and a plurality of frame memories. Data is written, by the polygon side pair extracting unit 31, in odd number polygon side pair memories and frame memories, for example, while an odd number frame is processed. The writing operation is performed so that parameter data is written in the polygon side pair memory during the first half of the processing time of the odd number frame, and data is written in the frame memory during the second half of the processing time of the odd number frame. While an even number frame is processed, data in the polygon side pair memories and the frame memories is read out by the vertical interpolation computing unit 34, and the data is written in the line memory 50 during each horizontal scanning time.

According to the above-mentioned examples, memory capacity of the frame memory according to the present invention can be smaller than that of the conventional apparatus. The difference is remarkable in a case where there is a large amount of attribute data. Additionally, an increase in processing speed or an increase in number of polygons to be processed can be easily achieved by providing, in parallel, additional polygon side pair extracting units.

Further, due to the provision of the visibility judging unit, data XL, XR and attribute data only for polygons to be displayed are stored in the line memory. Accordingly, only polygons to be processed during a single scan line displaying time can be effectively displayed.

In the above-mentioned first embodiment, the number of polygons is dependent on the capacity of the frame memory 315. That is, since all the polygons are stored in the frame memory 315 regardless of whether or not the polygons to be displayed are to be displayed, the number of polygons which can be processed is limited by the capacity of the frame memory 315.

A second embodiment according to the present invention is adapted to store only polygons to be displayed so that polygons displayed during a single scan line displaying time are effectively processed with a frame memory having a small capacity.

A description will now be given, with reference to FIGS. 21 to 29, of the second embodiment. In the figures, the parts that are the same as the parts of the first embodiment are given the same reference numerals.

Figure 21:
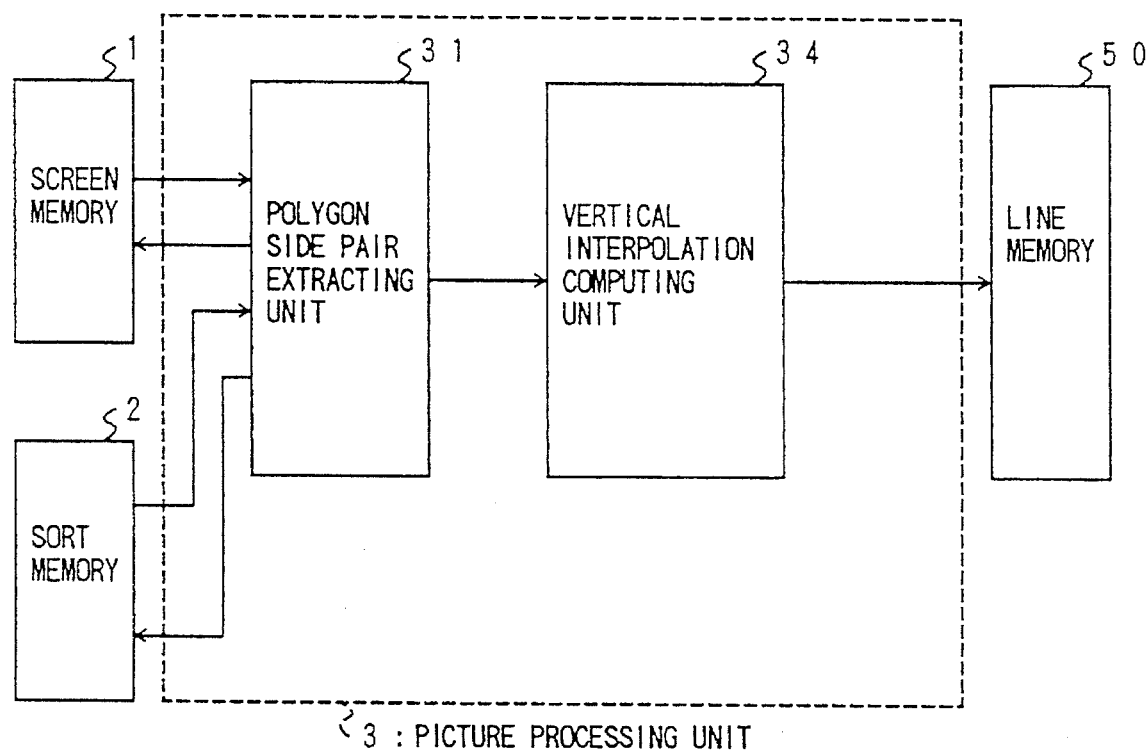
FIG. 21 is a block diagram of a picture processing unit of a second embodiment according to the present invention.

FIG. 21 is a block diagram of the picture processing unit 3, which is an essential part of the second embodiment according to the present invention.

The polygon side pair extracting unit 31 reads out from the screen memory 1 data of the edge point of the polygon corresponding to data read out from the sort memory 2. The polygon side pair extracting unit 31 applies a simple clipping process to the data corresponding to a polygon which extends out of the screen of the display unit, and then selects polygon edge information corresponding to each side of the polygon.

The polygon side pair extracting unit 31 computes, based on edge information of the polygon, each side pair data which corresponds to a pair of sides of a polygon on a scan line. In this embodiment, it is judged whether or not the polygon is to be displayed in accordance with the polygon intersection pair data, that is, XL (left intersection) and XR (right intersection). The address data in the polygon side pair memory 313 corresponding only to polygons to be displayed is written in the frame memory 315, which memory sends polygon data to a vertical interpolation computing unit 34.

The vertical interpolation computing unit 34 computes, based on equations described below, data for an X left intersection XL and an X right intersection XR on a scan line by using the data supplied by the polygon side pair extracting unit 31. The resultant data is sent to the line memory 50.

The difference between the first embodiment and the second embodiment is that the second embodiment has the visibility judging unit within the polygon side pair extracting unit 31, while the first embodiment has the visibility judging unit between the vertical interpolation computing unit and the line memory.

That is, in the second embodiment, data only for polygons to be displayed is stored in the frame memory 315. Accordingly, the structure of the polygon side pair extracting unit 31 of the second embodiment is different from that of the first embodiment.

Figure 22:
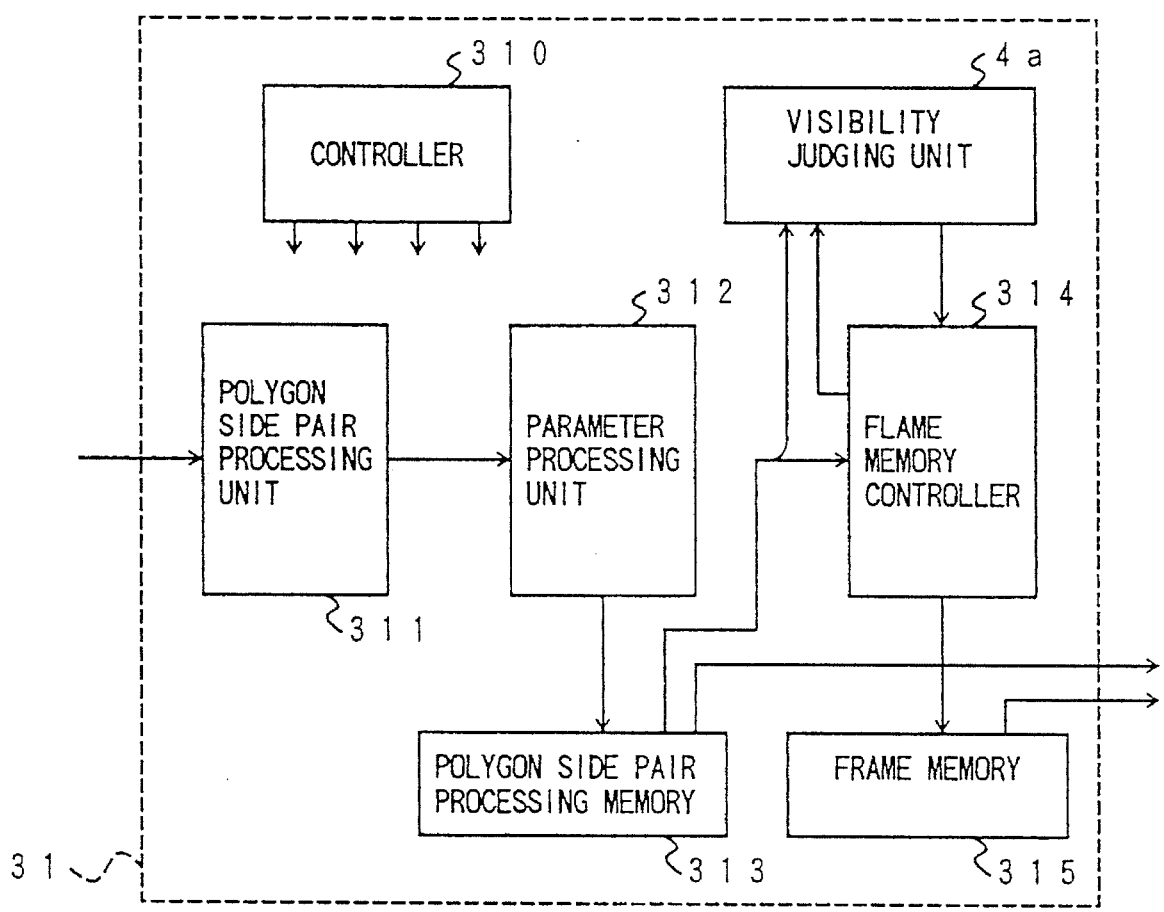
FIG. 22 is a block diagram of a polygon side pair extracting unit of the second embodiment according to the present invention.

A description will now be given, with reference to FIG. 22, of a structure of the polygon side pair processing unit 31 of the second embodiment.

Data sent by the screen memory 1 is supplied to a polygon side pair processing unit 311. The polygon side pair processing unit 311 has a clipping circuit which eliminates polygon edge data corresponding to a polygon positioned outside the screen, which edge data is read out from the screen memory 1, so as to eliminate polygons shown in FIG. 40. As a result, only polygons positioned inside the screen are processed.

The polygon side pair processing unit 311 converts the polygon edge data, which has not been eliminated by the clipping circuit, into a formatted data comprising start point data XLS, XRS and end point data XLE, XRE. Then a vector corresponding to a polygon side is computed based on the start point data XL and the end point data XR so as to determine a direction in which the polygon side extends. If a series of the vectors of the polygon side indicate a clockwise direction, a polygon side whose vector falls in areas 1–4 shown in FIG. 38A is classified to be a left side and a polygon side whose vector falls in areas 5–8 is classified to be a right side. If a series of the vectors of the polygon side indicate a counterclockwise direction, a polygon side whose vector falls in areas 1–4 shown in FIG. 38B is classified to be a right side and a polygon side whose vector falls in areas 5–8 is classified to be a left side.

The polygon edge data classified to be a left side or a right side is then sent to a parameter processing unit 312. In the parameter processing unit 312, inclination data DDXL, DDXR of each polygon side is computed based on the start point address and the end point address (XLS, XLE), (XRS, XRE).

In the parameter processing unit 312, parameters of the polygon side pairs shown in FIGS. 39B, 39C and 39D of a polygon shown in FIG. 39A, for example, are computed by using the equations described in regard to the first embodiment.

The parameter processing unit 312 sends to the polygon side pair memory 313 the obtained inclination data DDXL, DDXR, the start point data XLS, XRS and the end point data XLE, XRE of the polygon pair, the Y start point data YSS, the Y end point data YEE, and attribute data. The above data is stored in the polygon side pair memory 313 in accordance with addresses read out by the sort memory 2 in the order of the Z values, as shown in FIG. 13A.

In the parameter processing unit 312, as in the first embodiment and as shown in FIG. 8, the start point address data (XLS, XRS) is supplied to and stored in registers 312a and 312g, respectively, and also supplied to an input of subtracters 312b and 312h, respectively. Another input of the subtracters 312b and 312h is supplied with the end point address data (XLE, XRE) of the polygon side pair, respectively.

Additionally, the start point address data (YLS, YRS) of the polygon side pair supplied by the polygon side pair processing unit 311 is stored in registers 312e and 312k, respectively, and also supplied to an input of subtracters 312c and 312i respectively. Another input of the subtracters 312c and 312i is supplied with the end point address data (YLE, YRE) of the polygon side pair, respectively.

Outputs of the subtracters 312b and 312c are supplied to divider 312d, and the divider 312d outputs inclination data DDXL. Similarly, outputs of the subtracters 312h and 312i are supplied to dividers 312j, and the divider 312j outputs inclination data DDXR.

The Y start point data YSS and the Y end point data YEE are supplied to registers 312m and 312n, respectively. The attribute data (such as color information) is supplied to registers 312f and 312l. These data are output to the polygon side pair memory 313 as a parameter to be stored.

The data stored in the polygon side pair memory 313 is sent to a visibility judging unit 4a, the frame memory controller 314 and the vertical interpolation computing unit 34.

The frame memory controller 314 receives Y start point data YSS and Y end point data YEE, which correspond to Y values obtained in the polygon side pair processing unit 311, the data being shown in FIGS. 39B, 39C and 39D. The frame memory controller 314 controls to write, when a signal WE is supplied by the visibility judging unit 4a, addresses of the polygon side pair memory 313 so that the addresses for every each scan line starting from Y start point to Y end point are written in the memory 313 according. In each scan line, the addresses are written in an order starting from higher priority, that is, an order obtained from the sort memory 2.

Since, a circuit structure of the frame memory controller 314 of the second embodiment is the same as that of the first embodiment, a description thereof will be given with reference to FIG. 7 showing first embodiment of the circuit structure.

As shown in FIG. 7, the Y values YSS, YEE corresponding to Y start point and Y end point obtained from the polygon side pair processing unit 311 are supplied to registers 314b and 314a, respectively. The value YSS in the register 314b is sent to and stored in a Y register 314d via a multiplexer 314c.

The polygon count memory 314j stores a number of polygons crossed by each scan line. In accordance with the YSS given by the register 314d, a number of data in a polygon count memory 314j, that is, the number of polygons crossed by a Y scan line, is read out. The data of the Y register 314d is temporarily stored in a register 314h, and then supplied to a register 314k. The data in the polygon counter 314j, which data corresponds to a number of polygons crossed by each Y scan line, is also supplied to the register 314k. The register 314k combines the data from register 314h, as a higher value, and the data from polygon counter 314j, as a lower value, so as to provide a frame memory address.

The signal WE is supplied from the visibility judging unit 4a to the controller 314m. The controller 314m judges whether or not the signal WE is turned on.

When the signal WE is turned on, the controller 314m sends a signal WR to the frame memory 315. The signal WR allows the memory address in the polygon side pair memory 313 to be written in the frame memory 313.

The value of the polygon count memory 314j is incremented by an incrementer 314i, and the value is written in the polygon count memory 314j. The Y value of the register 314d is incremented by the incrementer 314e.

In a comparator 314f, it is judged whether or not the Y value is less than YEE. The resultant data is supplied to the controller 314m. The controller 314m sends a signal NEXT, when the Y value exceeds YEE, to the controller in the polygon side pair extracting unit 331.

As mentioned above, the frame memory controller 314 receives YSS and YEE which are data for a height of the polygon in the Y direction, and then the controller 314 controls to write the address data, when the signal WE is supplied from the visibility judging unit 4a, in the polygon side pair memory 313 from the start line to the end line of each scan line in the order starting from the address data having the highest priority.

Figure 24:
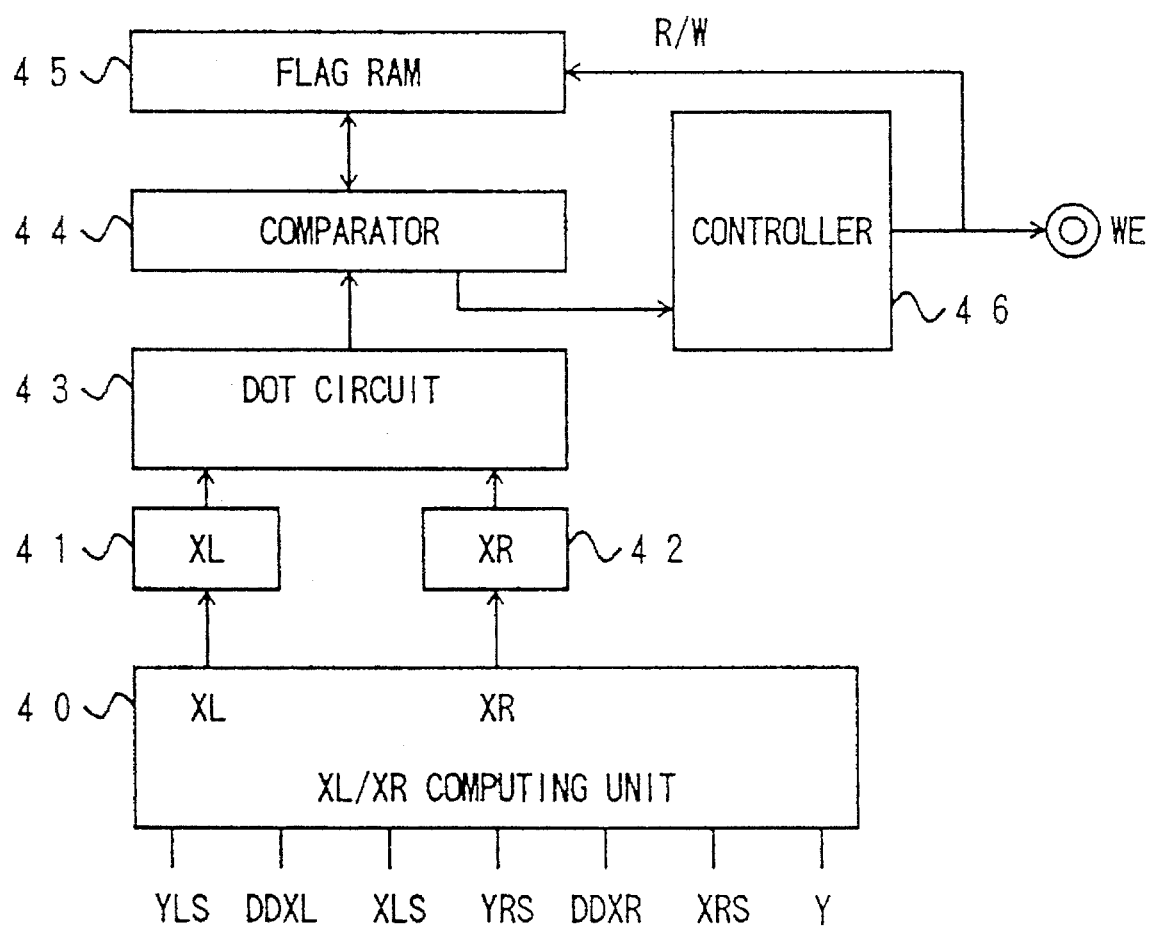
FIG. 24 is a block diagram of a visibility judging unit shown in FIG. 23B.

A description will now be given, with reference to FIGS. 24 and 25, of an example of the visibility judging unit 4a of the second embodiment according to the invention.

The visibility judging unit 4 of the first embodiment performs a visibility judging operation in accordance with the X value XL of the left side and the X value XR of the right side of the polygon, which values are supplied by the scan line computing unit 342. On the other hand, the visibility judging unit 4a of the second embodiment performs a visibility judging operation in accordance with the X start point data (XLS, XRS) and Y start point data YLS, YRS of the left and right sides of the polygon, inclination data DDXL, DDXR, and the Y address data which are supplied by the polygon side pair memory 313. Accordingly, the difference between the visibility judging unit 4a of the second embodiment and the visibility judging unit 4 of the first embodiment is that the visibility judging unit 4a includes the XL/XR computing unit 40 while the visibility judging unit 4 does not.

That is, the XL/XR computing unit 40 computes the X value XL of the left side and the X value XR of the right side of the polygon in accordance with the X start point data XLS, XRS and Y start point data YLS, YRS of the left and right sides of the polygon, inclination data DDXL, DDXR, and the Y address data supplied by the polygon side pair memory 313. The computed data for the polygon intersection pair on the scan line of the Y address is stored in the registers 41 and 42. The X start point data XL is stored in the XL register 41, and the X end point data XR is stored in the XR register 42.

Figure 25:
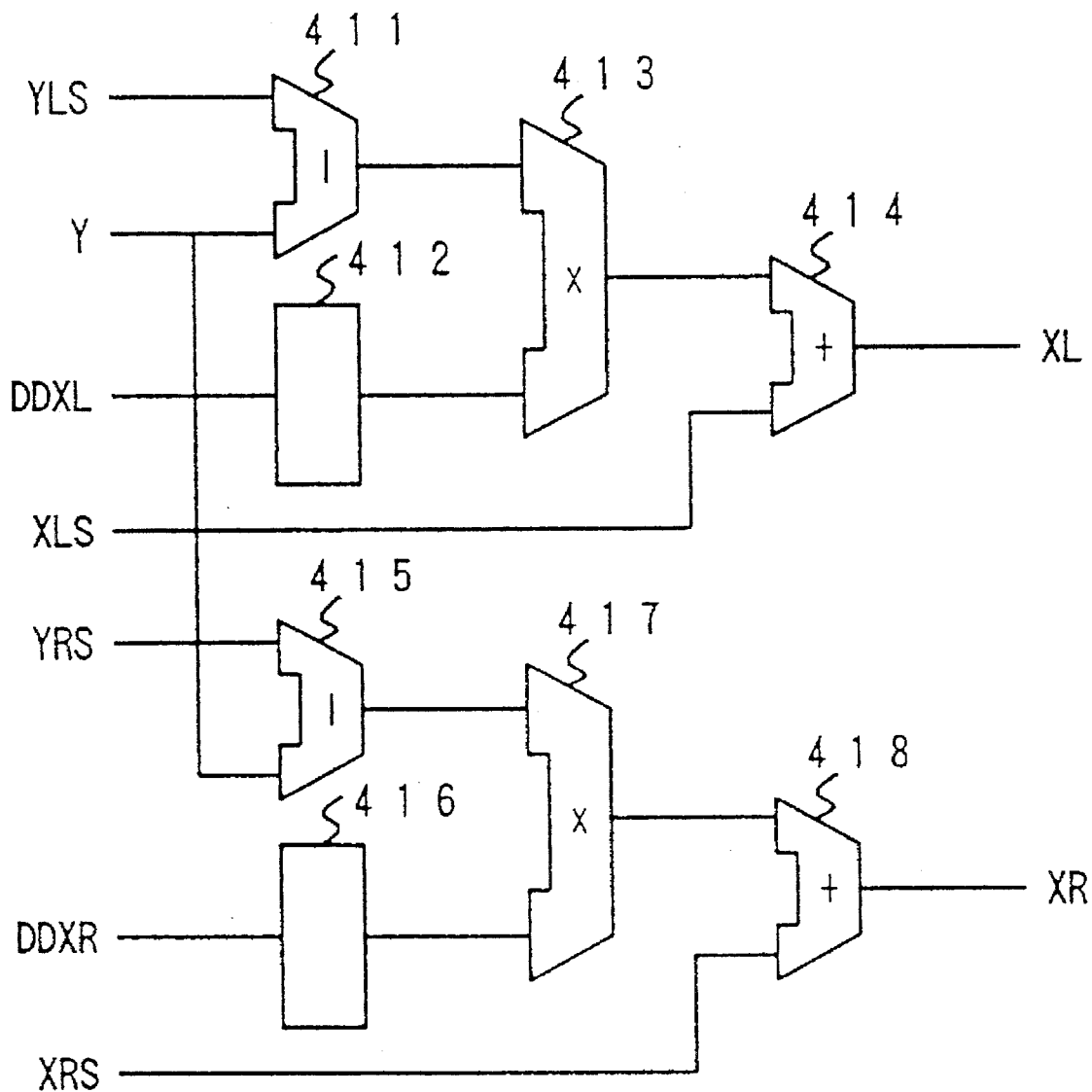
FIG. 25 is a block diagram of an embodiment of an XL/XR computing unit of the visibility judging unit shown in FIG. 14.
Figure 26:
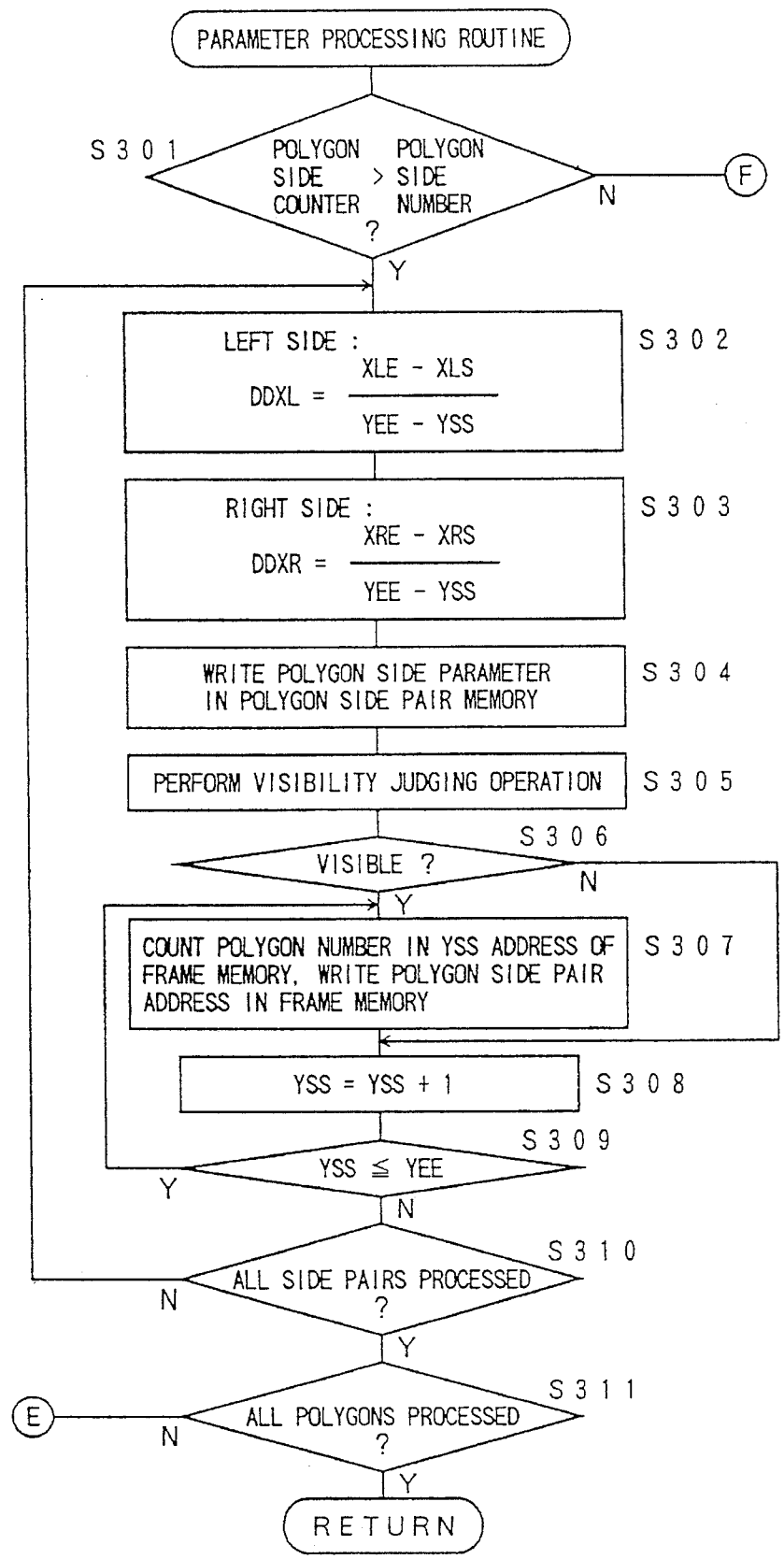
FIG. 26 is a flow chart for explaining an operation of a parameter processing unit of the second embodiment according to the present invention.

FIG. 25 shows a specific structure of the XL/XR computing unit 40. As shown in FIG. 25, the inclination data DDXL, DDXR sent from the polygon side pair memory 313 is stored in registers 412 and 416. The start point address data YLS, YRS is input to subtracters 411 and 415, respectively. The scan line address data Y) is also supplied to the subtracters 411 and 415.

The results of the operations performed by the subtracters 411 and 415 are supplied to multipliers 413 and 417, respectively. The inclination data DDXL, DDXR respectively stored in the registers 412 and 416 is supplied to the multipliers 413 and 417. The results of the operations performed by the multipliers 413 and 417 are supplied to adders 414 and 418, respectively. The adders 414 and 418 are supplied with the start pint data XLS, XRS of the polygon side pair, respectively. Finally, the X start point data XL and the X end point data XR are output from the adders 414 and 418, and are supplied to the XL register 41 and the XR register 42, respectively.

The computing operation performed by the XL/XR computing unit 40 is based on the following equations.

$$XL = DDXL * (Y2-Y) + X1$$

$$XR = DDXR * (Y4-Y) + X1$$

The X start point data XL and the X end point data XR are then supplied to the dot circuit 43. As in the case of the first embodiment, the dot circuit 43 performs a dot conversion on the X start point data XL and the X end point data XR, and the resultant dot data is supplied to the comparator 44. Since the dot circuit is the same as that used in the first embodiment described above, a detailed description of the dot circuit 43 of the present embodiment will be omitted.

The dot data from the dot circuit 43 is compared, by the comparator 44, with data in the flag RAM 45. That is, the comparator 44 judges whether or not the polygon is to be displayed by comparing the data from the dot circuit 43 with the data, stored in the flag RAM 45, corresponding to the polygons which have already been displayed. The resultant data is supplied to the controller 46. If the data corresponds to a polygon to be displayed, an OR of the dot data from the dot circuit 43 and the data from the flag RAM 45 are written in the flag RAM 45.

Since the comparator and the flag RAM are the same as that used in the first embodiment described above, detailed descriptions of the comparator 44 and flag RAM 45 of the present embodiment will be omitted.

Additionally, since the structure of the vertical interpolation computing unit 34 is the same as that used in the first embodiment described above, a detailed description of the vertical interpolation computing unit 34 of the present embodiment will be omitted.

Figure 23A:
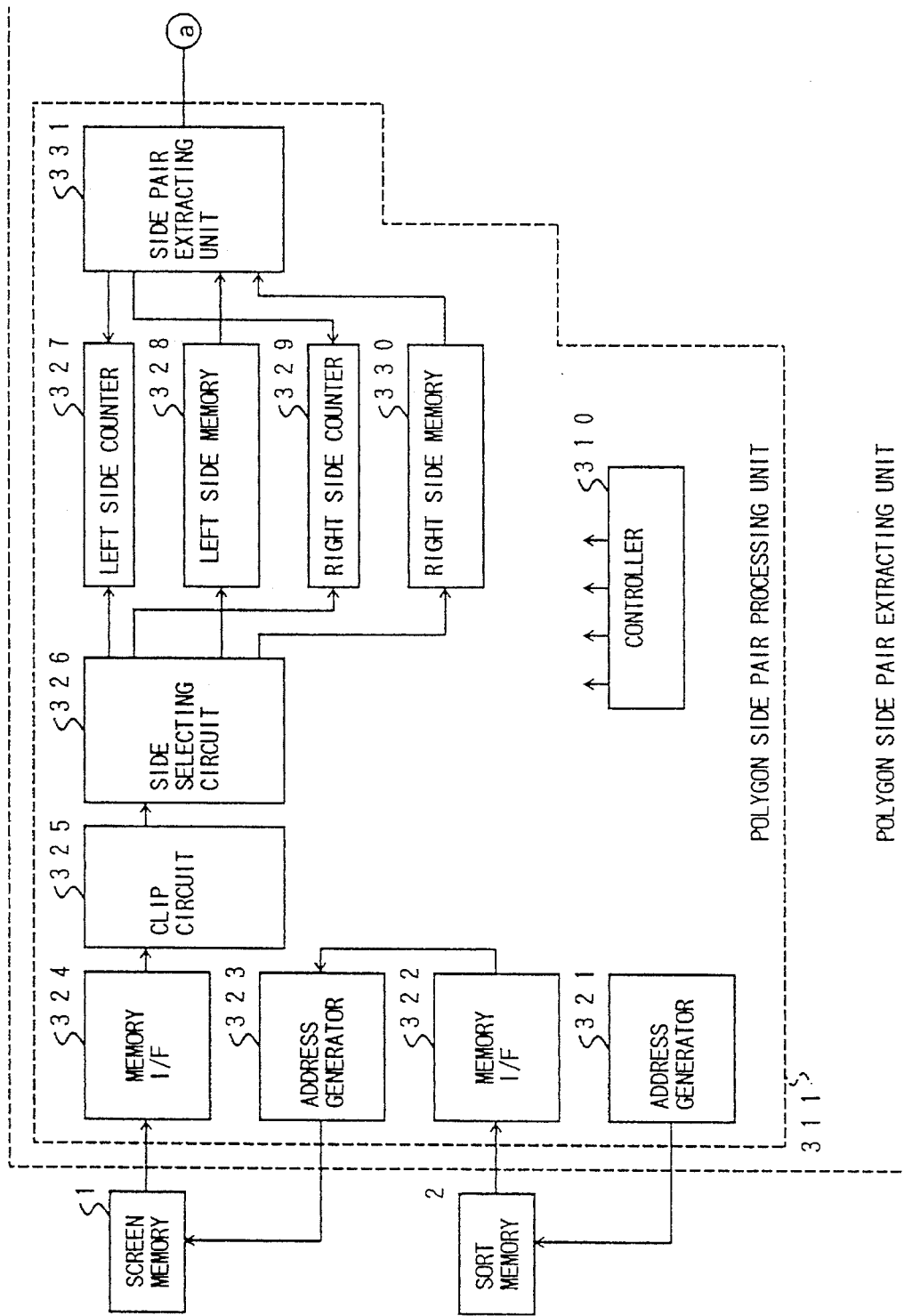
FIGS. 23A and 23B are parts of a block diagram of the second embodiment according to the present invention.
Figure 23B:
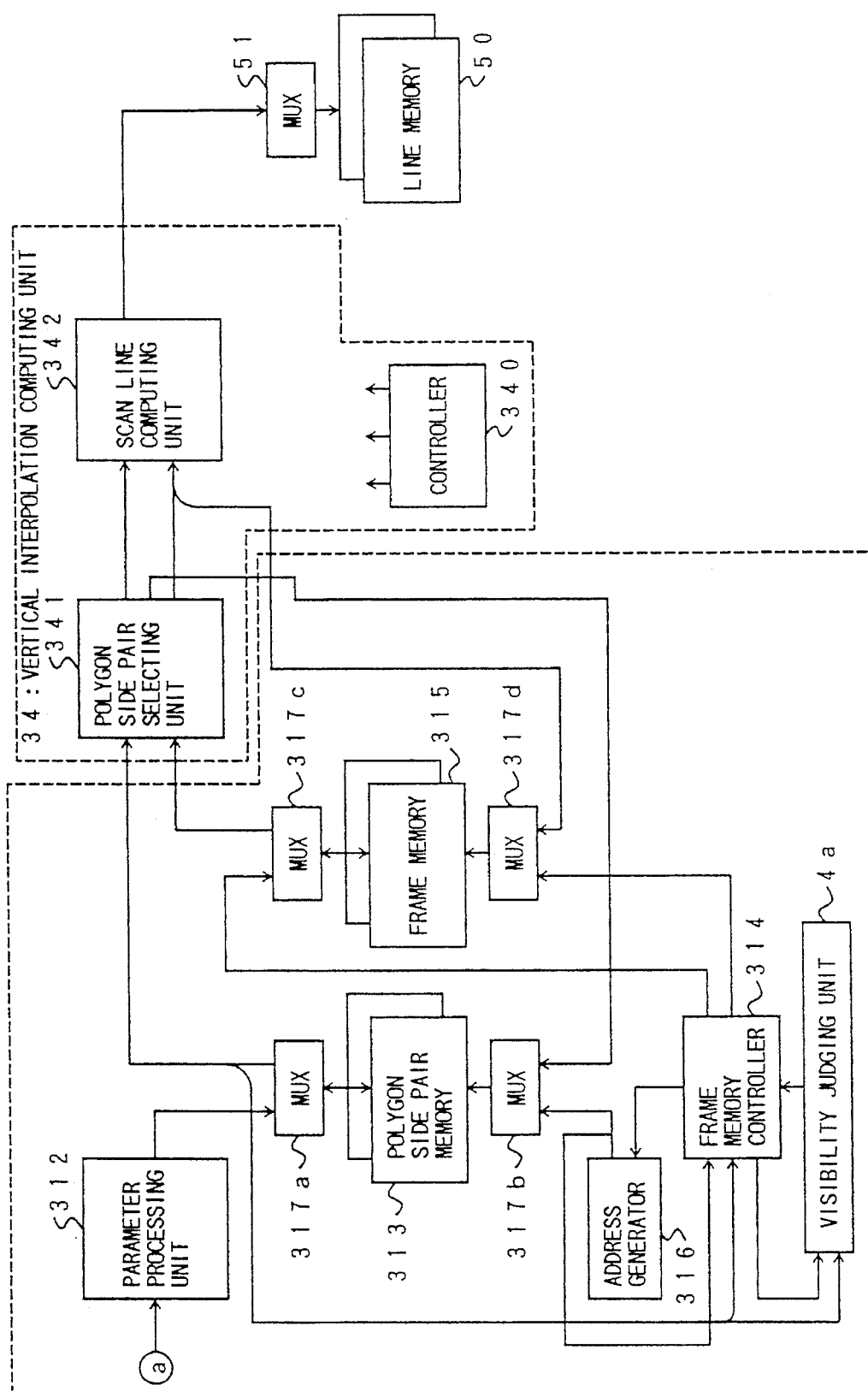

The description of the second embodiment will be continued with reference to FIGS. 23A and 23B which are parts of a block diagram of an essential part of the second embodiment.

As in the case of the first embodiment, data from the screen memory 1 is supplied to and temporarily stored in a memory I/F 324. The screen memory 1 is accessed in accordance with an address generated by an address generation circuit 323. The address generation circuit 323 is provided with the data which has been temporarily stored in the memory I/F 324, and an address for the screen memory 1 is generated in accordance with the data from the sort memory 2.

The sort memory 2 is accessed by using the address generated by an address generation circuit 321. The edge point data of the polygon which has been stored in the memory I/F circuit 324 is then supplied to a clip circuit 325.

The clip circuit 325 compares the edge point data with values of an X start point SXS, an X end point SXE, a Y start point SYS and a Y end point SYE on the screen so as to eliminate the polygons corresponding to cases 1 to 4 shown in FIG. 40. That is, polygons which are not located in the screen are eliminated. As a result, only the polygon data which corresponds to polygons located on the screen is processed.

The polygon edge point data which has not been eliminated by the clip circuit 315 is supplied to a side selecting circuit 326. In the side selecting circuit 326, a line vector is computed in accordance with the start point data XS and the end point data XE of the side of the polygon so as to determine a direction of the line vector of the side from among the directions shown in FIG. 38A or FIG. 38B. If the polygon corresponds to a clockwise polygon, sides which have line vectors corresponding to directions 1 to 4 are determined to be a left side of the polygon and sides which have line vectors corresponding to directions 5 to 8 are determined to be a right side of the polygon. If the polygon corresponds to a counterclockwise polygon, sides which have line vectors corresponding to directions 1 to 4 are determined to be a right side of the polygon and sides which have line vectors corresponding to directions 5 to 8 are determined to be a left side of the polygon.

When a side is determined to be a left side of the polygon, a value of a left side counter 327 is incremented, and side information is stored in a left side memory 328. When a side is determined to be a right side of the polygon, a value of a right side counter 329 is incremented, and side information is stored in a right side memory 330.

The side information stored in the left side memory 328 and the right side memory 330 is arranged according to a Y value (a scan line number), and a value of a side pair corresponding to each polygon is computed based on the counter numbers of the left side counter 327 and the right side counter 329, as shown in FIGS. 41A to 41H. The side pair data is then transferred to a scan line picturing unit 33 via a side pair processing unit 312 shown in FIG. 23B.

The parameter processing unit 312 calculates parameters necessary for a scan line computation by using address data of the start point and the end point of the polygon side pair. The parameters have an inclination of each side of the polygon. The calculated inclination of each side of the polygon, the X start point data and Y start point data of the right side and left side of each polygon, and attribute data are supplied to the polygon side pair memory 313 via a multiplexer 317a, and are stored in the polygon side pair memory 313. That is, similarly to the first embodiment, the data is written in the polygon side pair memory, as shown in FIG. 13A, by the address read out from the sort memory in accordance with the order of Z values. The address used for writing data in the polygon side pair memory 313 is generated by an address generator 316, and the address data is supplied to the polygon side pair memory 313 via a multiplexer 317b.

On the other hand, the address used for reading out the data in the polygon side pair memory 313 is supplied from the polygon side pair selecting unit 341 in the vertical interpolation computing unit via the multiplexer 317b.

The data stored in the polygon side pair memory 313 is sent to the visibility judging unit 4a, the frame memory controller 314 and the vertical interpolation computing unit 34 via a multiplexer 137a.

The visibility judging unit 4a judges whether or not the line bridges from the X value of the left side to the X value of the right side, and the signal WE, by which the writing operation is permitted, is sent to the frame memory controller 314 only when the line is judged to be visible. The frame memory controller 314, after receiving the signal WE, write the address data of the polygon side pair memory 313 in the frame memory.

The frame memory controller 314 controls to write in the frame memory 315 the address data of the polygon side pair memory 313 when the signal WE is supplied by the visibility judging unit 4a. The address data is written so that the address data from the start line to the end line of the scan line is written for each scan line in an order starting from the address data having higher priority. In the present embodiment, only the data corresponding to polygons to be displayed is written in the frame memory 315 by means of the visibility judging unit 4a. Therefore, frame memory 315 is effectively used only for polygons to be processed during a processing time of a single scan line.

A description will now be given, with reference to flow charts shown in FIG. 26 to FIG. 29, of an operation of the picture processing unit 3 of the second embodiment according to the present invention.

Since the operation from the input of the data from the screen memory 1 and the sort memory 2 to the operation performed by the polygon side pair processing unit 311 is the same as that of the first embodiment, the description of the operation of the second embodiment given below will start from an operation performed by the parameter processing unit 312.

When the operation of the side pair extracting unit 331 is completed, the routine proceeds to an operation performed by the parameter processing unit 312. It is judged, in S301, whether or not a polygon side counter value is greater than the number of polygon sides. If the polygon side counter value is not greater than the number of polygon sides, the routine returns to S6 shown in FIG. 14B, and the above-mentioned operation, from S6 to S81, is repeated.

If it is judged, in S301, that the polygon side counter value is greater than the number of polygon sides, the routine proceeds to S302. In S302, inclination data DDXL of the left side is computed, and in S303, inclination data DDXR of the right side is computed.

In S304, polygon side pair parameters including DDXL, DDXR, X start point data and Y start point data of both the left side and right side of the polygon, attribute data, Y start point data and Y end point data of the side pair are written in the polygon side pair memory 313.

In S305, the unit 4a performs the visibility judging operation, and then the routine proceeds to S306. In S306, it is judged whether or not the data written in the polygon side pair memory 313 corresponds to a visible polygon. If the data corresponds to a visible polygon, the routine proceeds to S307 so as to write the address data of the polygon side pair memory in the frame memory 315; otherwise the routine proceeds to S308.

In S307, the polygons in the YSS address of the frame memory 315 are counted, and the polygon side pair address data is written in the address of the frame memory 315, which address is indicated by the polygon in the YSS address in the frame memory 315.

In S308, the YSS address is incremented and the routine proceeds to S309. In S309, it is judged whether or not YSS is equal to or smaller than YEE, or greater than YEE. If it is judged that YSS is equal to or smaller than YEE, the routine returns to S307, and the writing operation in the frame memory 315 is repeated. If YSS is greater than YEE, the routine proceeds to S310 where it is judged whether or not all side pairs have been processed. If all side pairs have not been processed, the routine returns to S302, and the above-mentioned operation is repeated. If it is judged, in S310, that all side pairs have been processed, the routine proceeds to S311 where it is judged whether or not all polygons have been processed. If all polygons have not been processed, the routine returns to S1 of FIG. 14A so as to repeat the above-mentioned operation until all polygons have been processed. If it is judged, in S311, that all polygons have been processed, the operation of the polygon side pair extracting unit ends.

Figure 27:
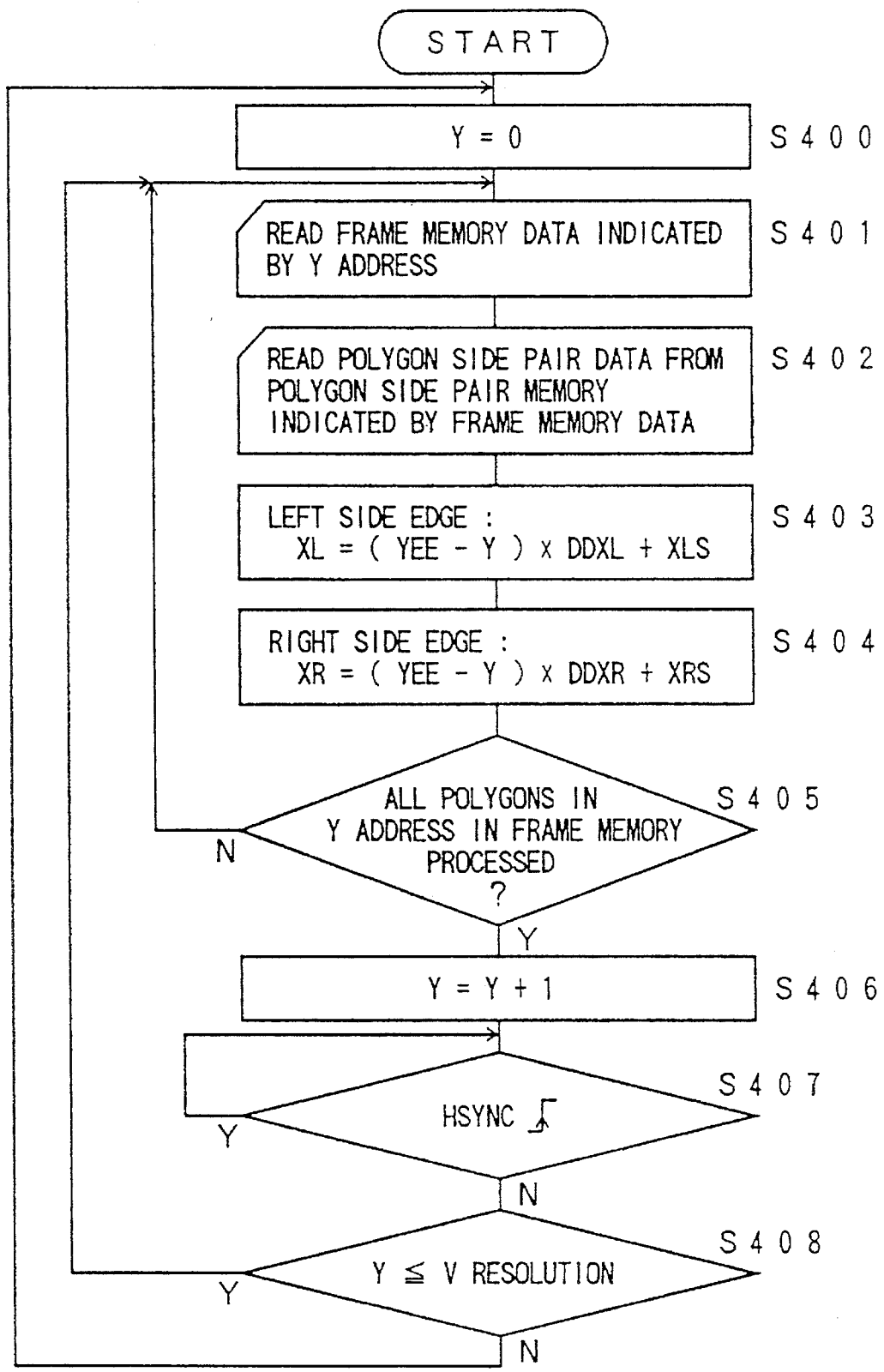
FIG. 27 is a flow chart for explaining an operation of a vertical interpolation computing unit of the second embodiment according to the present invention.

A description will now be given, with reference to a flow chart of FIG. 27, of an operation of the vertical interpolation computing unit 34 of the second embodiment.

When an operation of the vertical interpolation computing unit 34 starts, first, in S400, scan line address Y is set to 0, and then in S401, data in the frame memory 315 is read out in accordance with the Y address value. In S402, polygon side pair data in the polygon side pair memory 313 indicated by the data in the frame memory 315 is read out, and the routine proceeds to S103.

In S403, left side edge data is calculated by the following equation:

XL=(YEE - Y) * DDXL+XLS

In S404, right side edge data is calculated by the following equation:

XR=(YEE - Y) * DDXR+XRS

In S405, it is judged whether or not the process from S101 to S105 has been repeated a number of times equal to the number of polygons indicated by the Y address in the frame memory 315. If not, the routine returns to S401; if it is judged, in S405, that the process has been repeated a number of times equal to the number of polygons, the routine proceed to S406.

In S406, the Y address is incremented, and in S407, it is judged whether or not a signal HSYNC is "Hi". If it is judged that the signal HSYNC is high, the routine proceeds to S408. In S408, it is judged whether or not the Y address is equal to or less than V resolution or if it is greater than the V resolution. If the Y address is equal to or less than the V resolution, the routine returns to S401, and if the Y address is greater than the V resolution, the routine returns S400.

Figure 28:
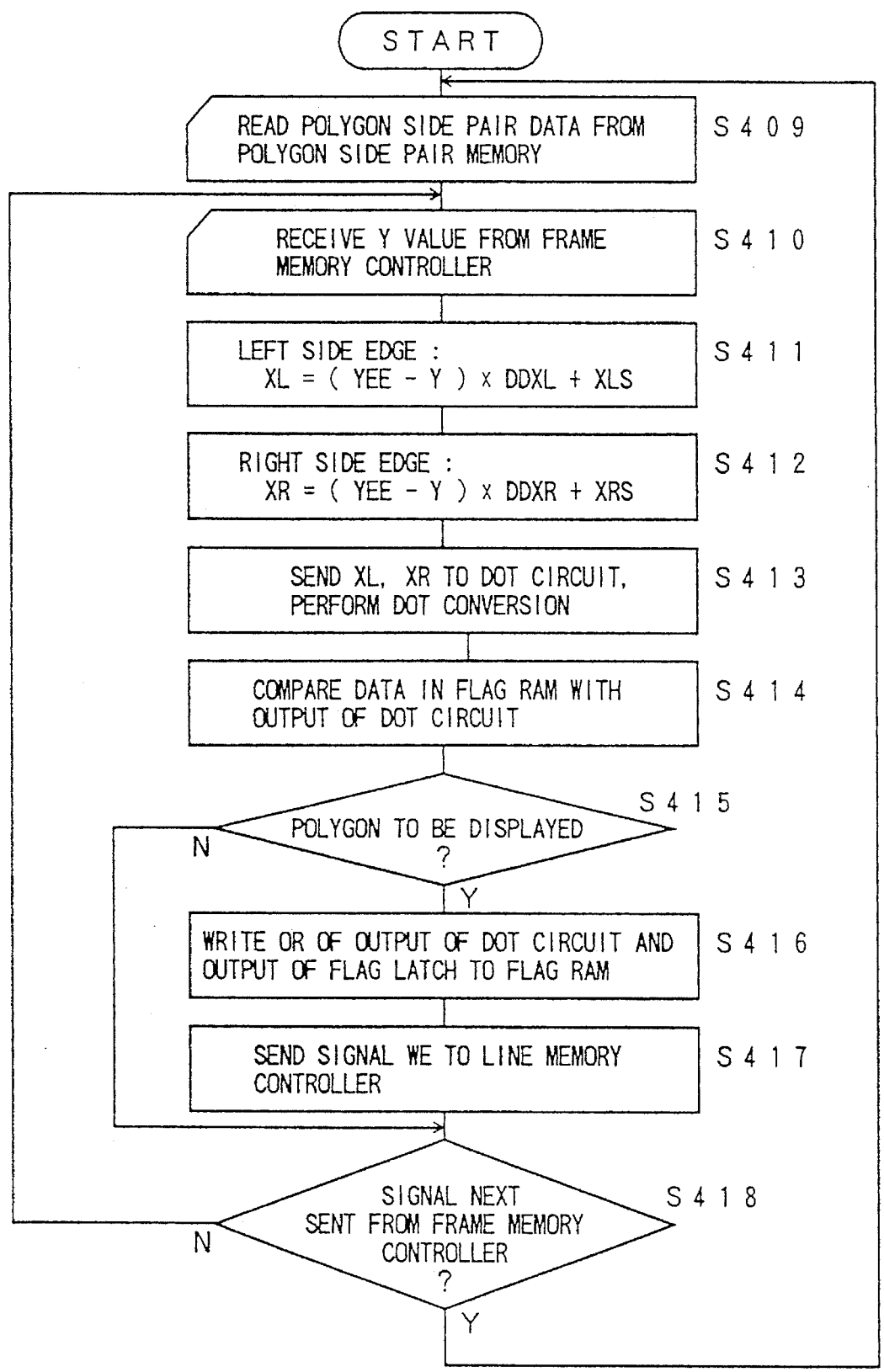
FIG. 28 is a flow chart for explaining an operation of a visibility judging unit of the second embodiment according to the present invention.

A description will now be given, with reference to a flow chart of FIG. 28, of an operation of the visibility judging unit 4a.

When the operation of the visibility judging unit 4 is started, data is read out, in S409, from the polygon side pair memory 313, and a Y value is received, in S410, from the frame memory controller 314, and the routine proceeds to S411.

In S411, left side edge data is calculated by the following equation:

XL=(YEE - Y) * DDXL+XLS

In S412, right side edge data is calculated by the following equation:

XR=(YEE - Y) * DDXR+XRS

In S413, XL and XR are supplied to the dot circuit 43 so that the XL and XR are converted into dot data, and the routine proceeds to S414. In S414, data for address Y of the flag RAM 54 is compared with the output of the dot circuit 43, and the routine proceeds to S415.

In S415, it is judged whether or not the polygon is to be displayed. If the polygon is not to be displayed, the routine proceeds to S418. If the polygon is to be displayed, the routine proceeds to S416.

In S416, an OR of the output of the dot circuit 45 and the output of the flag RAM 54 is written in the flag RAM 54, and the routine proceeds to S207. In S417, a signal WE is sent to the line memory controller 314 and the routine proceeds to S418. It is judged, in S418, whether or not the signal WE has been supplied from the frame memory controller 314. If it is judged that the signal WE has been supplied, the routine returns to S401, and if not, the routine returns to S410.

Figure 29:
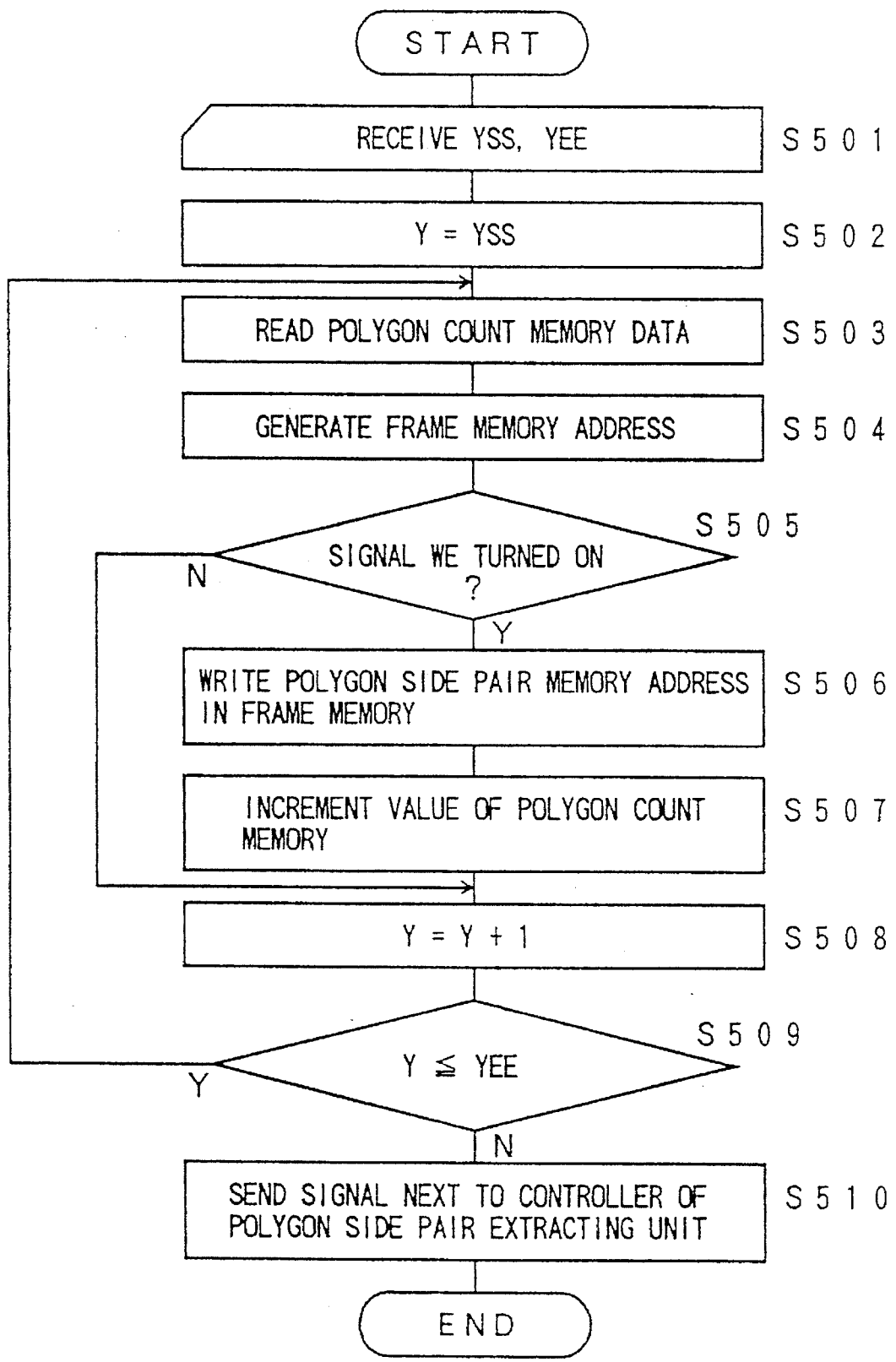
FIG. 29 is a flow chart for explaining an operation of a frame memory controller of the second embodiment according to the present invention.

A description will now be given, with reference to a flow chart shown in FIG. 29, of an operation performed by the frame memory controller 314.

When the operation of the frame memory controller 314 is started, first, in S501, data YSS and YEE are received, and value of a Y register is set to YSS, and the routine proceeds to S503.

In S503, the number of data, that is, the number of polygons crossed by the Y scan line, is read out, and then the routine proceeds to S504. In S504, a frame address is generated by setting the Y register value as being the higher position and the number of polygons crossed by the Y scan line as being the lower position, and then the routine proceeds to S505.

In S505, it is judged whether or not the signal WE has been turned on. If it is judged that the signal WE has not been turned on, the routine proceeds to S508. If it is judged that the signal WE has been turned on, the routine proceeds to S506 where the address data of the polygon side pair memory 313 is written in the frame memory 315, and the routine proceeds to S507.

In S507, the value of the polygon count memory is incremented and written in the polygon count memory. In S508, Y value is incremented, and the routine proceeds to S509.

In S509, it is judged whether or not the Y value is equal to or less than YEE, or greater than YEE. If the Y value is equal to or less than YEE, the routine returns to S503 so as to repeat the above mentioned operation. If the Y value is greater than YEE, the routine proceeds to S510. In S510, a signal NEXT is sent to the controller 310 of the polygon side pair extracting unit, and the routine ends.

Each operation of the second embodiment is performed in the timing, as is in the first embodiment, as shown in FIGS. 42 to 45.

A description will now be given, with reference to FIGS. 30 to 36, of a third embodiment according to the present invention. The picture processing unit 3 of the third embodiment has a smaller memory capacity those of the respective picture processing units of the first an second embodiments. In FIGS. 30 to 36, parts that are the same as the parts of the first embodiment are given the same reference numerals.

The overall structure of the third embodiment is similar to the structure of the first embodiment. However, the structure of the polygon side pair extracting unit 31 and that of the vertical interpolation computing unit 34 are different from those of the first embodiment.

AS in the case of the first embodiment, the polygon side pair extracting unit 31 reads out from the screen memory 1 data of the edge point of the polygon corresponding to data read out from the sort memory 2. The polygon side pair extracting unit 31 applies a simple clipping process on the data corresponding to a polygon which extends out of the display screen, and then selects polygon edge information corresponding to each side of the polygon.

The polygon side pair extracting unit 31 computes, based on information of a side of the polygon, each side pair data which corresponds to a pair of edges on a scan line, and sends the resultant side pair data to a vertical interpolation computing unit 34.

The vertical interpolation computing unit 34 computes, based on equations described below, data for an X left intersection XL and an X right intersection XR on a scan line by using the data supplied by the polygon side pair extracting unit 31. The resultant data is sent to a visibility judging unit 4 and then only data for a visible polygon is sent to the line memory 50.

Figure 30:
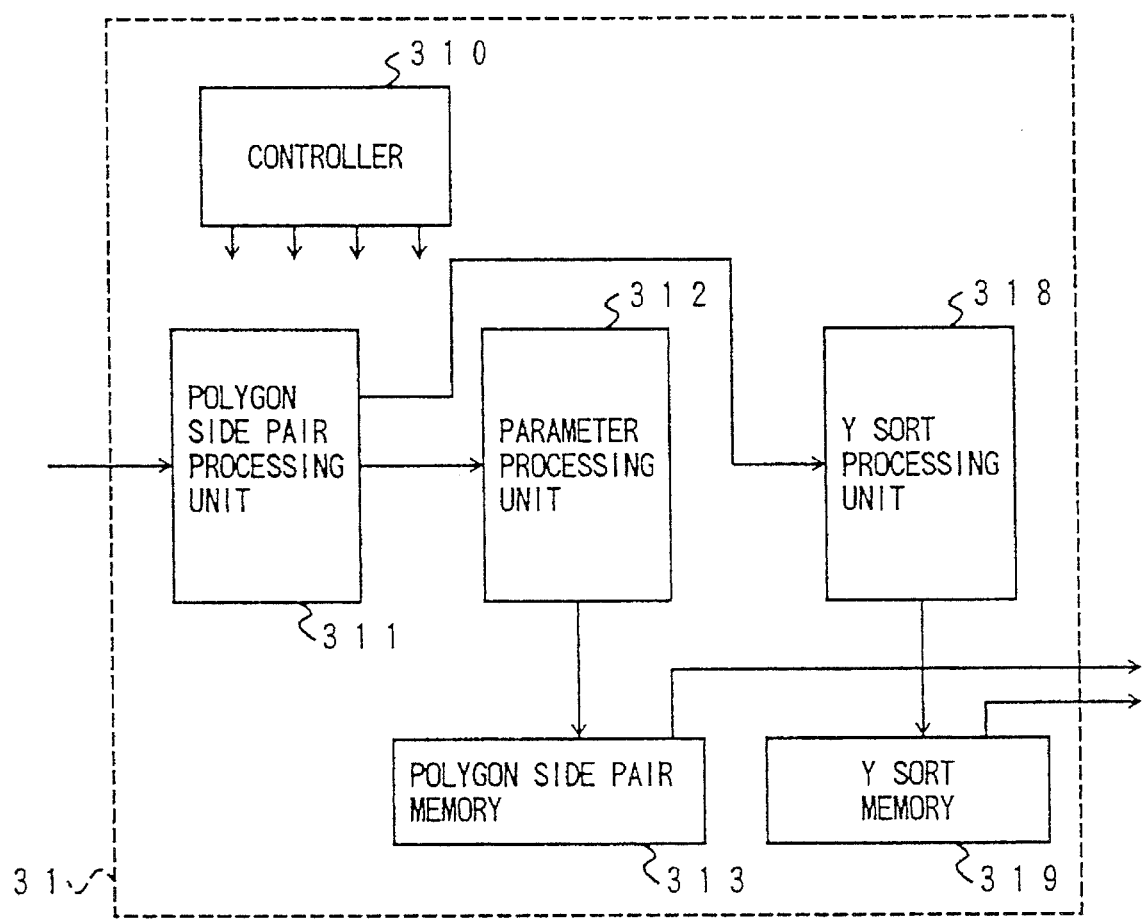
FIG. 30 is a block diagram of a polygon side pair extracting unit of a third embodiment according to the present invention.

A description will now be given, with reference to FIG. 30, of a specific structure of the polygon side pair extracting unit 31 of the third embodiment.

Data sent by the screen memory 1 is supplied to a polygon side pair processing unit 311. The polygon side pair processing unit 311 has a clipping circuit which eliminates polygon edge data corresponding to a polygon positioned outside the screen, which edge data is read out from the screen memory 1, so as to eliminate polygons shown in FIG. 40. As a result, only polygons positioned inside the screen are processed.

The polygon side pair processing unit 311 converts the polygon edge data, which has not been eliminated by the clipping circuit, into formatted data comprising start point data XLS, XRS and end point data XLE, XRE. Then a vector corresponding to a polygon side is computed based on the start point data XS and the end point data XE so as to determine a direction in which the polygon side directs. If a series of the vectors of the polygon side indicate a clockwise direction, a polygon side whose vector falls in areas 1–4 shown in FIG. 38A is classified to be a left side and a polygon side whose vector falls in areas 5–8 is classified to be a right side. If a series of the vectors of the polygon side indicate a counterclockwise direction, a polygon side whose vector falls in areas 1–4 shown in FIG. 38B is classified to be a right side and a polygon side whose vector falls in areas 5–8 is classified to be a left side. Then, as shown in FIG. 37, a Y start point YSS and a Y end point YEE are obtained in accordance with a left side and a right side, which sides form a polygon side pair.

The polygon edge data classified to be a left side or a right side is then sent to a parameter processing unit 312 and a Y sort processing unit 318. In the parameter processing unit 312, inclination data DDXL, DDXR of each polygon side is computed based on the start point address and the end point address (XLS, XLE), (XRS, XRE).

The parameter processing unit 312 sends to the polygon side pair memory 313 the obtained inclination data DDXL, DDXR, the start point data XLS, XRS and the end point data XLE, XRE of the polygon pair, the Y start point data YSS, the Y end point data YEE, and attribute data. The above data is stored in the polygon side pair memory 313 in accordance with addresses read out by the sort memory 2 in the order of the Z values, as shown in FIG. 34A.

The difference between the first embodiment and the third embodiment is that, in the first embodiment, the address data of the polygon side pair memory 313 is stored in the frame memory 315 according to each scan line, that is, by means of a resolution in the Y direction, while, in the third embodiment, the address data of the polygon side pair memory 313 and YSS and YEE are stored in a sort memory 319 in an order determined by a Y sort processing unit 318. That is, the third embodiment is provided with the sort memory 319 instead of the frame memory provided in the first embodiment, so that, in this respect, the a structure and the operation of the third embodiment is different from that of the first embodiment.

The Y sort processing unit 318 receives YSS and YEE, for example for each of the polygon side pairs as shown in FIGS. 39A, 39B and 39C, obtained by the polygon side pair processing unit 311, and rearranges the address data of the polygon side pair memory 313 in an order starting from the lowest value of the scan line between the received YSS and YEE. The rearranged address data and YSS and YEE are stored in the sort memory 319.

Figure 31:
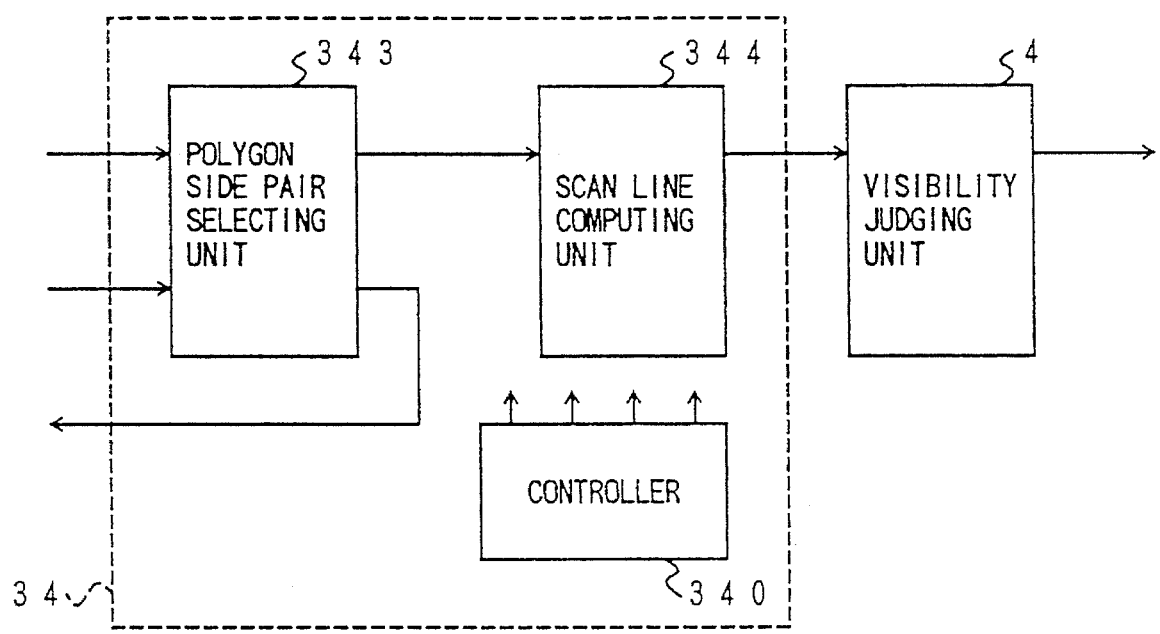
FIG. 31 is a block diagram of a vertical interpolation computing unit of the third embodiment according to the present invention.

A description will now be given, with reference to FIG. 31, of the vertical interpolation computing unit 34.

A polygon side pair selecting unit 343 in the vertical interpolation computing unit 34 reads the Y sort memory 319 according to each scan line so as to compare the scan line number with YSS and YEE. The polygon side pair selecting unit 343 receives from the polygon side pair memory 313 a parameter corresponding to a side pair in the received address, and sends the address data and the parameter to a scan line computing unit 344.

The scan line computing unit 344 computes X values of an X start point XL and an X end point XR, for example, in accordance with the equations, described above in regard to the first embodiment, on a polygon side pair as shown in FIGS. 39B, 39C and 39D.

The scan line computing unit 344 computes XL and XR for each scan line from YSS to YEE, and sends the results to the visibility judging unit 4. The visibility judging unit 4 then sends data corresponding to a visible polygon to the line memory 50.

A description will now be given, with reference to FIG. 33, of a structure of the polygon side pair selecting unit 343 of the third embodiment.

Figure 33:
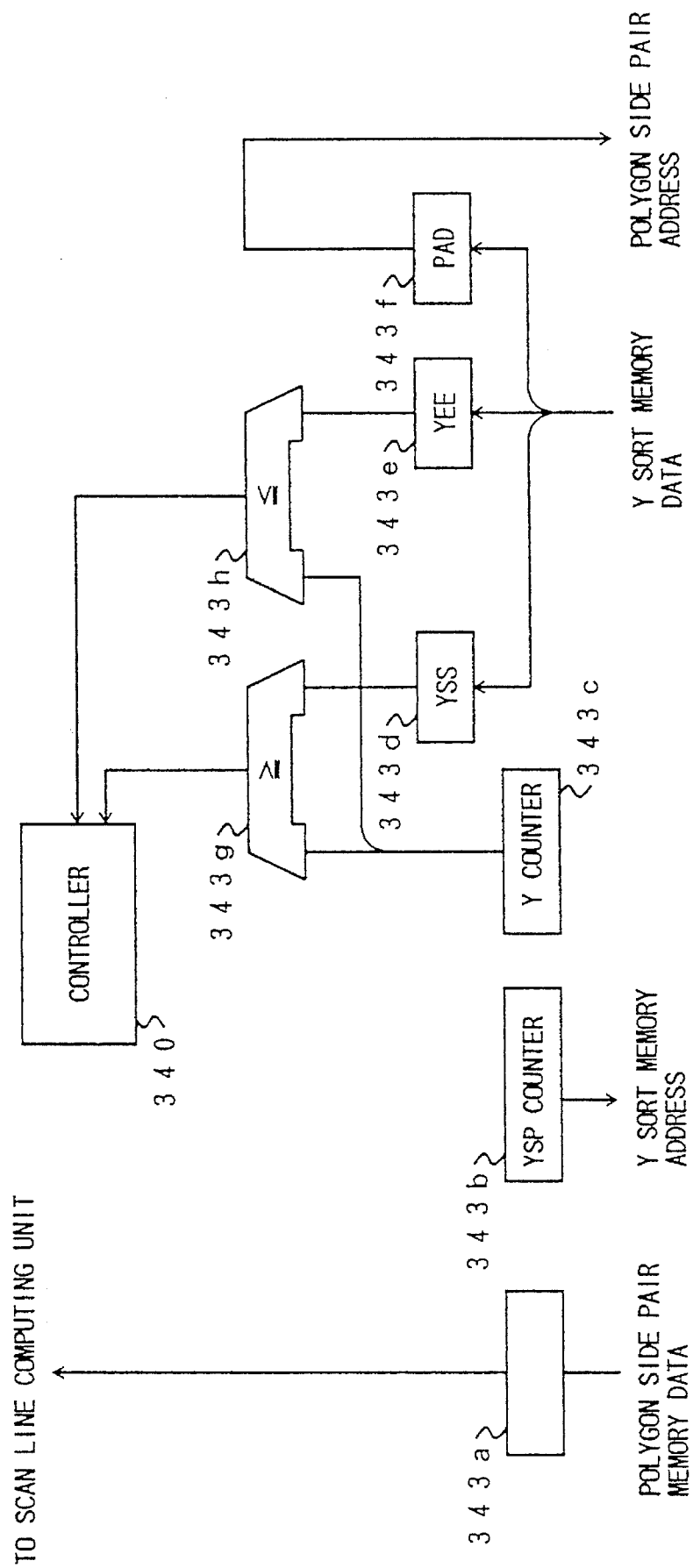
FIG. 33 is a block diagram of a polygon side pair selecting unit of the third embodiment according to the present invention.

As shown in FIG. 33, the data for a polygon side pair including inclination data DDXL, DDXR, start point data XLS, XRS, YLS, YRS, attribute data, and side pair start point and end point data YSS, YEE, are stored in a register 343a.

The address of the Y sort data is generated by a Y counter 343c, and Y sort memory data is read out from the Y sort memory 319 in accordance with the value of the YSP counter 343b.

The data read out from the Y sort memory 319 is stored in the respective registers 343d, 343e and 343f. YSS is stored in the register 343d, YEE is stored in the register 343e, and the polygon side pair memory address is stored in the register 343f.

A comparator 343g is supplied with the YSS of the register 343d and with a Y counter value from the Y counter 343c, and the comparator judges whether or not the YSS data is equal to or less than the Y counter value. The results are supplied to the controller 340.

A comparator 343h is supplied with the YEE of the register 343e and with a Y counter value from the Y counter 343c, and the comparator judges whether or not the YEE data is equal to or greater than the Y counter value. The results are supplied to the controller 340.

Figure 36:
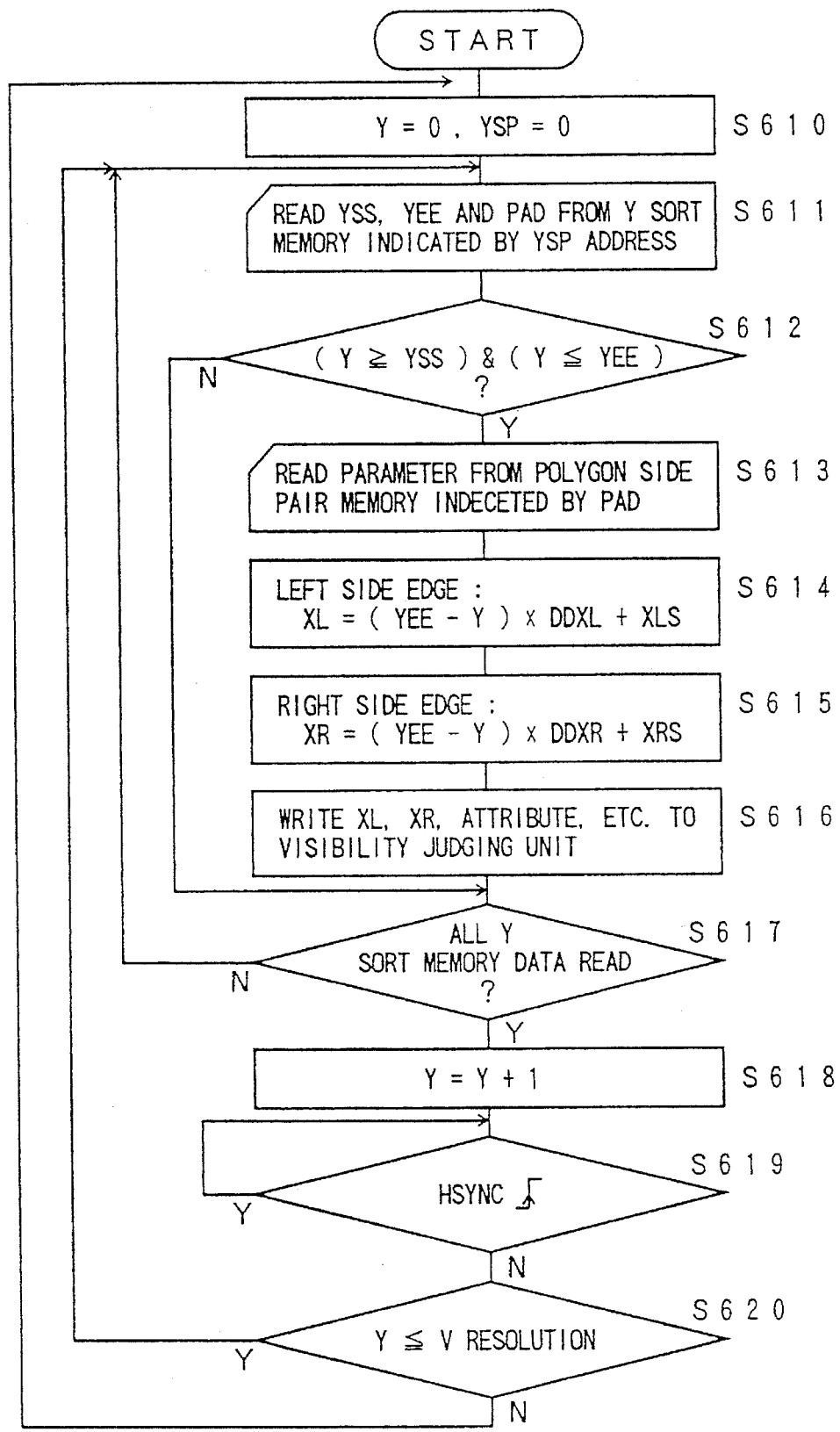
FIGS. 36 is a flow chart for explaining an operation of a vertical interpolation computing unit of the third embodiment according to the present invention.

The controller 340 controls each operation of the vertical interpolation unit 34 in accordance with a flow chart shown in FIG. 36.

A structure of the visibility judging unit 4 of the third embodiment is the same as that of the first embodiment, and a description thereof will be omitted.

Figure 32A:
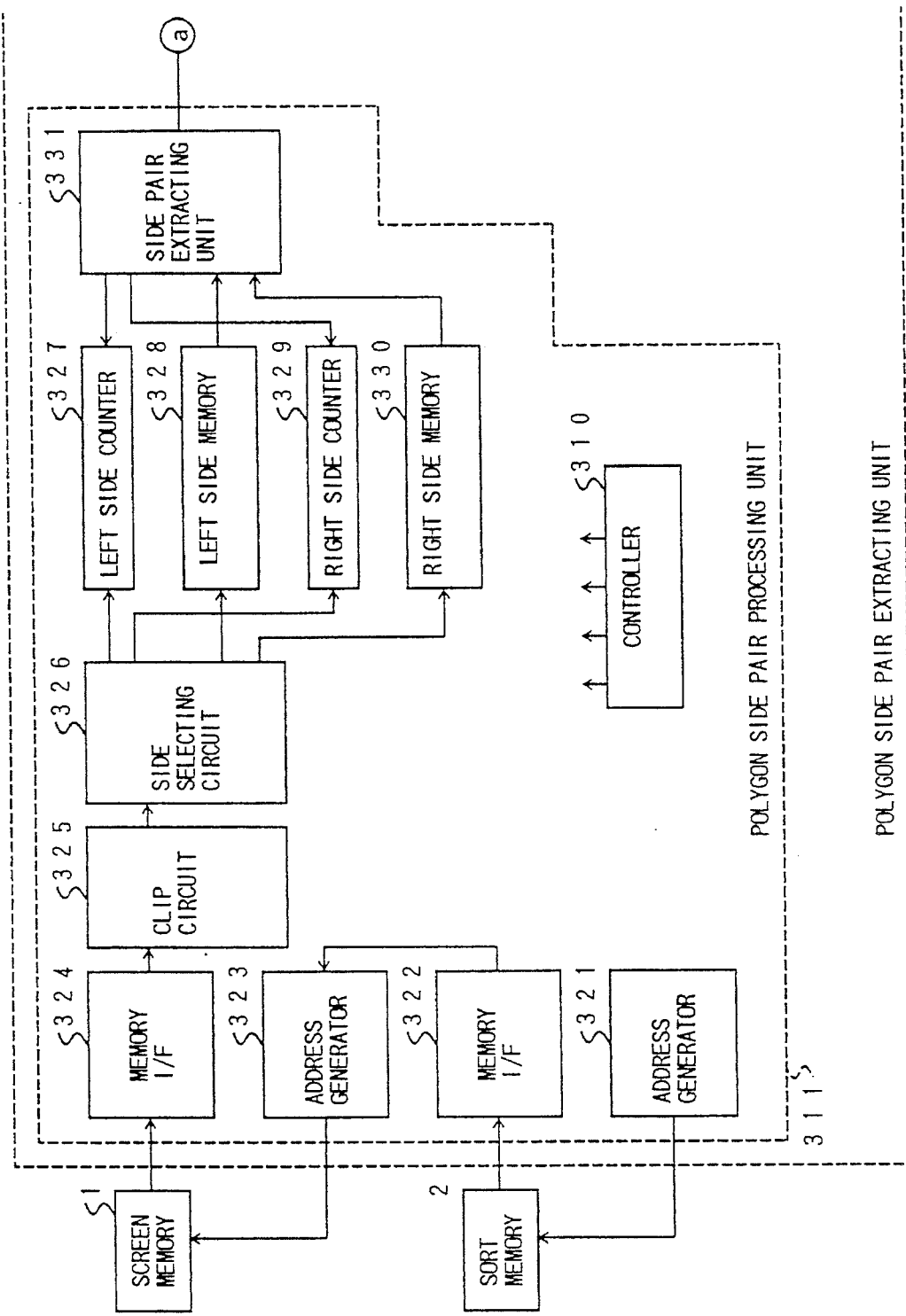
FIGS. 32A and 32B are parts of a block diagram of the third embodiment according to the present invention.
Figure 32B:
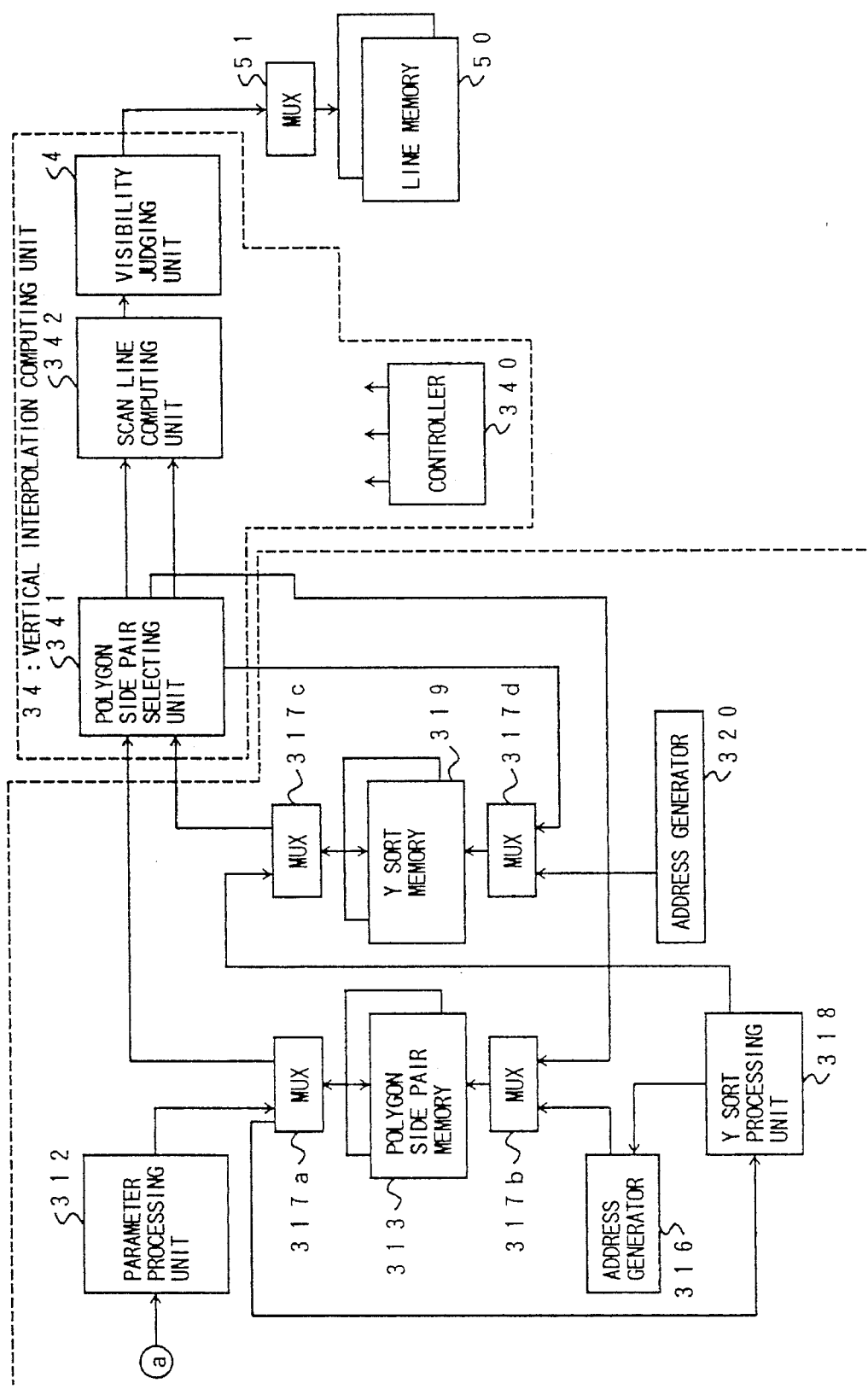

FIGS. 32A and 32B are parts of a block diagram showing an example of an image processing unit of the third embodiment.

AS in the case of the first embodiment, data from the screen memory 1 is supplied to and temporarily stored in a memory I/F 324. The screen memory 1 is accessed in accordance with an address generated by an address generation circuit 323. The address generation circuit 323 is provided with the data which has been temporarily stored in the memory I/F 324, and an address for the screen memory 1 is generated in accordance with the data from the sort memory 2.

The sort memory 2 is accessed by using the address generated by an address generation circuit 321. The edge point data of the polygon which has been stored in the memory I/F circuit 324 is then supplied to a clip circuit 325.

The clip circuit 325 compares the edge point data with values of an X start point SXS, an X end point SXE, a Y start point SYS and a Y end point SYE on the screen so as to eliminate the polygons corresponding to cases 1 to 4 shown in FIG. 40. That is, polygons which are not located in the screen are eliminated. As a result, only the polygon data which corresponds to polygons located on the screen is processed.

The polygon edge point data which has not been eliminated by the clip circuit 315 is supplied to a side selecting circuit 326. In the side selecting circuit 326, a line vector is computed in accordance with the start point data XS and the end point data XE of the side of the polygon so as to determine a direction of the line vector of the side from among the directions shown in FIG. 38A or FIG. 38B. If the polygon corresponds to a clockwise polygon, sides which have line vectors corresponding to directions 1 to 4 are determined to be a left side of the polygon and sides which have line vectors corresponding to directions 5 to 8 are determined to be a right side of the polygon. If the polygon corresponds to a counterclockwise polygon, sides which have line vectors corresponding to directions 1 to 4 are determined to be a right side of the polygon and sides which have line vectors corresponding to directions 5 to 8 are determined to be a left side of the polygon.

When a side is determined to be a left side of the polygon, a value of a left side counter 327 is incremented, and side information is stored in a left side memory 328. When a side is determined to be a right side of the polygon, a value of a right side counter 329 is incremented, and side information is stored in a right side memory 330.

The side information stored in the left side memory 328 and the right side memory 330 is arranged in accordance with a Y value (a scan line number), and a value of a side pair corresponding to each polygon is computed based on the counter numbers of the left side counter 327 and the right side counter 329, as shown in FIGS. 41A to 41H. The side pair data is then transferred to a scan line picturing unit 33 via a side pair processing unit 312 shown in FIG. 32B.

The parameter processing unit 312 calculates parameters necessary for a scan line computation by using address data of the start point and the end point of the polygon side pair. The parameters include an inclination of each side of the polygon. The calculated inclination of each side of the polygon, the X start point data and Y start point data of the right side and left side of each polygon, and attribute data are supplied to the polygon side pair memory 313 via a multiplexer 317a, and are stored in the polygon side pair memory 313. That is, the data is written in the polygon side pair memory, as shown in FIG. 34A, by the address read out from the sort memory 2 in accordance with the order of Z values. The address used for writing data in the polygon side pair memory 313 is generated by an address generator 316, and the address data is supplied to the polygon side pair memory 313 via a multiplexer 317b.

On the other hand, the address used for reading out the data in the polygon side pair memory 313 is supplied from the polygon side pair selecting unit 343 in the vertical interpolation computing unit 34 via the multiplexer 317b.

The data stored in the polygon side pair memory 313 is sent to the Y sort processing unit 318 and the vertical interpolation computing unit 34 via the multiplexer 137a.

The Y sort processing unit 318 receives YSS and YEE from the polygon side pair memory 313 via the multiplexer 317a, and rearranges the address data of the polygon side pair memory 313 in an order starting from the lowest value of the scan line between the received YSS and YEE. The rearranged address data and YSS and YEE are sent to the Y sort memory 319 via the multiplexer 317d, and stored in the sort memory 319.

The address used for writing the Y sort memory 319 is supplied by the address generator 320 through the multiplexer 317d. On the other hand, the address used for writing the Y sort memory 319 is supplied by the polygon side pair selecting unit 343 of the vertical interpolation computing unit 34 through the multiplexer 317d.

Since the scanning time of the CRT 10 includes a displaying time and a blanking time, the data is written, for example, in the polygon side pair memory 313 and the Y sort memory 319 in the blanking time as shown in FIG. 45. The data in both of these memories should be read out in the displaying time, and the data is written in the line memory 50 during each horizontal scanning operation.

The polygon side pair selecting unit 343 of the vertical interpolation computing unit 34 of the present embodiment reads the address data of the Y sort memory 319, during each horizontal scanning operation, and compares the scan line number with YSS and YEE. The polygon side pair selecting unit 343 also reads out the address data of the polygon side pair memory 313 from the polygon side pair extracting unit 31, and receives each parameter data from the polygon side pair memory 313. The unit 343 then supplies the received data to a scan line computing unit 344 of the vertical interpolation computing unit 34.

The scan line computing unit 344 computes X values of an X start point XL and an X end point XR, for example, in accordance with the equations, described above in regard to the first embodiment, on a polygon side pair as shown in FIGS. 39B, 39C and 39D.

The scan line computing unit 344 computes XL and XR for each scan line from YSS to YEE, and sends the results to the visibility judging unit 4. The visibility judging unit 4 then sends data corresponding to a visible polygon to the line memory 50 via the multiplexer 51.

Figure 35:
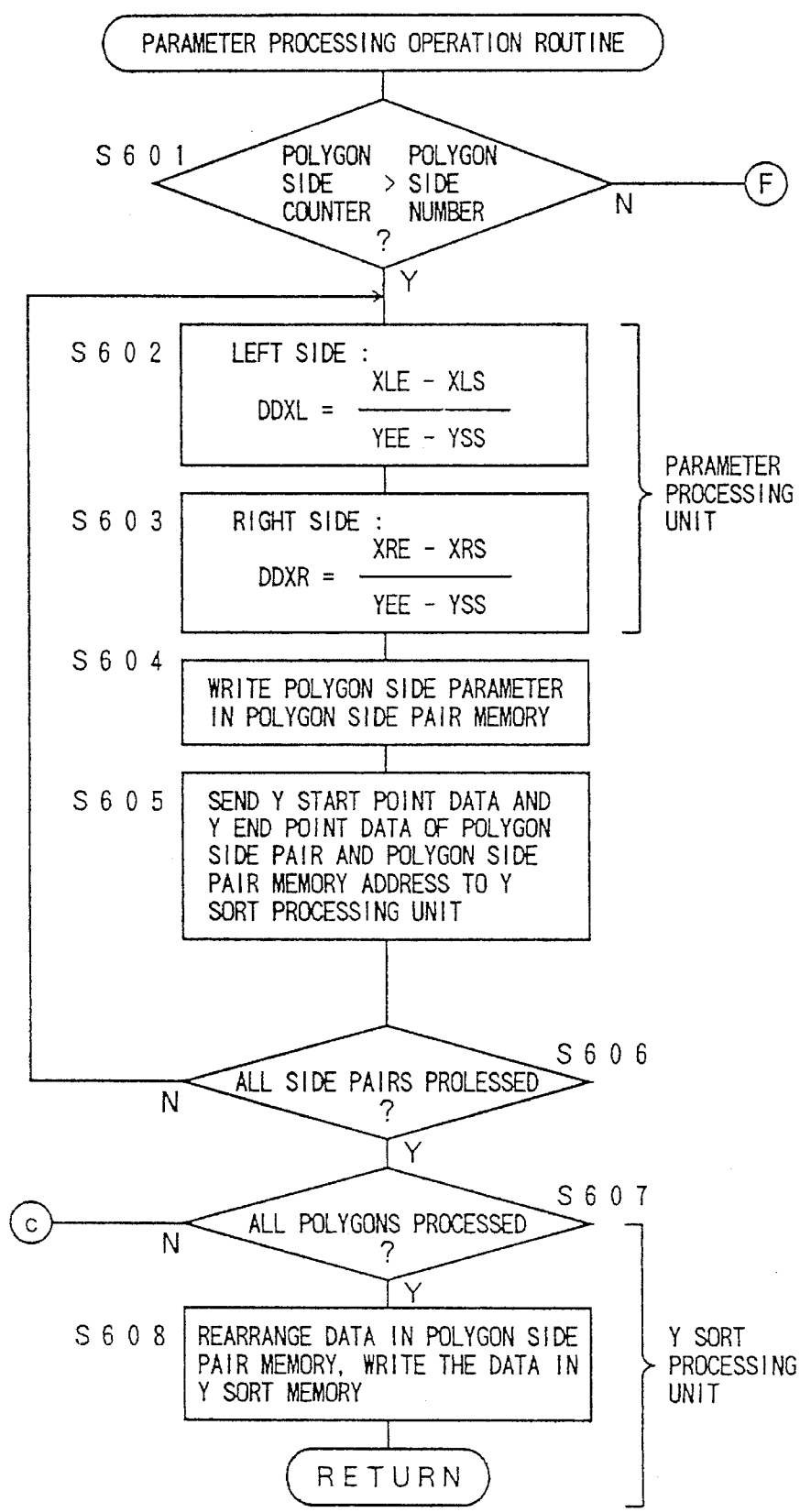
FIGS. 35 is a flow chart for explaining an operation of a parameter processing unit of the third embodiment according to the present invention.

A description will now be given, with reference to flow charts shown in FIG. 35 and 36, of an operation of the picture processing unit 3 of the third embodiment according to the present invention.

Since the operation from input of the data from the screen memory 1 and the sort memory 2 to the operation performed by the polygon side pair processing unit 311 is the same as that of the first embodiment, the following description of the operation of the second embodiment will start from an operation performed by the parameter processing unit 312.

When the operation of the side pair extracting unit 331 is completed, the routine proceeds to an operation performed by the parameter processing unit 312. It is judged, in S601, whether or not a polygon side counter value is greater than the number of polygon sides. If the polygon side counter value is not greater than the number of polygon sides, the routine returns to S6 shown in FIG. 14B, and the above-mentioned operation, from S6 to S81, is repeated.

If it is judged, in S601, that the polygon side counter value is greater than the number of polygon sides, the routine proceeds to S602. In S602, inclination data DDXL of the left side is computed, and in S603, inclination data DDXR of the right side is computed.

In S604, polygon side pair parameters including DDXL, DDXR, X start point data and Y start point data of both the left side and right side, attribute data, Y start point data and Y end point data of the side pair are written in the polygon side pair memory 313.

In S605, YSS and YEE of the polygon side pair and the address data of the polygon side pair memory 313 are sent to the Y sort processing unit 318, and the routine proceeds to S606. In S606, it is judged whether or not all side pairs have been processed. If not, the routine returns to S602 so as to repeat the operation from S602 to S606 until all side pairs have been processed. If it is judged, in S606, that all side pairs have been processed, the routine proceeds to S607 where it is judged whether or not all polygons have been processed. If all polygons have not been processed, the routine returns to S1 of FIG. 14A so as to repeat the above-mentioned operation until all polygons have been processed. If it is judged, in S607, that all polygons have been processed, the routine proceeds to S608.

In S608, the address and data in the polygon side pair memory 313 is rearranged, in an order starting from the lowest value of the scan line, in accordance with Y start point YSS of the polygon side pair. The rearranged address data, YSS and YEE, and other data are written, as shown in FIG. 34A, in the Y sort memory 319. When the writing operation to the Y sort memory 319 is completed, the operation of the polygon side pair extracting unit 331 ends.

A description will now be given, with reference to a flow chart shown in FIG. 36, of an operation performed by the vertical interpolation computing unit 34 of the third embodiment.

When an operation of the vertical interpolation computing unit 34 starts, first, in S610, scan line address data Y and Y sort memory address data YSP are set to 0. In S611, Y start point data YSS and Y end point data YEE and polygon side pair memory address data PAD indicated by the YSP are read out.

In S612, YSS and YEE are compared with scan address data Y by the comparators $343g$ and $343h$ of the polygon side pair selecting unit 343. It is than judged whether or not the Y address value is equal to or greater than YSS and equal to or less than YEE. If yes, the routine proceeds to S613, and if not, the routine proceeds to S617.

In S613, polygon side pair data in the polygon side pair memory 313 indicated by polygon side pair memory address data of the Y sort memory 319 is read out, and the routine proceeds to S614.

In S614, left side edge data XL is calculated by the following equation:

$$XL=(YEE - Y) * DDXL+XLS$$

In S615, right side edge data XR is calculated by the following equation:

$$XR=(YEE - Y) , DDXR+XRS$$

In S616, data including XL, XR and attribute data is sent to and written in the visibility judging unit 4, and the routine proceeds to S617.

In S617, it is judged whether or not all data in the Y sort memory 319 has been read out. If it is judged that all data has been read out, the routine proceeds to S618. If not, the routine returns to S611 so as to repeat the process from S611 to S617.

In S618, the Y address value is incremented, and in S619, it is judged whether or not a signal HSYNC is "Hi". If it is judged that the signal HSYNC is high, the routine proceeds to S620. In S620, it is judged whether or not the Y address is equal to or less than V resolution or greater than the V resolution. If the Y address value is equal to or less than the V resolution, the routine returns to S611, and if the Y address value is greater than the V resolution, the routine returns to S610.

In the present embodiment, the writing to the polygon side pair memory 313 is performed by the polygon side pair extracting unit 31 and the writing to the Y sort memory 319 is performed by the Y sort processing unit 318 during a blanking time, as shown in FIG. 46,. Data in the Y sort memory 319 and the polygon side pair memory 313 is read out by the vertical interpolation computing unit 34 during a displaying time, and the data is written in the line memory during each horizontal scanning time.

The third embodiment uses the Y sort memory formatted as shown in FIG. 34 instead of the frame memory of the first and second embodiments, which frame memory is formatted as shown in FIG. 13B. On the assumption that the number of polygons is 256 and a resolution in the Y direction is 400, the frame memory of the first and second embodiments is required to have a capacity as much as 204,800 words (256*2*400=204,800). On the other hand, in the third embodiment, when the same number of polygons is being processed, 1,00 pairs of polygon side pairs are to be processed, and thus the Y sort memory is required have a capacity of 1,000*3=3,000 words. Therefore, the memory capacity of the third embodiment can be made smaller than that of the first and the second embodiments.

The present invention is not limited to the specifically disclosed embodiments, and variations and modifications may be made without departing from the scope of the present invention.

What is claimed is:

1. An image processing apparatus which processes image data of a picture consisting of polygons to be displayed on a screen comprising scan lines of a display unit, the image processing apparatus comprising:

screen memory means for storing at least X and Y coordinate data for edge points of the polygons;

sort memory means for storing polygon numbers, which numbers are arranged in an order of priority in which the polygon having the highest priority is arranged first in the order;

polygon side computing means, connected to said screen memory means and said sort memory means, for computing, from the data for edge points stored in said screen memory means, data for sides of each of the polygons corresponding to each of said polygon numbers stored in said sort memory means;

side pair computing means for computing side pair data in accordance with the data of sides of polygons supplied by said polygon side computing means, said side pair data comprising data of a pair of sides located on the scan lines of the screen;

inclination computing means for computing an inclination of each side of said side pair;

side pair memory means for storing inclination data computed by said inclination computing means and start point and end point data of each side of said side pair, each data being stored in a position having a predetermined address;

frame memory means for storing data of the address of said side pair memory means;

interpolation computing means for computing, by means of an interpolation method, right intersection data and left intersection data on each of the scan lines, said right intersection data corresponding to an intersection of each of the scan lines and a right side of each of the polygons, and said left intersection data corresponding to an intersection of each of the scan lines and a left side of each of the polygons; and processing means for processing said right intersection data and said left intersection data supplied by said interpolation computing means so as to obtain dot data for the polygons, and for outputting said dot data of the polygons by synchronizing said dot data with the scan lines of the screen on the display unit.

2. The image processing apparatus as claimed in claim 1, wherein said side pair computing means comprises:

vector computing means for computing a line vector of each side of each of the polygons in accordance with the data for edge points supplied by said screen memory means and the data for the sides of each of the polygons, and for determining a direction of said line vector;

classifying means for classifying each side of the polygons as either a left side or a right side in accordance with said direction of said line vector; and side pair extracting means for extracting said side pair data in accordance with a number of said sides classified as left sides and a number of said sides classified as right sides.

3. The image processing apparatus as claimed in claim 2, wherein said side pair extracting means comprises:

a left side counter, a count value of which is incremented each time a side is classified as a left side;

a left side memory which stores data for each side classified as a left side;

a right side counter, a count value of which is incremented each time a side is classified as a right side; and a right side memory which stores data for each side classified as a right side.

4. The image processing apparatus as claimed in claim 1, wherein said processing means comprises line memory means for storing dot data corresponding to the left intersection data and the right intersection data supplied by said interpolation computing means, said dot data being read out from said line memory means so as to be output in synchronization with an operation timing of each of said scan lines.

5. An image processing apparatus which processes image data of a picture consisting of polygons to be displayed on a screen comprising scan lines of a display unit, the image processing apparatus comprising:

screen memory means for storing at least X and Y coordinate data for edge points of the polygons;

sort memory means for storing polygon numbers, which numbers are arranged in an order of priority in which the polygon having the highest priority is arranged first in the order;

polygon side computing means, connected to said screen memory means and said sort memory means, for computing, from the data for edge points stored in said screen memory means, data for sides of each of the polygons corresponding to each of said polygon numbers stored in said sort memory means;

side pair computing means for computing side pair data in accordance with the data for sides of polygons supplied by said polygon side computing means, said side pair data comprising data of a pair of sides located on the scan lines of the screen;

inclination computing means for computing an inclination of each side of said side pair;

side pair memory means for storing inclination data computed by said inclination computing means and start point and end point data of each side of said side pair, each data being stored in a position having a predetermined address;

judging means for judging whether or not each of the polygons is to be displayed in accordance with the data received from said side pair memory means;

frame memory means for storing data of the address of said side pair memory means, said address corresponding only to the polygons which said judging means has judged are to be displayed;

interpolation computing means for computing, by means of an interpolation method, right intersection data and left intersection data on each of the scan lines, said right intersection data corresponding to an intersection of each of the scan lines and a right side of each of the polygons, and said left intersection data corresponding to an intersection of each of the scan lines and a left side of each of the polygons; and processing means for processing said right intersection data and said left intersection data supplied by said interpolation computing means so as to obtain dot data for the polygons, and for outputting said dot data of the polygons by synchronizing said dot data with the scan lines of the screen on the display unit.

6. The image processing apparatus as claimed in claim 5, wherein said judging means comprises:

generating means for generating dot data of polygons for each scan line of the screen in accordance with said inclination data and said start point and end point data supplied by said side pair memory means;

flag memory means for storing said dot data of the polygons judged to be displayed;

determining means for determining whether or not a polygon is to be displayed by comparing dot data of said polygon generated by said generating means with dot data of another polygon stored in said flag memory; and rewriting means for rewriting said dot data of the polygons stored in said flag memory based on a result of an OR operation on the dot data of the polygon to be displayed, which is output from said determining means, and the data of previously processed dot data for polygons stored in said flag memory means.

7. The image processing apparatus as claimed in claim 5, wherein said side pair computing means comprises:

vector computing means for computing a line vector of each side of each of the polygons in accordance with the data for edge points supplied by said screen memory means and the data for the sides of each of the polygons, and for determining a direction of said line vector;

classifying means for classifying each side of the polygons as either a left side or a right side in accordance with said direction of said line vector; and side pair extracting means for extracting said side pair data in accordance with a number of said sides classified as left sides and a number of said sides classified as right sides.

8. The image processing apparatus as claimed in claim 7, wherein said side pair extracting means comprises:

a left side counter, a count value of which is incremented each time a side is classified as a left side;

a left side memory which stores data for each side classified as a left side;

a right side counter, a count value of which is incremented each time a side is classified as a right side; and a right side memory which stores data for each side classified as a right side.

9. The image processing apparatus as claimed in claim 5, wherein said processing means comprises line memory means for storing dot data corresponding to the left intersection data and the right intersection data supplied by said interpolation computing means, said dot data being read out from said line memory means so as to be output in synchronization with an operation timing of each of said scan lines.

10. An image processing apparatus which processes image data of a picture consisting of polygons to be displayed on a screen comprising scan lines of a display unit, the image processing apparatus comprising:

screen memory means for storing at least X and Y coordinate data for edge points of the polygons;

sort memory means for storing polygon numbers, which numbers are arranged in an order of priority in which the polygon having the highest priority is arranged first in the order;

polygon side computing means, connected to said screen memory means and said sort memory means, for computing, from the data for edge points stored in said screen memory means, data for sides of each of the polygons corresponding to each of said polygon numbers stored in said sort memory means;

side pair computing means for computing side pair data in accordance with the data of sides of polygons supplied by said screen computing means, said side pair data comprising data of a pair of sides located on the scan lines of the screen;

inclination computing means for computing an inclination of each side of said side pair;

side pair memory means for storing polygon side pair data including inclination data computed by said inclination computing means and start point and end point data of each side of said side pair, each data being stored in a position having a predetermined address;

Y sort memory means for storing Y start point data and Y end point data of the polygon side pair and the address data of said side pair memory means;

sort processing means for rearranging the polygon side pair data in said side pair memory means in an order starting from polygon side pair data having the smallest Y address value of Y start point data, and for writing in said Y sort memory the Y start point data and Y end point data and the address of said side pair memory means corresponding to each polygon side pair;

interpolation computing means for computing, by means of an interpolation method, right intersection data and left intersection data on each of the scan lines upon accessing said side pair memory means and said Y sort memory means, said right intersection data corresponding to an intersection of each of the scan lines and a right side of each of the polygons, and said left intersection data corresponding to an intersection of each of the scan lines and a left side of each of the polygons; and processing means for processing said right intersection data and said left intersection data supplied by said interpolation computing means so as to obtain dot data of the polygons, and for outputting said dot data of the polygons by synchronizing said dot data with the scan lines of the screen on the display unit.

11. The image processing apparatus as claimed in claim 10, wherein said interpolation computing means comprises:

selecting means for selecting a polygon side pair currently crossed by one of the scan lines, and reading out the data corresponding to said polygon side pair from among data in said Y sort memory means, the data being read out in an order starting from the data having a highest priority with respect to each scan line; and scan line computing means for computing, by means of an interpolation method, right intersection data and left intersection data on each of the scan lines in accordance with the data supplied by said selecting means.

12. The image processing apparatus as claimed in claim 10, wherein said side pair computing means comprises:

vector computing means for computing a line vector of each side of each of the polygons in accordance with the data for edge points supplied by said screen memory means and the data of the sides of each of the polygons, and for determining a direction of said line vector;

classifying means for classifying each side of the polygons as either a left side or a right side in accordance with said direction of said line vector; and side pair extracting means for extracting said side pair data in accordance with a number of said sides classified as left sides and a number of said sides classified as right sides.

13. The image processing apparatus as claimed in claim 12, wherein said side pair extracting means comprises:

a left side counter, a count value of which is incremented each time a side is classified as a left side;

a left side memory which stores data for each side classified as a left side;

a right side counter, a count value of which is incremented each time a side is classified as a right side; and a right side memory which stores data for each side classified as a right side.

14. The image processing apparatus as claimed in claim 10, wherein said processing means comprises line memory means for storing dot data corresponding to the left intersection data and the right intersection data supplied by said interpolation computing means, said dot data being read out from said line memory means so as to be output in synchronization with an operation timing of each of said scan lines.

15. The image processing apparatus as claimed in claim 12, further comprising judging means for judging whether or not each of the polygons is to be displayed in accordance with the left intersection data and the right intersection data computed by said interpolation computing means, the left intersection pair data and the right intersection data corresponding only to the polygons which said judging means has judged are to be displayed being stored in said line memory.

16. The image processing apparatus as claimed in claim 15, wherein said judging means comprises:

generating means for generating dot data of polygons for each scan line of the screen in accordance with the inclination data and the left intersection data and the right intersection data computed by said interpolation computing means;

flag memory means for storing said dot data of the polygons judged to be displayed;

determining means for determining whether or not a polygon is to be displayed by comparing dot data of said polygon generated by said generating means with dot data of another polygon stored in said flag memory; and rewriting means for rewriting said dot data of the polygons stored in said flag memory means based on a result of an OR operation on the dot data of the polygon to be displayed, which data is output from said determining means, and the data of previously processed dot data of polygons stored in said flag memory means.

* * * * *